US009536322B1

(12) United States Patent
Smith et al.

(10) Patent No.: US 9,536,322 B1
(45) Date of Patent: Jan. 3, 2017

(54) IMPLEMENTATION OF MULTI-CAMERA TRACKING APPLICATIONS USING RICH COLOR TRANSITION CURVE TARGET SEQUENCES

(71) Applicants: Peter Harmon Smith, Ann Arbor, MI (US); Thomas K. Pratt, Wayne, PA (US)

(72) Inventors: Peter Harmon Smith, Ann Arbor, MI (US); Thomas K. Pratt, Wayne, PA (US)

(73) Assignee: Peter Harmon Smith, Ann Arbor, MI (US)

( * ) Notice: Subject to any disclaimer, the term of this patent is extended or adjusted under 35 U.S.C. 154(b) by 0 days.

(21) Appl. No.: 14/754,126

(22) Filed: Jun. 29, 2015

Related U.S. Application Data

(63) Continuation-in-part of application No. 14/014,936, filed on Aug. 30, 2013, now Pat. No. 9,070,192, which (Continued)

(51) Int. Cl.
*G06K 9/00* (2006.01)
*G06T 7/40* (2006.01)
(Continued)

(52) U.S. Cl.
CPC ............. *G06T 7/408* (2013.01); *G06K 9/4652* (2013.01); *G06T 7/0081* (2013.01);
(Continued)

(58) Field of Classification Search
CPC ............... A63F 2300/1087; A63F 2300/1012; G06F 3/0425; G06F 3/011; G06F 3/017; G06F 3/0325; G06F 3/04; G06F 3/0304; G06F 3/042; G06F 3/0346; G06F 3/038; G06F 3/0428; G06F 3/013; G06F 3/0488; G06F 3/012; G06K 9/78; G06K 9/00335; G06K 9/00342; G06K 9/00577; G06K 9/32; G06K 9/38; G06K 9/3241; G06K 9/6228; G06K 9/627
(Continued)

(56) References Cited

U.S. PATENT DOCUMENTS 4,302,770 A 11/1981 Hubbard, Jr. et al.
4,488,245 A 12/1984 Dalke et al.
(Continued)

*Primary Examiner* — Ali Bayat
(74) *Attorney, Agent, or Firm* — Young Basile Hanlon & MacFarlane, P.C.

(57) ABSTRACT

A method and apparatus for tracking a location of an object or target in a 3D space. At least one target including unique sub-targets is attached to a vision object in the 3D space. A camera disposed in a 3D space, and coupled to a computing device captures a 2D image of a target. The camera computing device identifies the sub-targets of the target and transfers the sub-target data to a computing device associated with the camera which accesses a data base of target data to identify target an, using sub-target separation distances in the database to determine 3D location and orientation of the target. Another computing device transforms the 3D locations of the detected target in the camera coordinate system into a single 3D coordinate system for the 3D space. The 3D location of targets detected by multiple cameras of different computing devices maybe daisy chained together to convert the target location in the 3D coordinate systems of each computing device into a single 3D coordinate system.

27 Claims, 51 Drawing Sheets

Related U.S. Application Data is a continuation-in-part of application No. 13/301,216, filed on Nov. 21, 2011, now Pat. No. 8,526,717, which is a continuation-in-part of application No. 12/107,092, filed on Apr. 22, 2008, now Pat. No. 8,064,691.

(60) Provisional application No. 60/917,966, filed on May 15, 2007.

(51) Int. Cl.
*G06T 7/00* (2006.01)
*G06K 9/46* (2006.01)

(52) U.S. Cl.
CPC ..... *G06K 2209/21* (2013.01); *G06K 2209/40* (2013.01); *G06T 2207/10004* (2013.01); *G06T 2207/10024* (2013.01); *G06T 2207/30232* (2013.01)

(58) Field of Classification Search
USPC .......................................................... 382/100
See application file for complete search history.

(56) References Cited

U.S. PATENT DOCUMENTS

| | | |
|---|---|---|
| 4,520,386 A | 5/1985 | Asaida |
| 4,901,254 A | 2/1990 | Dolezalek et al. |
| 5,237,517 A | 8/1993 | Harrington et al. |
| 5,255,350 A | 10/1993 | Hermann et al. |
| 5,351,141 A | 9/1994 | Tsuji et al. |
| 5,493,518 A | 2/1996 | Keating |
| 5,751,450 A | 5/1998 | Robinson |
| 5,867,169 A | 2/1999 | Prater |
| 6,023,524 A | 2/2000 | Yamaguchi |
| 6,151,405 A | 11/2000 | Douglass et al. |
| 6,185,013 B1 | 2/2001 | Harrington et al. |
| 6,226,399 B1 | 5/2001 | Robinson |
| 6,459,501 B1 | 10/2002 | Holmes |
| 6,574,004 B1 | 6/2003 | Jacob et al. |
| 6,633,407 B1 | 10/2003 | Kim et al. |
| 6,721,000 B1 | 4/2004 | Lin et al. |
| 6,788,811 B1 | 9/2004 | Matsuura et al. |
| 6,795,068 B1 | 9/2004 | Marks |
| 7,081,920 B2 | 7/2006 | Sugiki |
| 7,791,649 B2 | 9/2010 | Kim et al. |
| 8,144,931 B1 * | 3/2012 | Hartman ............. G06K 9/3241 348/169 |
| 2004/0114166 A1 | 6/2004 | Kubo |
| 2004/0240709 A1 * | 12/2004 | Shoemaker ............ G06F 3/013 382/103 |
| 2005/0007608 A1 | 1/2005 | Yamamoto et al. |
| 2007/0086622 A1 * | 4/2007 | Sun ....................... G06K 9/32 382/103 |
| 2008/0056607 A1 | 3/2008 | Ovsiannikov |
| 2008/0285848 A1 | 11/2008 | Meyer et al. |
| 2010/0172567 A1 | 7/2010 | Prokoski |

\* cited by examiner

Figure 19
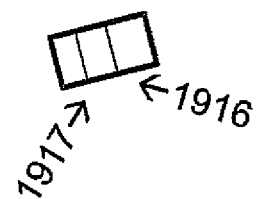
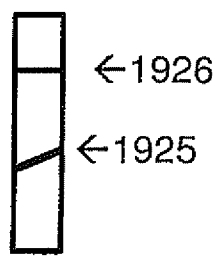

Figure 22

| J = | 100 | 101 | 102 | 103 | 104 | 105 | 106 | 107 | 108 | 109 | 110 | 111 | 112 |
|---|---|---|---|---|---|---|---|---|---|---|---|---|---|
| | RED S=1 | RED S=1 | RED S=1 | RED S=1 | Non Target Color | Non Target Color | Blue S=3 | Blue S=3 | Blue S-3 | Blue S=3 | Blue S=3 | Non Target Color | Non Target Color |

| J = | 113 | 114 | 115 | 116 | 117 | 118 | 119 | 120 | 121 | 122 | 123 | 124 | 125 |
|---|---|---|---|---|---|---|---|---|---|---|---|---|---|
| | Green S=2 | Green S=2 | Green S=2 | Green S=2 | Green S=2 | Green S=2 | Green S=2 | Green S=2 | Green S=2 | Non Target Color | Non Target Color | Non Target Color | Non Target Color |

Line-Sets within Separation Tolerance with different Target Colors

| 100, 1, 103 |

| 106, 3, 110 |

| 104, 0, 105 |

| 112, 0, 113 |

| 113, 2, 121 |

| 122, 0, 125 |

Transition Point Data-Sets for Separation Tolerance = 4
and Target Colors or Red, Green, Blue

| (1, 1, 0, 0), (23, 104.3), (100,1, 103), (106, 3, 110) |

| (2, 2, 1, 0), (23, 111.4), (106, 3, 110), (113, 2, 121) |

| Non Target Color | RED S=1 | RED S=1 | RED S=1 | RED S=1 | Non Target Color | Non Target Color | Blue S=3 | Blue S-3 | Blue S=3 | Blue S=3 | Blue S=3 | Non Target Color |
|---|---|---|---|---|---|---|---|---|---|---|---|---|

J = 113   114   115   116   117   118   119   120   121   122   123   124   125

| Non Target Color | Green S=2 | Green S=2 | Green S=2 | Green S=2 | Green S=2 | Green S=2 | Green S=2 | Green S=2 | Green S=2 | Non Target Color | Non Target Color | Non Target Color |
|---|---|---|---|---|---|---|---|---|---|---|---|---|

Line-Sets within Separation Tolerance with different Target Colors 101, 1, 104

107, 3, 111

100, 0, 100

105, 0, 106

112, 0, 113

114, 2, 122

123, 0, 125

Transition Point Data-Sets for Separation Tolerance = 4
and Target Colors or Red, Green, Blue (3, 1, 0, 0), (24, 105.2), (101,1, 104), (107, 3, 111)

| Target Number | Number Of Stripes | Color Pattern | Interval On Right | Rotation (in degrees) | Area |
|---|---|---|---|---|---|
| 1 | 2 | R/R | 5 | 0 | 2x1 |
| 2 | 3 | R/G/B | 7 | -20 | 2x1 |
| 3 | 3 | G/B/G | 12 | 0 | 4.5x1.5 |
| 4 | 3 | R/G/B | 4 | -20 | 3x1 |
| 5 | 4 | R/B/R/G | 6 | 10 | 4x1 |
| 6 | 2 | B/R | 4 | 0 | 2x1 |
| 7 | 3 | B/R/B | 0 | 0 | 3x1 |

FIG 27A
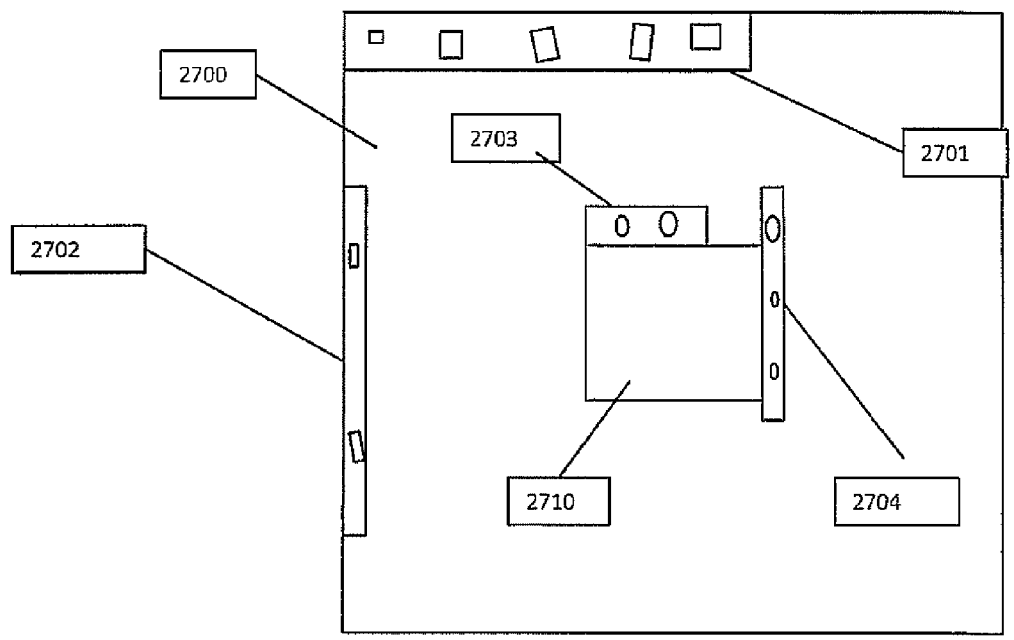
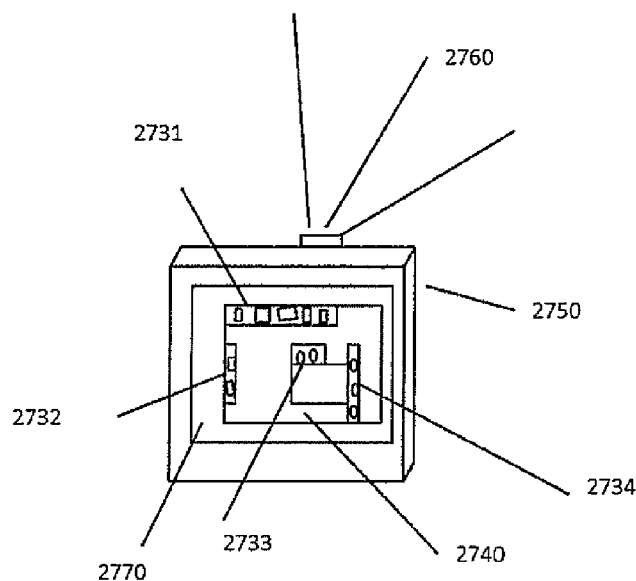
FIG 27B

IMPLEMENTATION OF MULTI-CAMERA TRACKING APPLICATIONS USING RICH COLOR TRANSITION CURVE TARGET SEQUENCES

CROSS REFERENCE TO RELATED APPLICATIONS

This application is a continuation-in-part of patent application Ser. No. 14/014,936, filed Aug. 30, 2013, now U.S. Pat. No. 9,070,192, which is a continuation-in-part of U.S. patent application Ser. No. 13/301,216, filed Nov. 21, 2011, now U.S. Pat. No. 8,526,717, which is a continuation-in-part of patent application Ser. No. 12/107,092, filed Apr. 22, 2008, now U.S. Pat. No. 8,064,691, which claims priority benefit to the filing date of U.S. Provisional Patent Application Ser. No. 60/917,966, filed May 15, 2007, the contents of all of which are incorporated herein in their entirety.

BACKGROUND

The disclosure concerns the use of "rich colored transition sequences" (RCTS) together with multi camera optical tracking within a 3D space for control of computer applications or measurement and collection of 3D data.

It has always been a dream in the machine vision community to track objects in 3D with a multitude of cameras. There is no end to applications that could benefit from seamless multi-camera optical tracking: gaming, robotics, medical care, surgery, home control, etc. Moore's Law is driving the price point and capability of computers, cameras, and communication to a point where this may soon be possible. Some of the barriers to widespread adoption are addressed here.

Usually the assumption is made that all positions in a 3D volume need to be visible to at least two cameras at all times. This leads to a complex optimization problem especially when people can move around the space and occlude some of the cameras. Implicit in this is the need to synchronize all of the cameras with overlapping fields of view.

The associated computational and mathematical problems grow dramatically as the number of cameras increase. Photogrammetry using two cameras was never easy but it gets much tougher when three or more cameras are used on the same field of view especially when some cameras see the object from a different side and angle, and lighting changes as clouds pass by, and people pass in from of cameras. The burden on computers can be horrific.

This method and apparatus, together with the three previous patents of the inventor extensively disclose how targets of color can be used to build fast, robust and inexpensive machine vision interfaces. The next three paragraphs below are a brief and incomplete summary of these three patents where many of the relevant elements of the past work is discussed.

U.S. Pat. No. 8,064,691, explains how colored targets could be composed of rich colors that were far more reliable in variable lighting environments. The rich color method was fast and would greatly benefit when future cameras move beyond the three RGB sensors of today.

U.S. Pat. No. 8,526,717, discloses how the method is greatly enhanced when the transition boundary curves that separate rich colored patches are used for tracking. The transition curves that separate rich colors rarely occur in a given image and if search is limited to a relatively small number of ordered adjacent sets of curves of a given shape bounded by specific color pairs, we have a robust, fast tracking method that requires little computer memory. This can easily be implemented in hardware or software of a smart camera. An example of an everyday smart camera is an iPhone or iPad where a software app could perform many tasks.

U.S. patent application Ser. No. 14/014,936, explains how a sequence of sub-targets that are arrayed along a roughly straight line path can provide an almost unlimited number of IDs. These sequences act as a single target which can be used to detect, ID, locate, and orient a rigid object to which the sequence is attached. Further, this patent shows how multiple cameras and computers can gather location and orientation data about each sequence and applications can be constructed in a modular fashion such that a pair of lists can control a wide set of machine vision applications. This so called "see-this" and "do-that" lists are all that are needed to pick an app and guide it's action.

SUMMARY

The method amplifies and extends the use of a set of colored sub-targets whose centers fall on a line in 3D space. A simple method for calibration of a room filled with a multitude of cameras and targets is disclosed using linear sequences of targets composed of distinguishable patches whose boundary curve combinations are tracked. A method is described where a single camera frame from a single camera is used to locate and orient a rigid object to which RCTS targets are attached. A method is provided to transform the 3D data from a set of smart cameras to a single 3D coordinate system. Elements of the method for use in multi-camera tracking are: 1) "rich color transition curve sequences" (RCTS) for low cost rapid detection and unique identification for handling complex scenes with many cameras and objects, 2) method of identifying, locating and orienting a RCTS target with a single frame of a single smart camera allowing it to act autonomously and take advantage of parallel processing, 3) the use of modular apparatus that make it simple to deploy cameras and targets, and 4) an easy method to define a universal coordinate system for a 3D space.

"Vision object" (VO) apparatus are described that can act as modules to deploy clusters of smart cameras and targets throughout a 3D space. This makes it simple to set up an interactive room for control of computer applications or recording of 3D motion. The method uses VOs composed of everyday 3D objects such as vases, lamp shades, picture frames, smart phones, and tablet computers placed around a room to create an inexpensive, powerful 3D machine vision control system that is simple to set up and operate. The method and apparatus employ smart cameras with Wi-Fi and a display of a coplanar pair of rich colored transition curve sequences shown on an electronic display or a colored surface attached to a surface of a rigid body. In one example of such a VO is disclosed which is composed of a plastic slab that holds 2 smart phones at right angles to each other. The invention can enable a wide spread use of multi camera computer control applications due to the simplicity of operation, set up, and extension composed of low cost elements. The use of such an interactive space for control of a robotic application is described.

Since each frame from any camera can produce 3D data that is defined in a single universal coordinate system, there is not a need to have camera synchronization, or overall camera control or complicated calibration or complex photogrammetry math. The smart cameras and VOs can even have differing operating systems. In some cases, a new user can walk into a room and immediately add 3D data to a central room computer using camera data from her smart phone. Rather than have a central computer that organizes and controls the array of smart cameras, this method allows data to come from any source and after a quick analysis either use or discard the data.

A method is disclosed for tracking an object position in a 3D space. The method includes providing at least one target on one object and a 3D space. The target includes a plurality of sub-targets arranged in at least one linear sequence. The method further includes providing a camera in a 3D space. The method uses 2D position of the target in a camera image frame taken by the camera and target data in a database to determine the 3D coordinate position of the one target in the 3D space.

In one aspect, the sub targets are rich color transition sequences having centers substantially arranged along a best fit central line through all of the sub targets in one sequence on one target In one aspect, the at least one target includes a pair of linear sub-target sequences orthogonally arranged with respect to each other. The pair of linear sub-targets sequences are co-linear and co-planar to each other. The pair of linear sub-targets may be formed of at least one of an iron cross and a carpenter square.

In the method, a computing devices processor is associated with the camera in 3D spaces provided. The processor accesses a database containing the IDs of the sub-target sequences used in the 3D space to determine the ID of the at least one target captured in the camera image frame.

The processor transforms the 2D coordinate position of the at least one target identified in a camera image frame into the 3D coordinate system of the camera.

In one aspect, the at least one camera is communication coupled to a room computing device associated with the 3D space. The room computer device transforms the 3D coordinate system of the camera and all target positions identified in a camera image frame into a single 3D coordinate system for the 3D space.

An object tracking apparatus for tracking the position of an object in 3D space is also disclosed. The apparatus includes at least one target carried on one object in a 3D space. The target includes a plurality of unique sub-targets. A camera is disposed in the 3D space. A computing device is coupled to the camera and accesses a database of target IDs along with location of the target in a camera image frame taken by the camera to determine the 3D coordinate position of the one target in the 3D space.

The sub-targets can be rich color transition sequences having centers substantially arranged along a best fit central line through all of the sub targets in one sequence on one target.

In one aspect, the at least on target includes a pair of sub-targets orthogonally arranged with respect to each other. The pair of sub-targets can be co-linear and co-planar to each other. The pair of sub-targets can be one at least one of an iron cross and a carpenter square.

A computing devices processor can access the database containing the IDs of a plurality of targets disposed in a 3D space to determine the ID of the at least one target captured in the camera image frame. The processor transforms the 2D coordinate position of the at least one target identified in the camera image frame into the 3D coordinate position of the camera.

The processor accesses a database containing the IDs of a plurality of targets disposed in the 3D space to determine the ID of the at least one target captured in the camera image frame. The processor transforming the 2D coordinate position of the at least one target identified in the camera image frame into the 3D coordinate system of the camera.

The at least one camera is communication coupled to a room computing device associated with the 3D space, room computing device transforms the 3D coordinate system of the camera and the 3D coordinate position of the at least one target identified in a camera image frame by the at least one camera into a single 3D coordinate system for the 3D space At least one target on one object in the 3D space includes at least one unique target of a plurality targets on a different one of a plurality of objects in the 3D space. The processor associated with the camera in the 3D space accesses a database containing the IDs of the plurality of targets used in the 3D space to determine the ID of at least one target captured in the camera image frame. The processor transforms the 3D coordinate position of the at least one target identified in the camera image frame into the 3D coordinate system of the camera.

The method also includes one computing device communication coupled to another computing device, the other computing device transforming the 3D target coordinates in the one computing device coordinate system to the 3D coordinate system of another computing device.

The room computing device may also track movement of an object through a plurality of camera image frames in the 3D space in the 3D coordinate system of the room computing device for the 3D space.

BRIEF DESCRIPTION OF THE DRAWING

The various features, advantages and other uses of the present method and apparatus for implementing the multi-camera tracking using target sequences will become more apparent by referring to the following detailed description and drawing in which:

FIG. 9-19 are pictorial representations illustrating the progressive results of the processing steps of the Rich Color Transition Curve method from an original image with multiple objects and targets with color components to a single sought after target;

FIGS. 22 and 23 are pictorial representations showing examples of data sets used to fine transition points, build transition curves, and find targets.

FIG. 25 is a sample table showing the contents of a target sequence database.

FIGS. 27A and 27B are pictorial representations of a method showing how to determine the relative location of an object using an image on a tablet screen;

DETAILED DESCRIPTION

Figure 1:
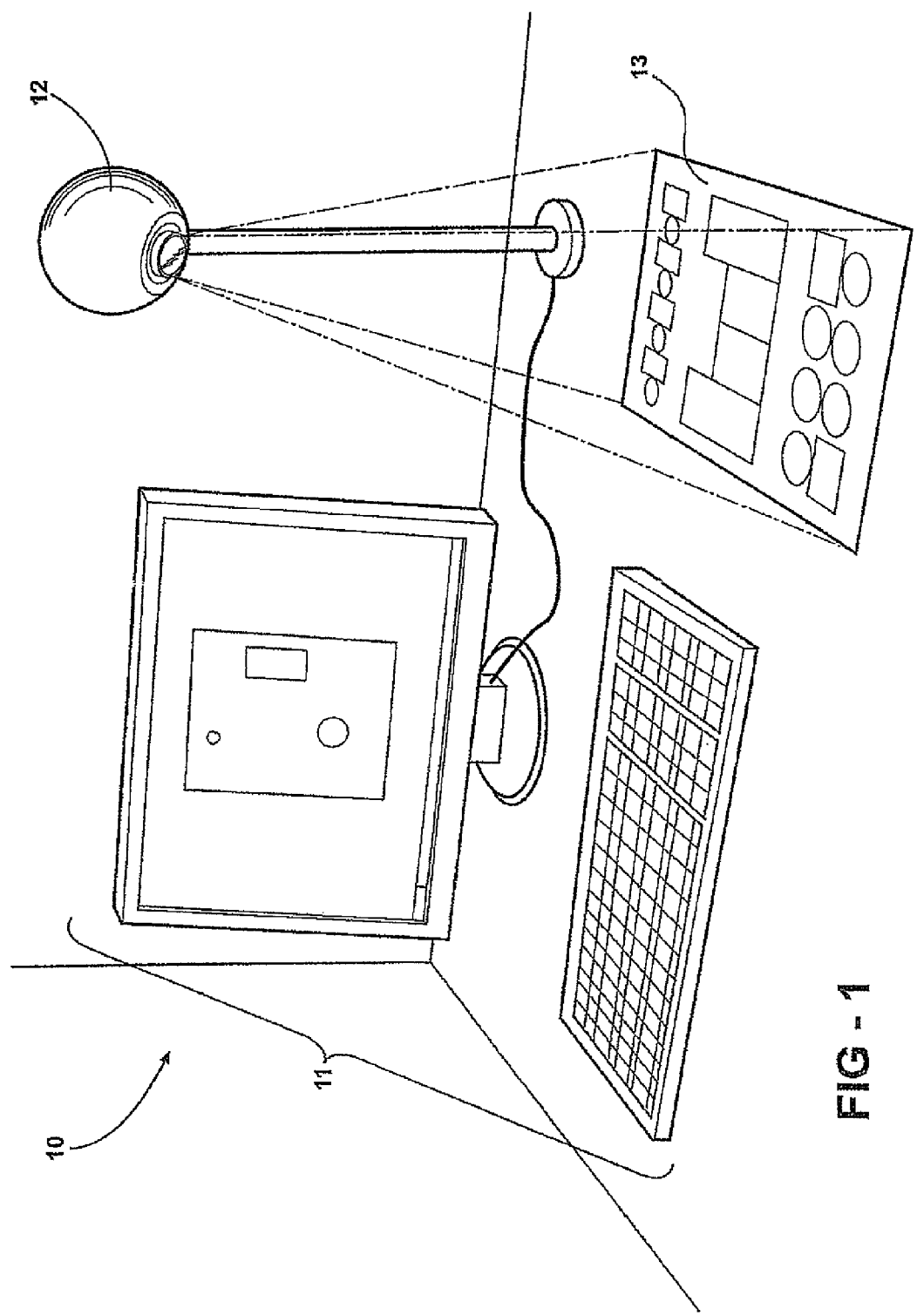
FIG. 1 illustrates a computer vision system which performs color identification.

FIG. 1 illustrates one aspect of a computer vision system 10 that performs color identification. The computer vision system 10 may include a computer system 11, a color camera 12, such as a webcam, and a field of view 13. The computer system 11 may include one or more processors, a memory medium, monitor, and input devices, such as a keyboard and mouse and any other components necessary for a computer system. The computer system 11 also includes one or more software programs operable to perform color identification function. The software programs may be stored in a memory medium, such as a DRAM, SRAM, EDO RAM, etc., or a magnetic medium such as a hard drive, DVD, CD, or floppy disk. The computer system 11 is broadly defined to encompass any device, having a processor which executes instructions from a memory medium, such as a personal computer, workstation, mainframe computer, network appliance, internet appliance, personal digital assistant (PDA), cell phone, iPod, etc.

The color camera 12 can be an inexpensive webcam. The color camera 12 may comprise an image sensor such as a "Charged Coupled Device" (CCD) or "Complementary Metal Oxide Semiconductor" (CMOS). The color camera 12 may be connected to the computer system 11 USB port either through a wire or wirelessly. The cameras and the computer do not have to be collocated; they might even be 2000 miles apart. The color camera 12 may be attached to a flexible stand or clipped on a monitor to point at a particular field of view 13. The output of the color camera 12 is usually the values in 256 discrete levels of each of three color-components, red, green and blue (R, G, B), for each pixel of a target image in the field of view 13. The pixel-by-pixel color information of the target image is fed to the computer system 11 for each frame and this information is repeated on a continuous basis depending on the refresh rate of the color camera 12. The way the color information is processed by the software program of the computer system 11 is explained in details below.

The color identifying method can identify six (three factorial) colors; red, green, blue, yellow, cyan, or magenta with the use of three-component color camera 12 as well as black and white for a total of eight colors. With the advance of the four-component color cameras, 24 (four factorial)

colors or a total of 26 colors including black and white can be identified. The present method identifies the colors of interest on a target image accurately under varying light and image conditions.

As a first step, the method receives the output information of the camera expressed in (R, G, B) values of color components of each pixel. The largest color component is then identified and all three color-components (R, G, B) are divided by this value. It is important to note that the largest color component may be different from pixel to pixel and is not an overall or fixed maximum. In this way, the present method creates a new color space called "Ratio Space". The components of the ratio space (r, g, b) are such that the largest component is always and the other two components may be 0 or 1.0 or a value between 0 and 1.0.

From this point on, the method processes the color information from each pixel in ratio space values (r, g, b). Next, the ratio space values (r, g, b) are put to a "Threshold Test". If the values pass the threshold test then the information is identified as a "rich" shade of the color of interest. The present method departs from the prior art in that the prior art tries to identify every shade of a color on the target image by matching that color to an elaborate library of reference color images or templates. The improved method effectively and accurately identify "rich" shades of a color of a target image from the "pale" shades of a color under varying light and image conditions. Once the relevant pixels are identified as "rich" shades, the adjacent pixels are clumped together to form blobs and these blobs are then filtered by geometric characteristics such as shape, size, location, orientation, etc.

The method then keeps track of the information of a target image from one frame to the next. Any changes in the target image from one frame to the next or succession of frames can be used as an interaction between the user and computer. This interaction can be in the form of performing certain tasks or initiating applications or feedback, thus making the camera a convenient interface for the user. Thus, the first step in tracking is filtering out of the clutter of the target image all but a specific rich color. Next, this simple image is filtered to find blobs of this color with specific shape and size. This step is repeated for other specific rich colors. And finally, a target or set of targets of that are geometrically related to each other can simply be identified and used to trigger a computer action.

The threshold test is carried out in a "Distance" equation defined below. The distance equation converts color information from each pixel, in ratio space values (r, g, b), to "achromatic" color information (black, gray, or white) between 0 and 255 or more preferably to "binary" information black or white (0 or 255). The method creates a "Filter" by combining the threshold test into the distance equation and accomplishes to reduce the color information of a target image into a binary output, black or white. Black represents the color information that passed the threshold test as a "rich" shade of a color of interest or "target" and white represents the color information that failed the threshold test as a "fade" shade of a color or "unidentified" color. Thus, with a three-component color camera, the method can separate a target image into 6 regions of distinct colors.

The distance equation employs a "Scale Parameter" (S). The scale parameter is usually a very large number and set to a "negative" value for the primary component(s) of the color of interest so that it operates in the opposite direction to the "Threshold Value" (T). The distance equation also employs a function called POS (q) and POS (q)=0 if q≤0 else POS (q)=q. The distance equation is defined as follows in terms of ratio space color component values (r, g, b):

$$Dist=POS(Sr*(r-Tr))+POS(Sg*(g-Tg))+POS(Sb*(b-Tb))$$

Exemplary threshold values and scale parameters for 6 colors of interest are as follows:

RED: Tr=1.0, Tg=0.8, Tb=0.8 Sr=−1000, Sg=1000, Sb=1000

GREEN: Tr=0.8, Tg=1.0, Tb=0.8 Sr=1000, Sg=−1000, Sb=1000

BLUE: Tr=0.8, Tg=0.8, Tb=1.0 Sr=1000, Sg=1000, Sb=−1000

YELLOW: Tr=0.95, Tg=0.95 Tb=0.8 Sr=−1000, Sg=−1000, Sb=1000

MAGENTA: Tr=0.95, Tg=0.8, Tb=0.95 Sr=−1000, Sg=1000, Sb=−1000

CYAN: Tr=0.8, Tg=0.95, Tb=0.95 Sr=1000, Sg=−1000, Sb=−1000

The method can also determine the achromatic colors such as black and white when all three color components in ratio space (r, g, b) are 1.0 or nearly 1.0, if so by looking at the original (R, G, B) values being (large) above a white threshold or (small) below a black threshold.

For a given pixel of color information, if the output of the distance equation is 0 then that color passes the threshold test, if the output of the distance equation is anything but 0 then that color fails the threshold test.

The following example demonstrates how distance equation filters the color information from the camera output to binary color information:

Example 1

Consider two pixels with the following components: Pixel 1: (R, G, B)=210, 50, 40 and Pixel 2: (R, G, B)=210, 190, 80

In ratio space values: Pixel 1: (r, g, b)=1.0, 0.238, 0.190 and Pixel 2: (r, g, b)=1.0, 0.904, 0.381, then the distance equations for Pixel 1 and Pixel 2 become:

$$Dist\ 1=POS(-1000*(1.0-1.0))+POS(1000*(0.238-0.8))+POS(1000*(0.190-0.8))=0+0+0=0$$

$$Dist\ 2=POS(-1000*(1.0-1.0))+POS(1000*(0.904-0.8))+POS(1000*(0.381-0.8))=0+10.4+0=10.4$$

The result of distance equation Dist 1 is "0", i.e., Pixel 1 passes the threshold test and is identified as a rich shade of red and the output of the filter is set to black. On the other hand, Pixel 2 does not pass the threshold test and is categorized as a fade or pale shade or unidentified color, therefore, the output of the filter is set to white (i.e. 255).

There are several ways for defining a filter and setting threshold values. For example, a pixel representing a green color might register the following values in the ratio space: (r, g, b)=0.45, 1.0, 0.55. A filter can be constructed such that anything with Tr≥(1.45/2) or Tg≤1.0 or Tb≥(1.55/2) is rejected by the filter. This threshold is called the "half-distance-value" to the primary color component (1.0).

The method can be enhanced to handle cameras that are not calibrated correctly for the ambient lighting. This requires a preprocessing phase that consists of the following steps: First, identifying the component bias of each color component (R,G,B). This can be done by red, green, blue targets or a set of known black blobs and identify the lowest component values of each of these colors. Subtract each of these three values from their corresponding component in each pixel of the entire image. Second, multiply each R,G,B value of every pixel in the image by a single scale factor so that the entire image brightness is enhanced to compensate for the brightness that was subtracted. For the ratio signature space, this step is unnecessary since the ratio cancels out any factor that is common in both the numerator and the denominator.

To provide successful commercial applications in color identification, the method should be very robust in every lighting condition. A field of view might be under direct sunlight, in a shadowy room, or under incandescent lights during evening, etc. The strength of the method in identifying color particularly in challenging lighting environments comes from the "Ratio Space". The ratio space has an impact on finding targets and colored objects in a typical environment for commercial and consumer applications. The following example illustrates this point:

Example 2

The camera output might register (R, G, B)=0.6, 0.8, 92.8 and (r, g, b)=0.006, 0.008, 1.0 for a blue spot over a sunny part of the field of view or (R, G, B)=3.2, 14.3, 63.5 and (r, g, b)=0.05, 0.225, 1.0 over a shadowy region of the field of view. The camera output for a red spot might register (R, G, B)=99.6, 0.4, 0.4 and (r, g, b)=1.0, 0.004, 0.004 over a sunny part of the field of view or (R, G, B)=64.7, 17.8, 4.6 and (r, g, b)=1.0, 0.275, 0.07 over a shadowy region of the field of view. While the original (R, G, B) values might fluctuate significantly from sunny regions to shadowy spots of the field of view, the ratio space values make it easy to identify the color of interest.

Another advantage of the present method in identifying color is the ability to optimize the "camera parameters" for varying lighting conditions. Camera parameters such as: gain, brightness, contrast, saturation, sharpness, white balance, backlight compensation, etc. can be optimized for a given field of view and the accompanying lightning conditions. The method accomplishes this optimization by going through a calibration process for a known field of view as a preprocessing step. Once the camera parameters are optimized for a given field of view, the method is ready to launch.

The field of view 13 for the present method can be anything that the camera 12 is pointing at. The camera 12 can be pointing at a desktop such as in FIG. 1, and in this case, the field of view 13 can be a plain sheet of paper, a book, an object, etc. The camera 12 can be pointing at a person or people in front of the computer, or a scene with items or objects in it. The field of view 13 can be a screen or whiteboard that the camera 12 is pointing at. Further, the target image that is processed by this method can be the entire field of view or part of the field of view such as an "area of interest". For example, not every item or object in the field of view might be changing from one frame to the next. In this case, the target image might focus on the section of the field of view that might be an area of interest.

It should be by now obvious to one skilled in the art that the present method can be used in a variety of consumer and commercial applications. One aspect of creating consumer friendly applications using the method is the ability to identify color effectively under varying lighting conditions in the field of view of a camera. The monitoring and tracking changes in the field of view of a camera lead to potential uses not only in traditional machine vision applications but also open up consumer applications with the use of inexpensive webcams.

Figure 2:
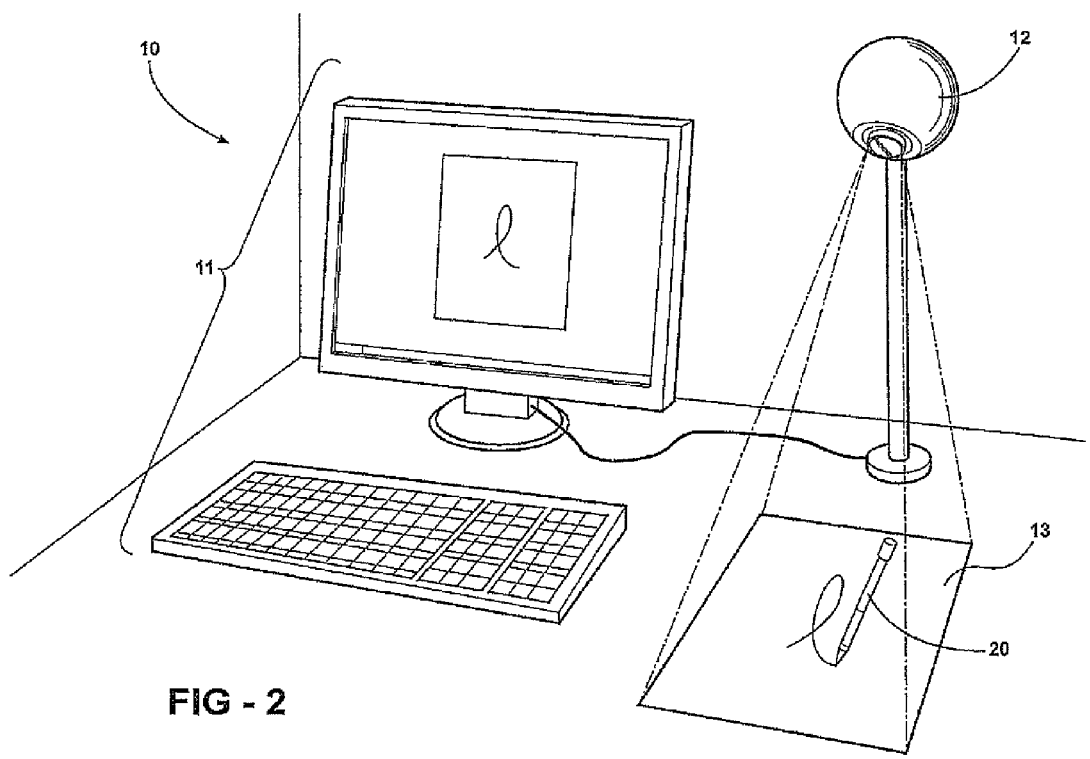
FIG. 2 illustrates a computer vision system that performs color tracking.

FIG. 2 illustrates a computer vision system that performs color tracking according to one aspect of the present method. An application of the present method is given in FIG. 2 as an example for tracking an object or target 20, such as a pen, in the field of view by identifying relative locations of colored sections of this object. Tracking of simple objects such as a pen or finger in a field of view can be used as an alternate input device for computer aided design and drawing CAD) applications.

Another aspect of the present method is based on locating a set of points that transition from a patch of one type of Rich Color to an adjacent patch of a different type. Whenever possible these points are strung together to form a chain which is referred to as a Rich Color Transition Curve. This method can be used to detect and locate targets in an image, to distinguish one target from another, to define target properties, or filter data. The image is typically, but not always, in the field of view of a camera or cameras. The target properties can be compared to a database and then used as an interface to a computer for machine and computer applications.

This aspect also relates to a triggering mechanism or mechanisms by identifying Rich Color Transition Curves, combinations of Rich Color Transition Curves and Rich Color boundaries along with their colors, orientations, positions, and motion (both speed and acceleration) combined with a computer or machine interface which allows the method to be used for consumer or industrial applications.

DEFINITIONS

Color component—the color components $C_n$ where $1<=n<=N$ that make up an image. In the most common case $N=3$ and $C_1$=Red, $C_2$=Green, and $C_3$=Blue.

Ratio Color component—the Ratio Color components $c_n$ for a pixel where $1<=n<=N$ are obtained from the input colors $C_n$ as defined by $c_n=C_n/C_H$ where $C_H$ is the largest component of this pixel.

Type or ID—most of the terms defined in this section have an associated identifying number or ID.

Rich Color—A color made up of 1 or more color components that are much larger than the remaining color components as typically defined by the Rich Color Filter equation for a filter type "m" color distance equation. For a pixel located I, j the color distance equation is defined as follows in terms of ratio space color component values ($c_1$, $c_2$, ... $c_N$): $A_m=POS(B_{1,m}*(f(c_1)-T_{1,m}))+POS(B_{2,m}*(f(c_2)-T_{2,m})) ... +POS(B_{N,m}*(f(c_N)-T_{N,m}))$ Where, for color component n and color filter type m, $T_{n,m}$ is a color threshold, $B_{n,m}$ is the Bias, and the function POS (A) such that POS (A)=0 if A is less than or equal to 0, ELSE POS (A)=A. The function $f(c_n)$ can simply be any function that emphasizes Rich Color for example $f(c_n)=[E_1*c_n]+E_2$ or it might be $f(c_n)=[E_1*c_n*c_n]+[E_2*c_n]+E_3$ for input parameters $E_1, E_2, E_3$. Typical Rich Color Filter Parameters ($T_{1,m}$, $T_{2,m}$, $T_{3,m}$, $B_{1,m}$, $B_{2,m}$, $B_{3,m}$) for RGB images are as follows:

Filter type m=1, RED: (1.0, 0.8, 0.8, −1000, 1000, 1000)
Filter type m=2, GREEN: (0.8, 1.0, 0.8, 1000, −1000, 1000)
Filter type m=3, BLUE: (0.8, 0.8, 1.0, 1000, 1000, −1000)
Filter type m=4, YELLOW: (1.0, 1.0, 0.8, −1000, −1000, 1000) Filter type m=5, MAGENTA: (1.0, 0.8, 1.0, −1000, 1000, −1000) Filter type m=6, CYAN: (0.8, 1.0, 1.0, 1000, −1000, −1000).

Enhanced Ratio Color types—The total number of color categories, M, that include both Rich Colors, N factorial (N!), that can be developed from a Rich Color Filter plus Black, and White. Typically N=3 and M=8.

Target Color—a subset of L Rich Colors and possibly Black and/or White that are used to find a target or object in an image such that L<=M.

Rich Color Boundary—The perimeter of a Rich Color patch that separates it from non-Rich colored areas.

Transition Curve—The curve or chain of points or polyline that represents the separation of two Rich Color patches and include Color Pairing data. For simplicity even a single point is referred to as a curve or chain of length one.

Color Pairing—The property of a Transition Curve which identifies a left side color and a right side color as a curve is oriented facing the end point.

Search-line—A row or column or angled line of pixels across the image. A complete set of consecutive search-lines defines the complete image.

Region of Interest (ROI)—rectangular subsection of the image to be studied

Transition Point—The location on a search-line that best defines the transition from a patch of one Rich Color type to a nearby patch of a different Rich Color type.

Figure 3:
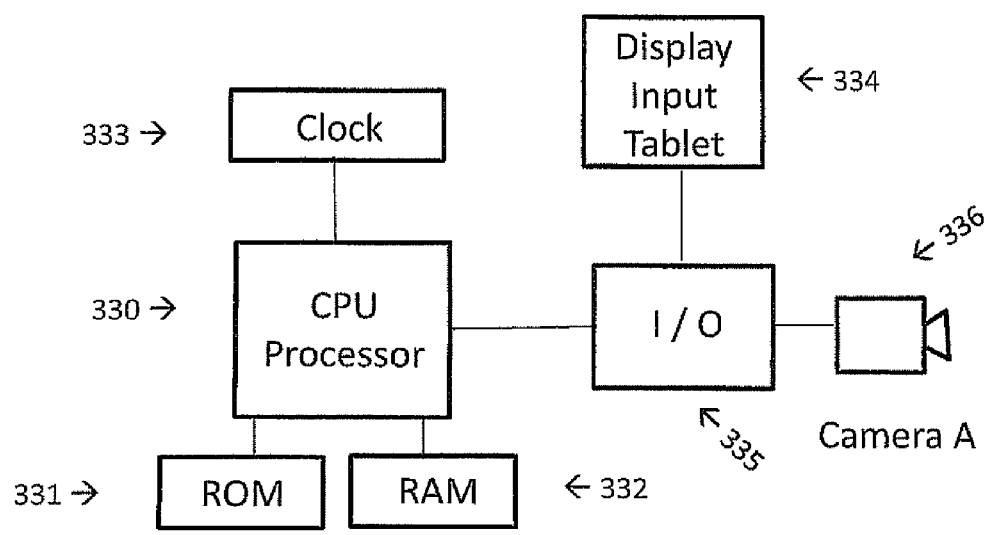
FIG. 3 illustrates the components of a typical computer system used to implement a software version of rich color transition curve tracking.

A block diagram shown in FIG. 3 for a typical computing system, which may include the computer system 11 shown in FIGS. 1 and 2, includes a central processing unit (CPU) or a processor 330. Input/output (IO) circuitry 332 is coupled to the processor 330 and provides an interface to and from the processor 330 from inputs and outputs, such as a display/input tablet 334, or a camera 336. Internally, the processor 330 is coupled to a clock 333 and memory 331, such as ROM memory and/or RAM memory.

The method is embodied in software code on a computer medium which may be portable or a computer medium attachable to the processor 330 for execution by the processor 330 or stored in one or both of the memories 331. The memories 331 maybe external from the processor 330 integral with the processor 330, etc.

The display/input table 334 may be a separate display and a separate tablet or input device, such as a keyboard, mouse, etc.

The display/input tablet 334, whether embodied in a single integrated unit or in separate units, will have appropriate audio output and possibly a microphone input.

It should also be noted that the camera 336 maybe integrated as part of the display/input tablet 334 or as a separate element as shown in FIG. 3. Further, all of the computing device circuitry, such as a processor 330, memory 331, input/output circuitry 332 maybe incorporated internally as part of the camera 336.

Figure 4:
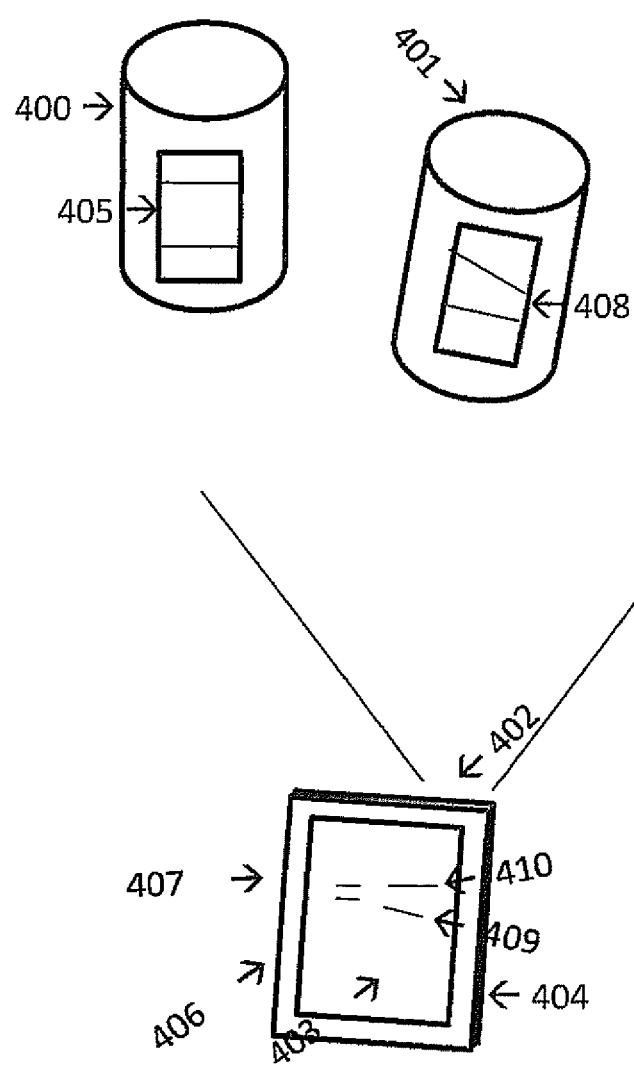
FIGS. 4 and 5 are pictorial representations of Rich Color Transition Curve tracking according to using a Tablet computer or Smart Phone.

FIG. 4 illustrates how Rich Color Transition Curve tracking can be used to develop a Beverage Can Game using a standard tablet computer or smart phone 204. The game, for example, increases or decreases the volume of audio channels for voice, drums, guitar, etc. by tying relative positions and orientations of cans held by different players. Then the tempo or other characteristics can be tied to the absolute positions of the cans. The can 3D positions and orientations (roll, pitch, yaw) are determined by tracking the length, orientation, and other geometric and motion properties from frame to frame of the camera using the methods described in this application. FIG. 4 shows two cans 400, 401 each with a unique target 405,408 that is viewed by a camera 402 that is in a device with a computer (in this case a tablet computer 404 with display 403). The target Rich Color patches are separated by Transition Curves.

Figure 5:
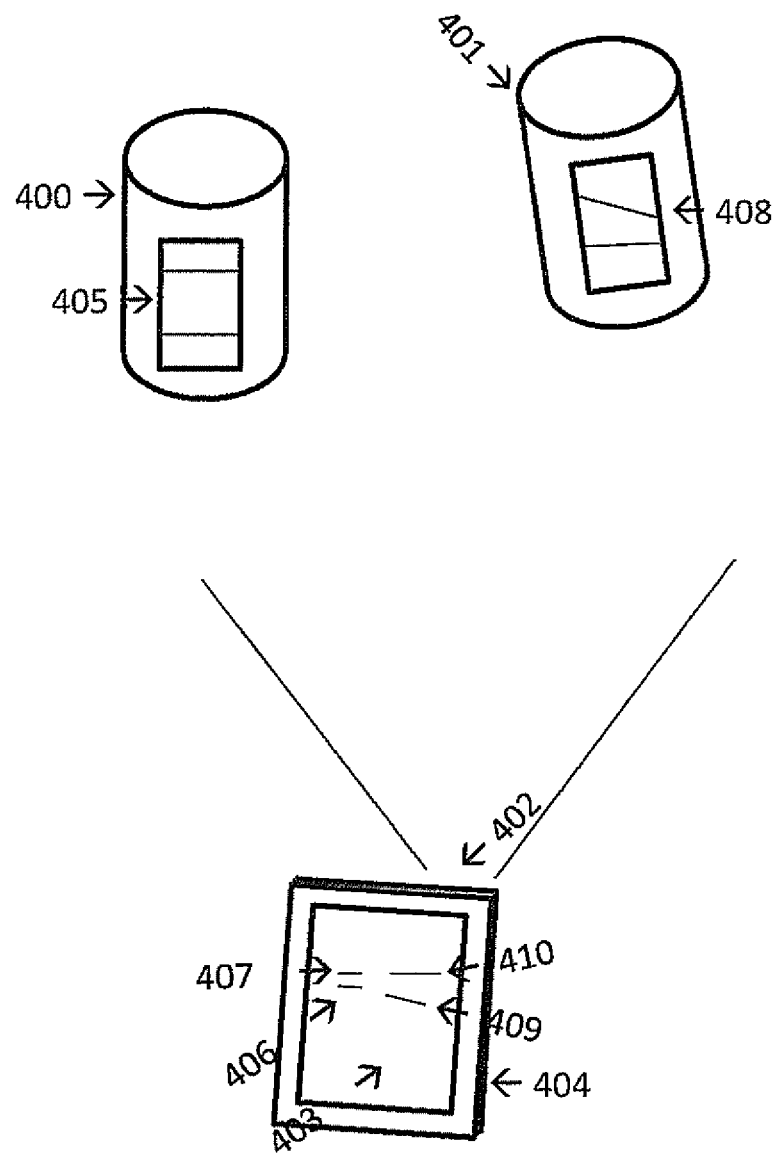

FIG. 5 show the same set of objects one frame later where the cans 400, 402 have moved. The change in overall size of a target in the image can be used to determine the target's distance from the camera. Pitch and yaw can be determined by determining a preferential shrinkage of the target along a polar angle from the center of a target.

Figure 6:
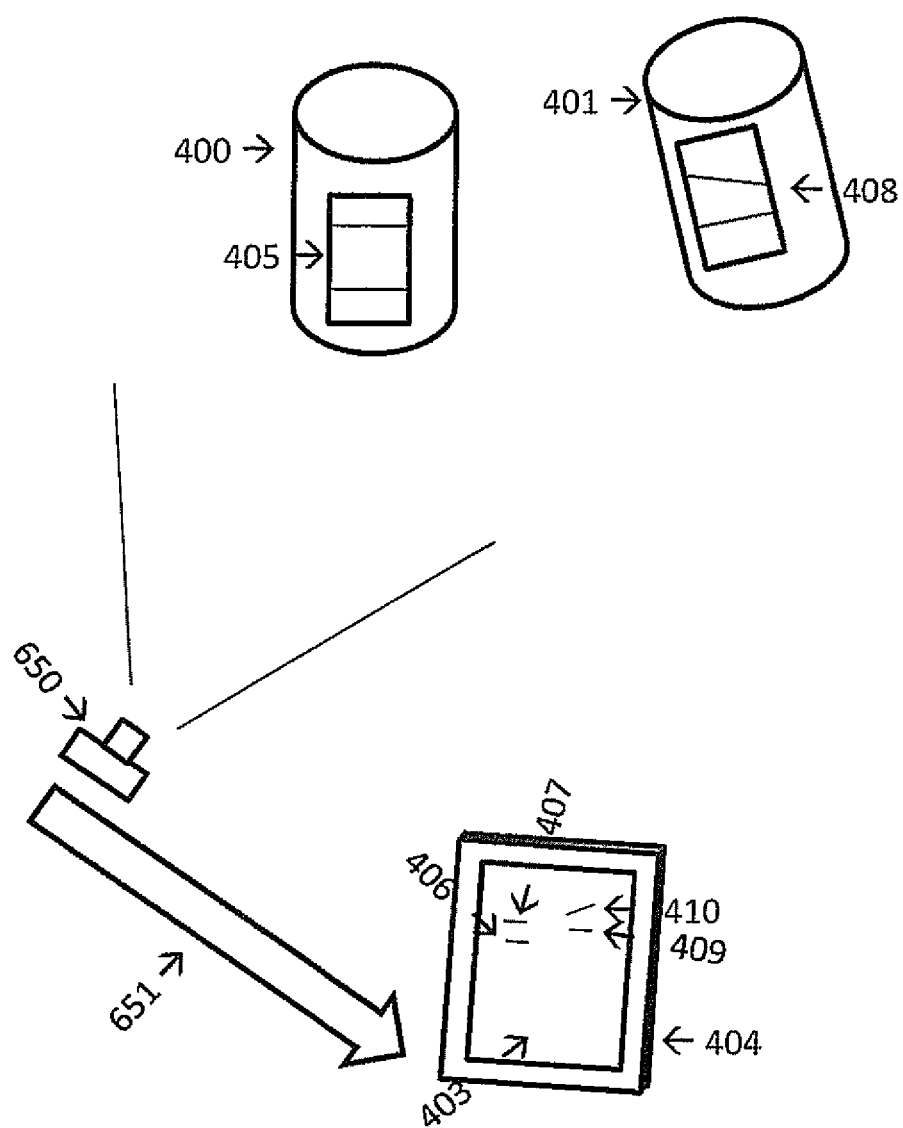
FIG. 6 is a pictorial representation showing the use of cameras implementing the Rich Color Transition Curve method in vision applications.

FIG. 6 illustrates how a camera 650 that has the Rich Color Transition Curve Method built in can be used in vision applications. Wireless communication 651 only has to ship a small set of Transition Curve data for each frame. The central processor or computer 604 can use the transition curves as target signatures and, when targets of interest are detected, a full analysis of the target location and orientation can be conducted.

Figure 7:
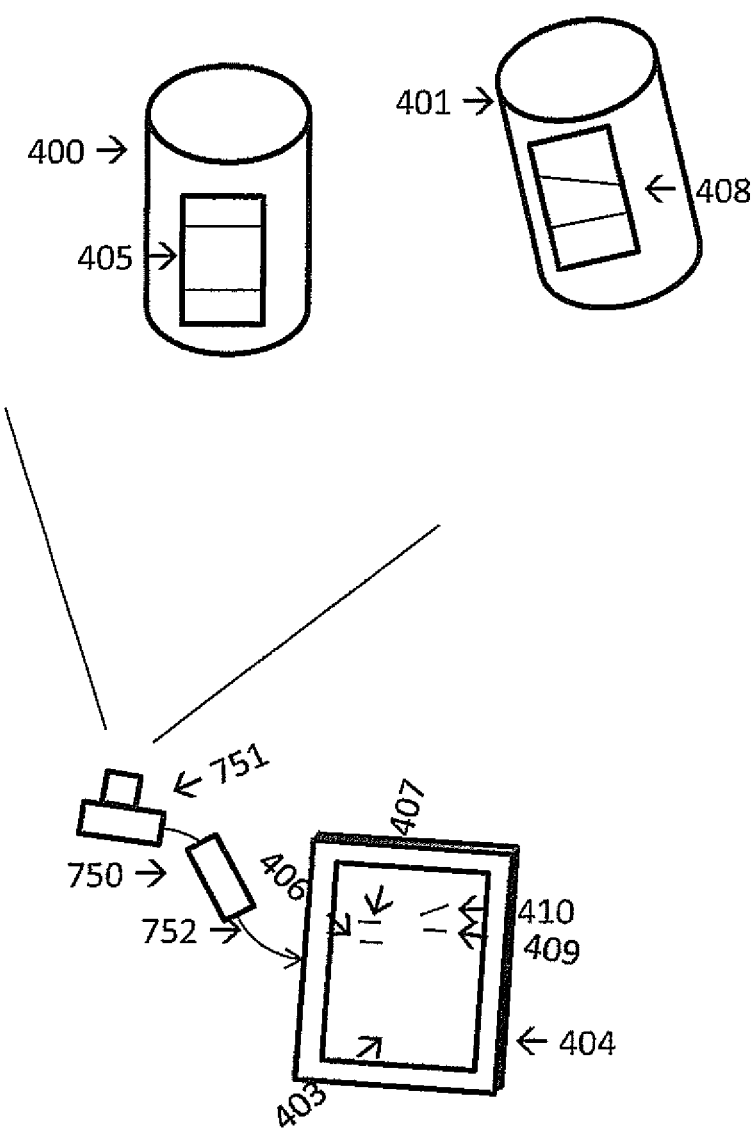
FIG. 7 is a pictorial representation showing how a module containing circuitry utilizing the Rich Color Transition Curve method can be used to upgrade standard video cameras.
Figure 8:
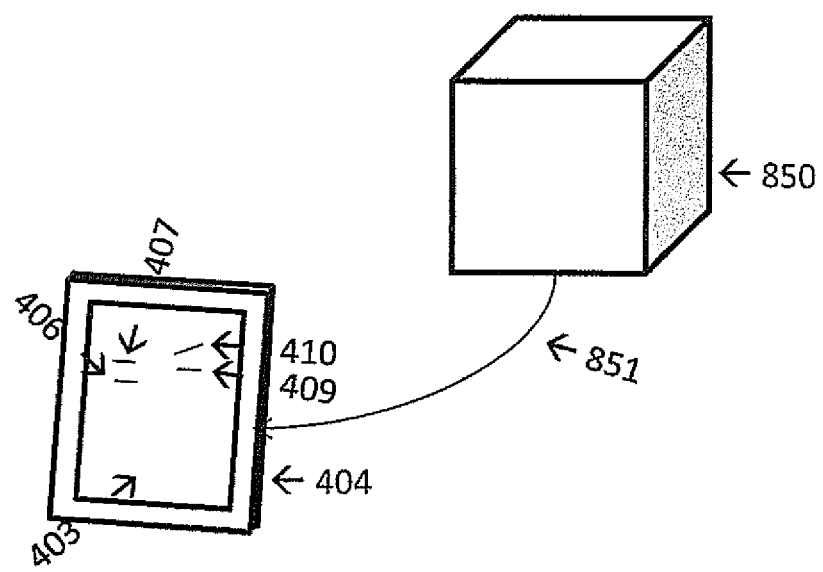
FIG. 8 is a pictorial representation showing image data coming from a data storage device to be analyzed by the Rich Color Transition Curve tracking.

FIG. 7 illustrates how a small module 750 housing simple circuitry embodying the Rich Color Transition Curve Method can be used to upgrade a standard video camera 751. The module 752 is wirelessly or hardwired to the tablet computer 404. FIG. 8 illustrates how the Rich Color Transition Curve Method can be used on an image previously stored in a storage device 850 coupled by the cables 851.

One version of the beverage can game uses the cans to control the sound tracks that make up a song. For instance, the distance of the left beer can from the camera could control the drum volume while that of the right can could control the guitar volume. The variation in time of the left angle could control the tempo and the right angle could control the cow bell volume. The relative distance between the two cans could control a singer's volume. The smartphone (or other camera/computer device) can be manipulated by another player to modify the geometric properties of the targets as tracked by the Rich Color Transition Curves. Furthermore, the targets can be kept stationary, and the camera moved. The path and geometric properties, as well as the speed and acceleration of the Transition Curves in the sequence of video frames can be used to define a predefined macro or computer program or identify a specific database item to be used for with the macro or computer program.

In order to both reduce repetitive language in this description and clearly described the method, consistent numbering is used in FIGS. 9-19 such that the last two digits refer to items in the set of drawings is identified below and the other digits are the Figure numbers:

00—Objects colored in pale colors
01—Reddish colored human face
02—Object colored Rich Red
03—Object colored Rich Green
04—Object colored Rich Blue
05—Rich blue colored sweater
06—Object colored Rich Magenta
10—Target with Rich Red, then Blue, and then Green (also used in FIGS. 19, 20)
11—The Rich Red patch of Target 10
12—The Rich Green patch of Target 10
13—The Rich Blue patch of Target 10
16—Transition Curve between the Rich Blue and then Rich Green patches of Target
17—Transition Curve between the Rich Red and then Rich Blue patches of Target
20—Target with Rich Red then Green and then Blue
21—The Rich Red patch of Target 20
22—The Rich Green patch of Target 20
23—The Rich Blue patch of Target 20
25—Transition Curve between the Rich Red and then Rich Green patches of Target 20.
26—Rich Color Transition Curve between the Rich Green and then Rich Blue patches of Target 20
30—Target with Rich Red at angle then Green and then Blue
31—The Rich Red patch of Target 30
32—The Rich Green patch of Target 30

33—The Rich Blue patch of Target 30
35—Transition Curve between the Rich Red and then Rich Green patches of Target 30
36—Transition Curve between the Rich Green and then Rich Blue patches of Target 30
40—Target with Rich Red then Blue
41—The Rich Red patch of Target 40
43—The Rich Blue patch of Target 40
47—Transition Curve between the Rich Red and The Rich Blue patches of Target
57—Transition Curve between the Rich Red head 01 and the Rich Blue sweater
91—Noise
95—Target 20 center
96—Target 10 center
99—Non-Rich background.

Figure 9:
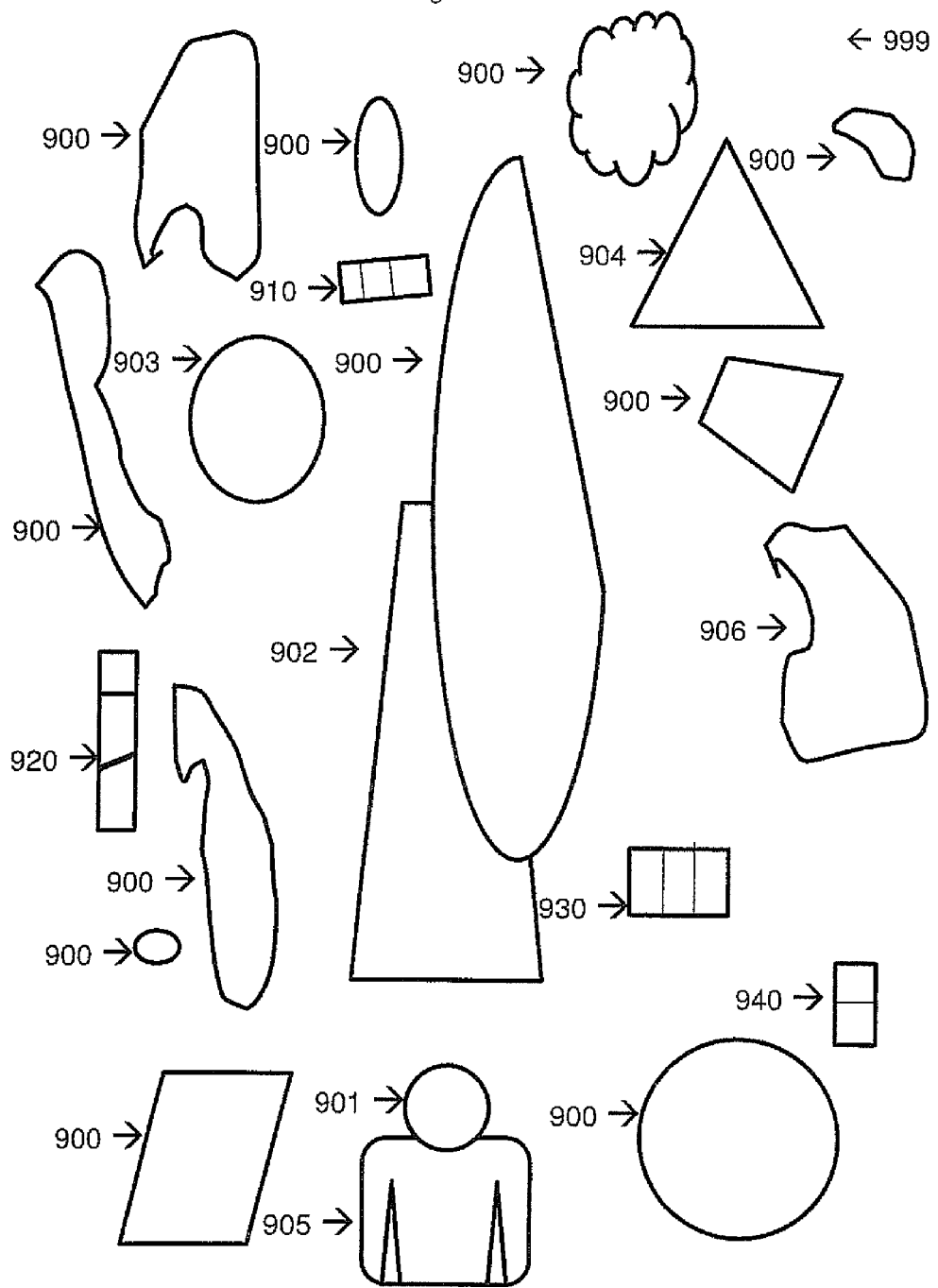

FIGS. 10, 11, 12 and 13 show what would typically remain after respectively applying Rich Color Filters for Red, Green, Blue and Magenta to the original image shown in FIG. 9 assuming good cameras, lighting, and thresholds. If the bias for each color filter was set to a very high value, a binary image would result from each filter step. Invariably filtering in the real world introduces noise artifacts 1091 as seen in FIGS. 10-14.

Figure 10:
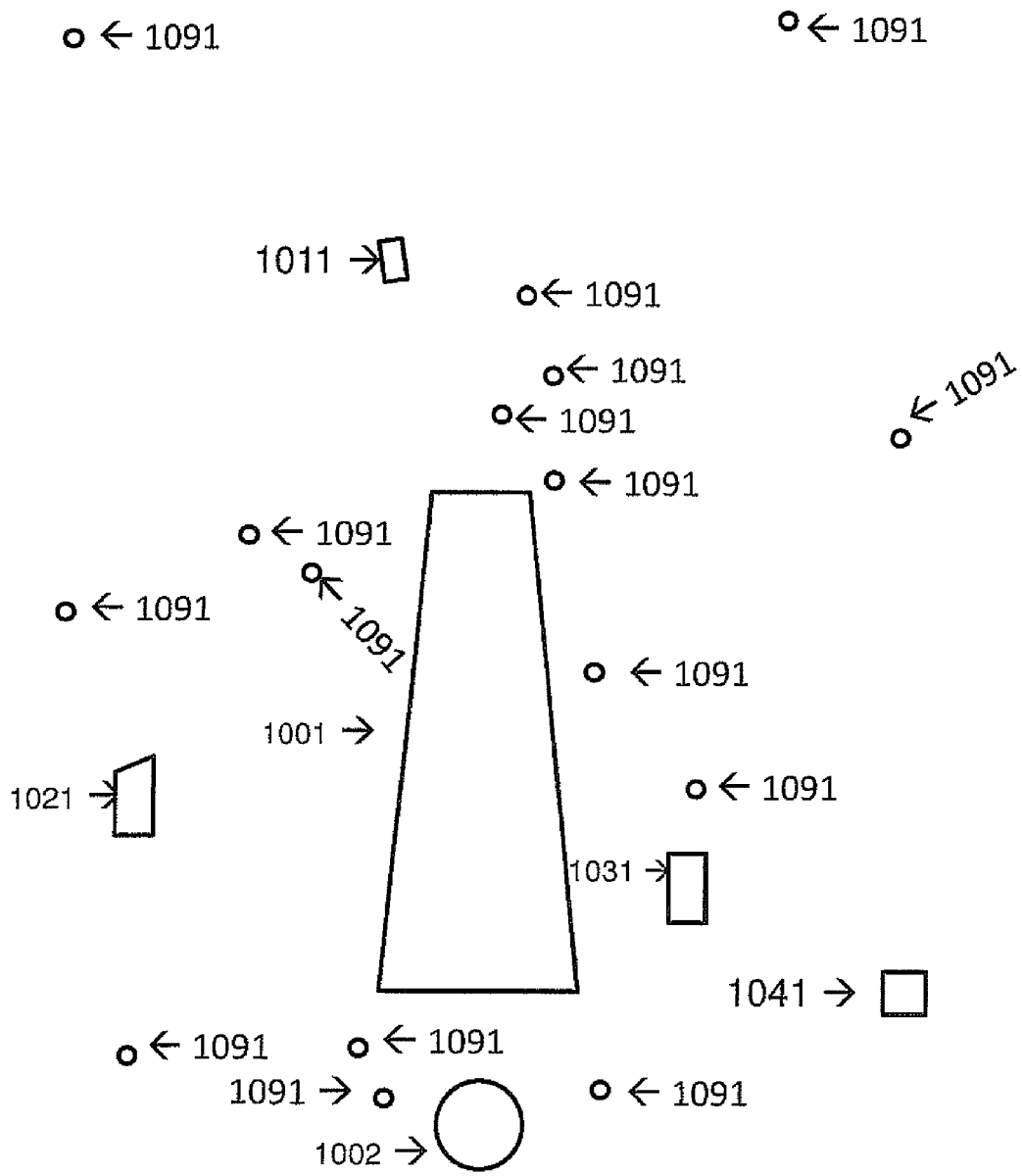
Figure 11:
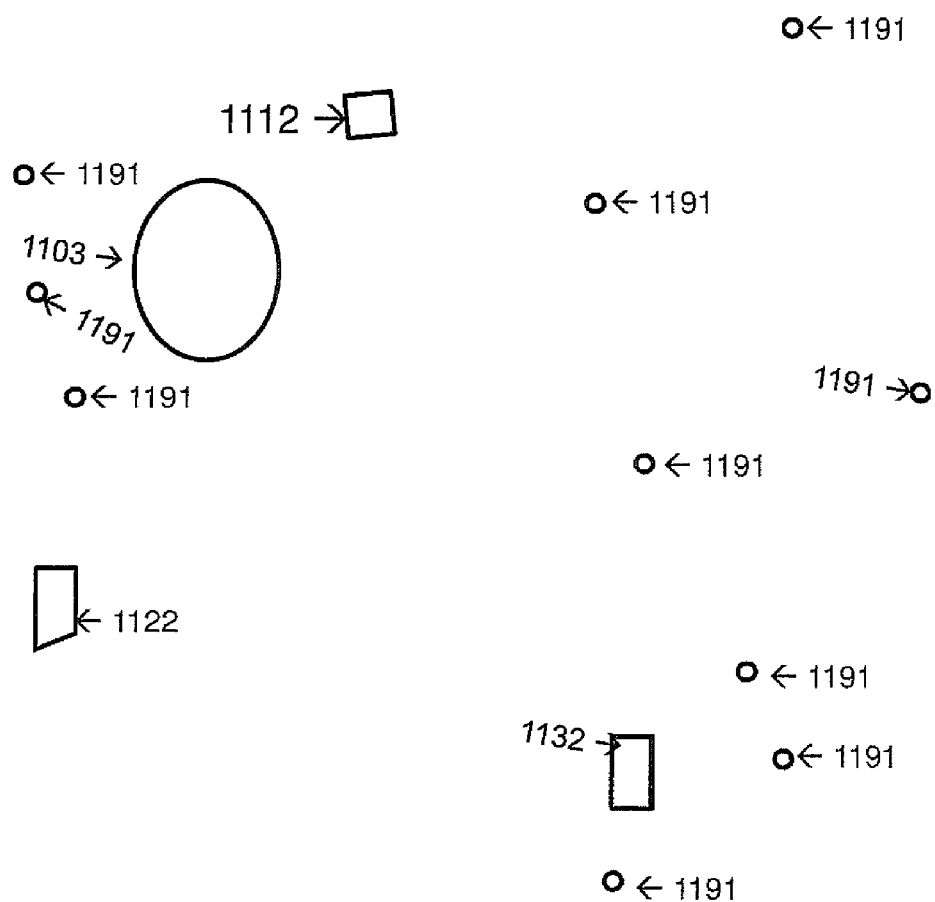
Figure 12:
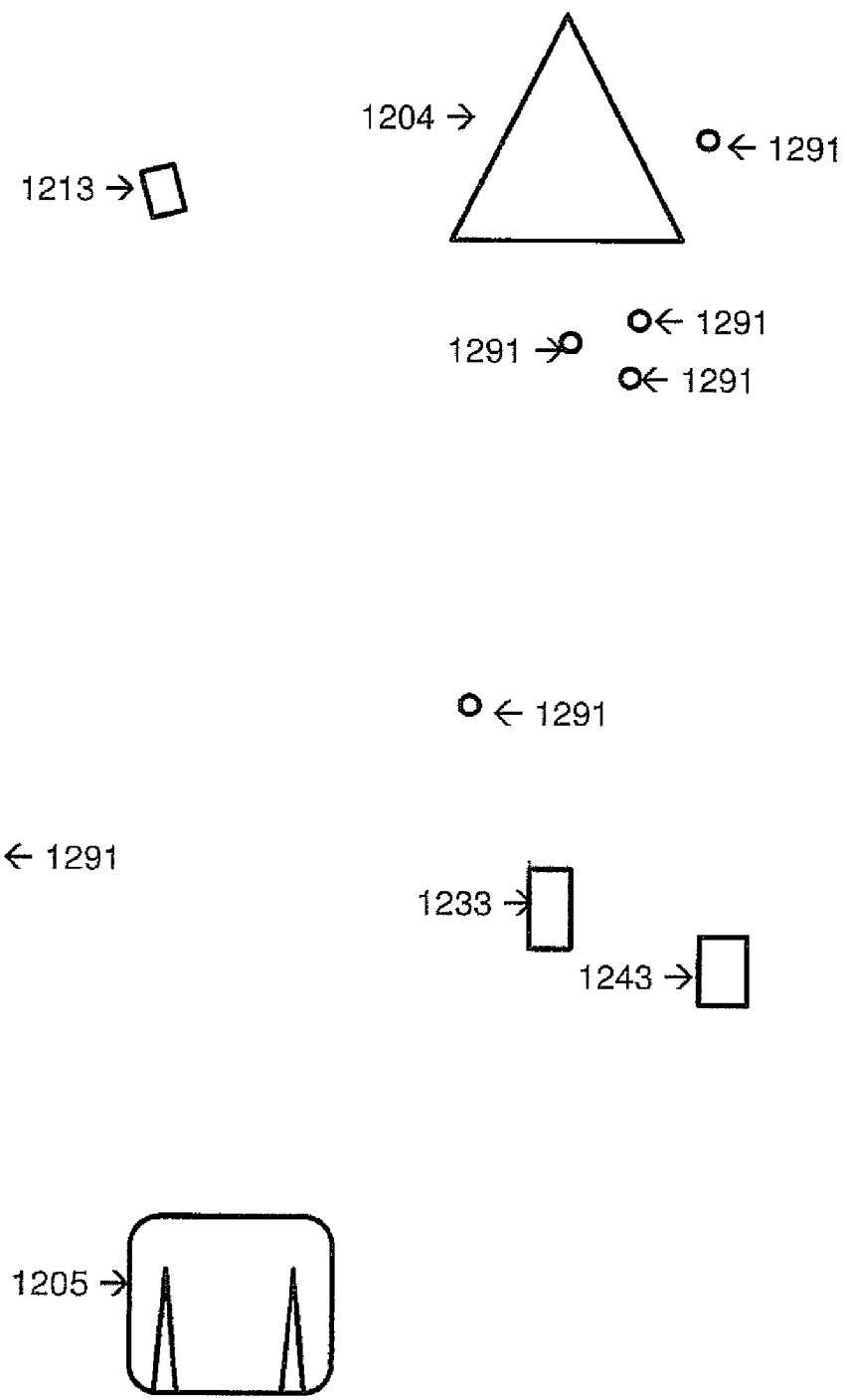
Figure 13:
Figure 14:
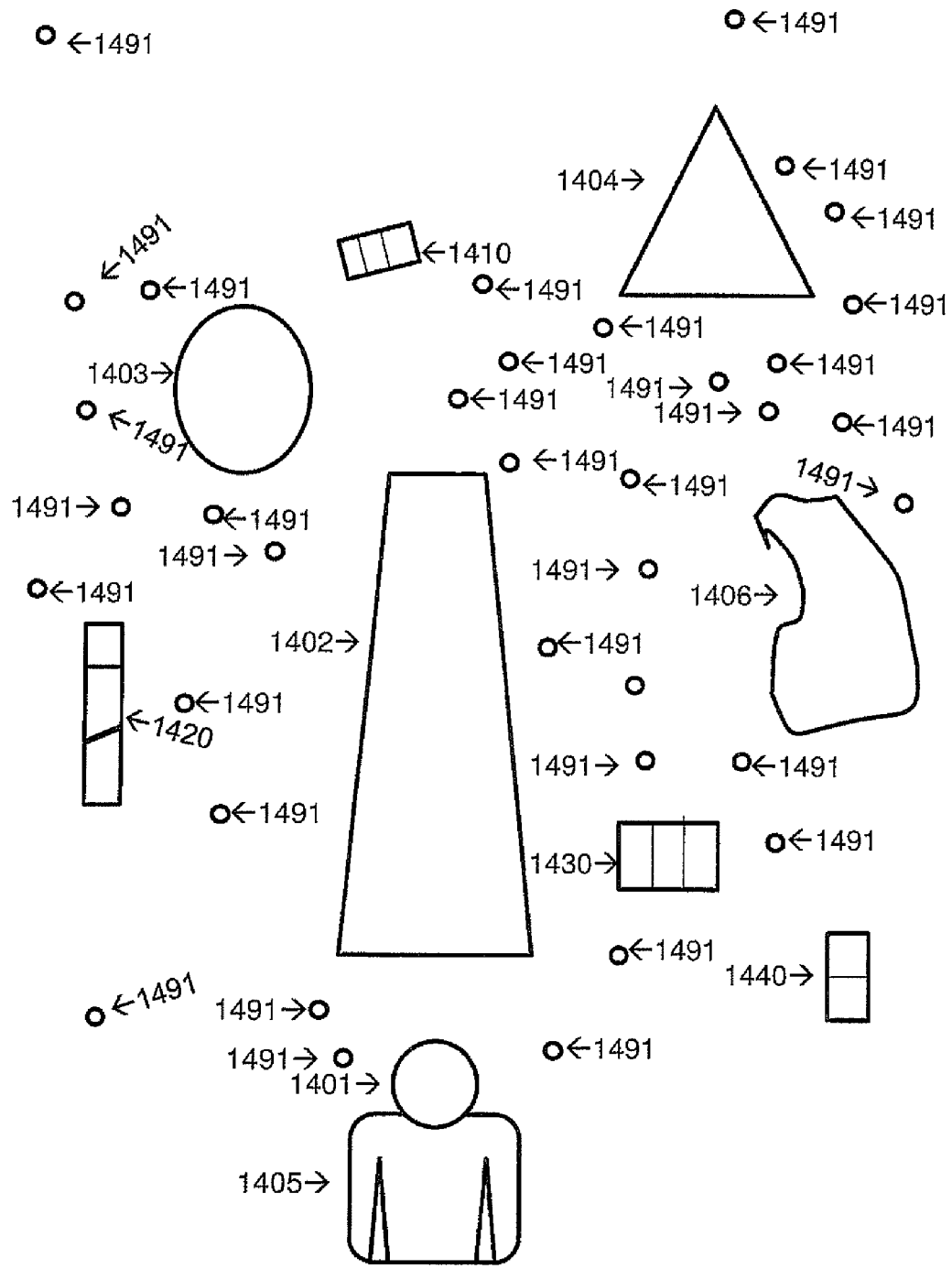

FIG. 14 shows a composite monochrome image that is created from images shown in FIGS. 10, 11, and 12 such that Red pixels have a value of 1, Green 2, and Blue 3 (since the Rich Green and Rich Blue Binary Filtered images were multiplied by 2 and 3 respectively before added to the Rich Red Binary Filtered images) while everything else has a value of 0.

Figure 17:
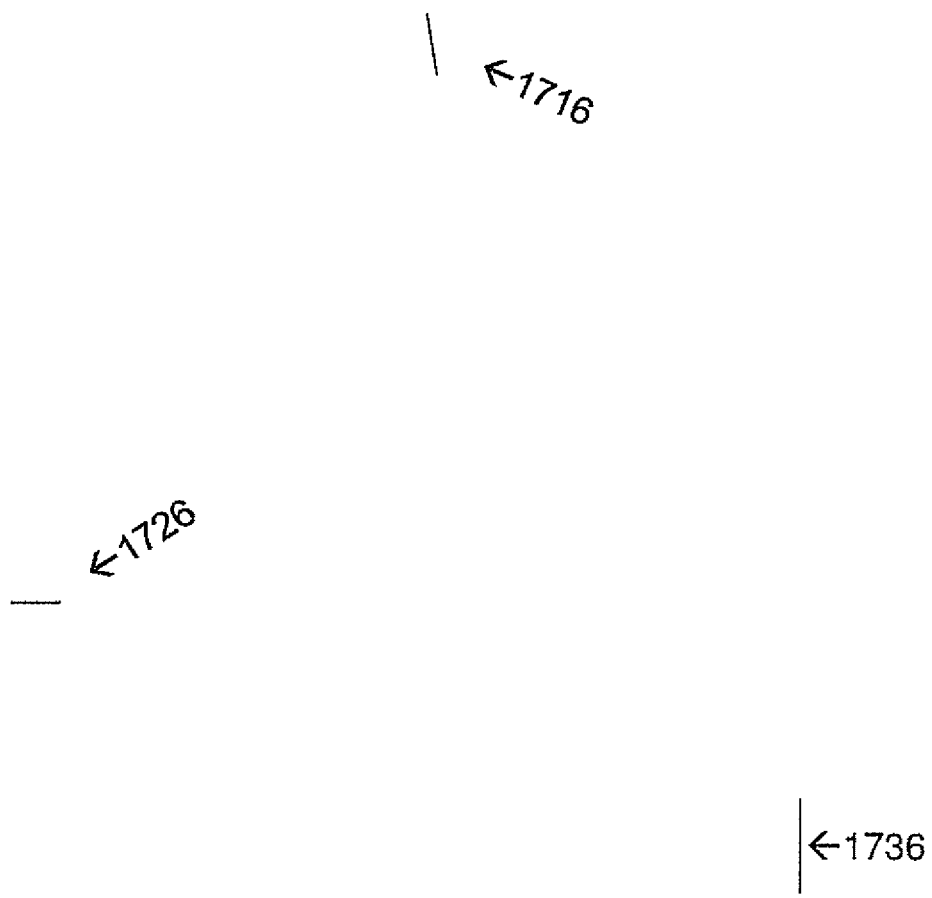

FIGS. 15, 16, and 17 show the results of passing the images from FIGS. 10, 11 and 12 through a Rich Color Transition Curve Finder for Red/Green Transition Curves, Red/Blue Transition Curves, and Green/Blue Transition Curves respectively. The Transition Curves that separate patches of Rich Color from each other are then identified first as points that are then strung together into Transition Curves. These curves have additional characteristics of a start and end as well as a left side color and a right side color which is referred to as "Color Pairing". Color Pairing is very useful in identifying which Transition Curves belong to which targets. The geometry and color characteristics of each line are then stored and compared to a target database.

The relative size, distance apart, number of Transition Curves, shape, orientation, color pairings, orientation of the color pairing, and other characteristics are used to identify a specific set of targets from other data. This should be a simple task since the remaining Transition Curves can be few compared to the original challenge of 1M or more of unassociated pixel data.

Figure 18:
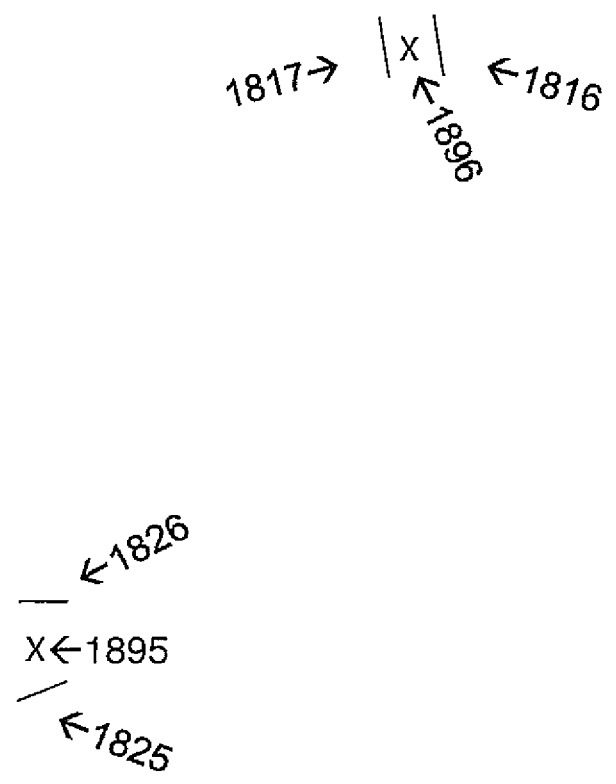

FIG. 18 shows four Transition Curves remaining after database identification leading to two targets. Two separate search techniques are presented in this one figure. The target on the lower left (original target 920 in FIG. 9) was found using the database to find a target with Transition Curves 1825 and 1826 that have the correct color pairing and relative angle to each other. The geometric center of these two Transition Curves is designated as 1895. The method used to find the second target (original 910 in FIG. 9) is the inline method that is described below in FIG. 20-23. FIGS. 22 and 23 show how the first two points of each of the two Transition Curves (1816, 1817) that come from target 910 are found. This method is well suited for hardware implementation.

FIG. 19 shows that the target is identified additional information can be gathered from the database or searched for in a region around the target or from the inline method itself. The size, orientation, and location of this region can be calculated from the geometric information gathered from the Transition Curves together with database search parameters for the given target. If the database had physical information such as mass and moment, then forces and other physics can be computed from video images. Finally, the target database can contain information on which hardware can be turned on or off or which software programs can be run and what parameters can be used to operate these programs.

By repeating the method with different threshold and camera parameters and then comparing the results with expected results of known targets for a fixed target and environment, it is possible to optimize the camera and threshold parameters.

Figure 20:
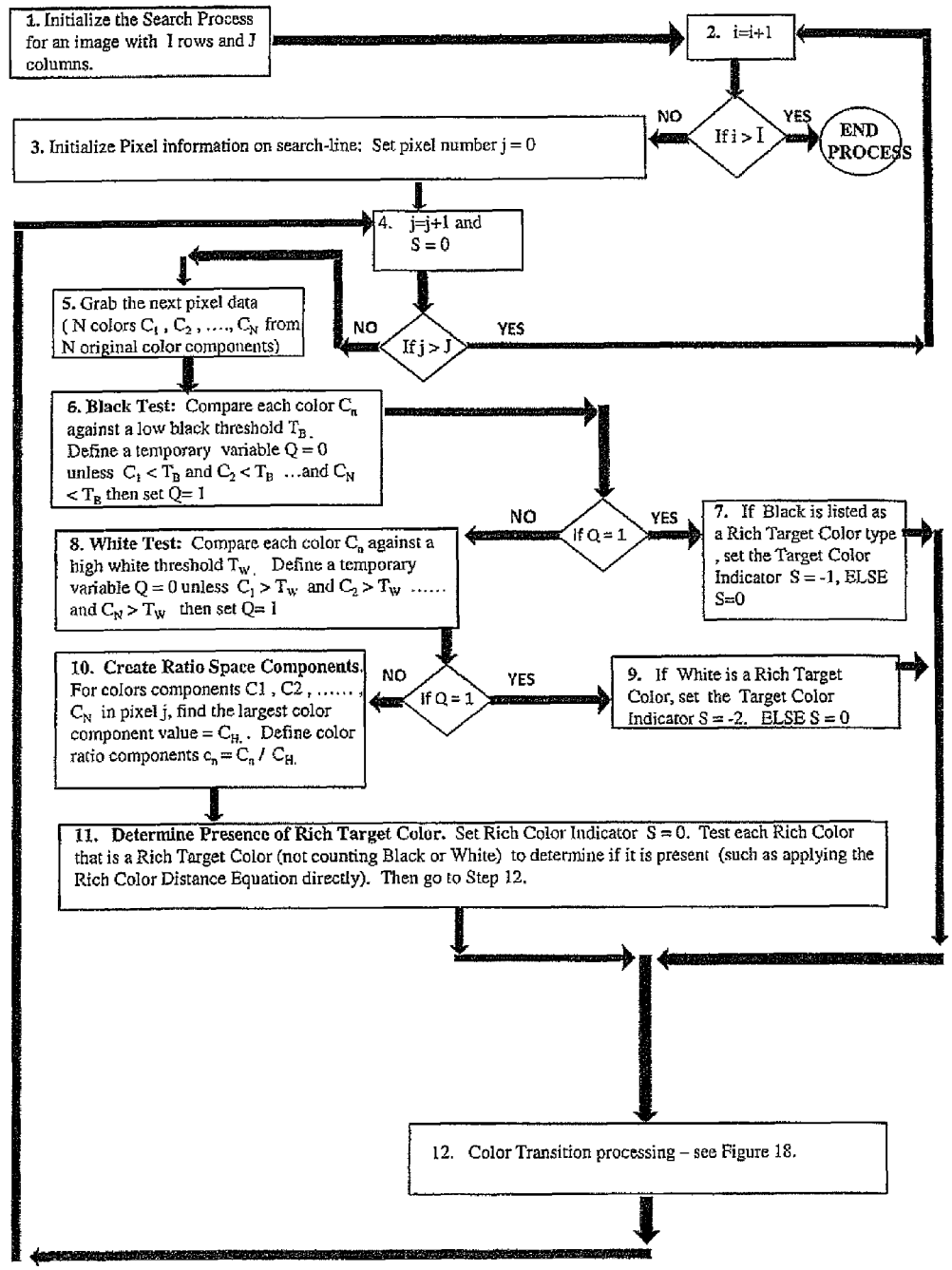
FIGS. 20 and 21 are flowcharts depicting the sequence of steps in the present method as performed one pixel at a time on a data string.
Figure 21:
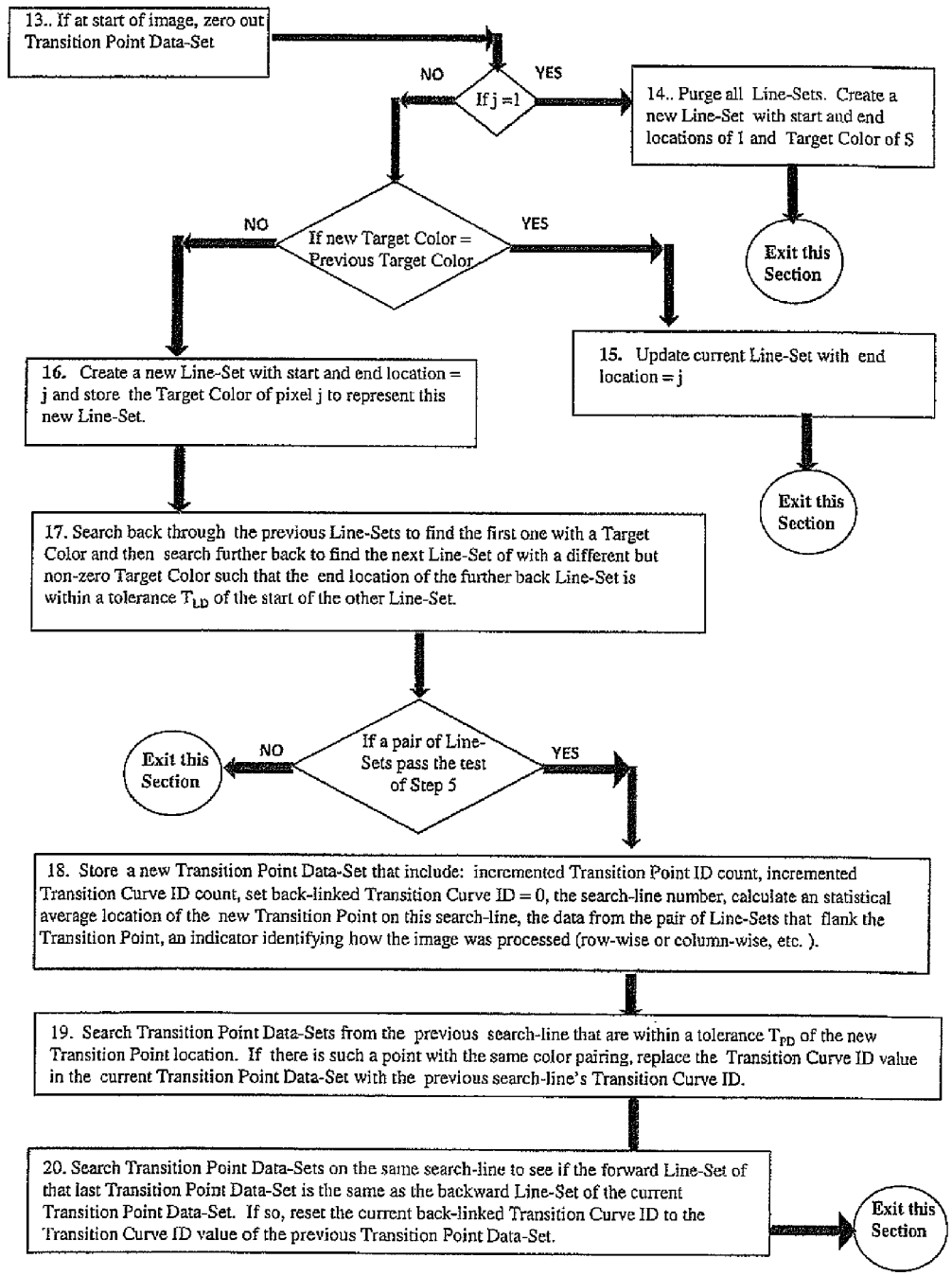

FIGS. 20 and 21 show a flowchart that illustrates how the method can be implemented on a stream of pixels making it ideal for hardware implementation. Step 1 initializes the Search Process for an image of I rows and J columns. Start with i=0 j=0 (where i is the search-line number), and initialize the variables defining the targets and color characteristics. Step 2 Increments the search-line count i=i+1. Then test to see if i is outside of the image; if so end the process. Step 3 initializes Pixel information on Search-line i. Set the pixel number j=0 and purge the memory of "Line-Sets". We define a Line-Set as a set of three items of data defining a linear patch of data that has a common Target Color: the Color Indicator, the start pixel location, and the end location positions for color patch. Step 4 increments the pixel count j=j+1 and sets the Rich Color Indicator S=0. Then it tests and If j>J (where J is the total number pixels in a search-line). If j is outside the image, return to Step 2. In Step 5 grab the image data for pixel j (N colors $c_1$, $c_2$, $c_N$ from N color components). Then in Steps 6-9 test if all of the original components $C_n$ are below a Black Threshold, TB, or above a White Threshold, $T_W$. If true, then the Target Color Indicator is set to S=−1 or S=−2 respectively and then proceed to Step 12. If false, then proceed to Step 10 where to find the largest incoming color component $C_H$ of the pixel j.

In Step 11 apply the Rich Color Filter to produce a flag setting representing the binary image value for the current pixel for each color component. A color made up of 1 or more color components that are much larger than the remaining color components as typically defined by the Rich Color Filter equation for a filter type "m" color distance equation. For a pixel located I, j the color distance equation is defined as follows in terms of ratio space color component values ($c_1$, $c_2$, $c_N$):

$$A_m = POS(B_{1,m}*(f(c_1)-T_{1,m})) + POS(B_{2,m}*(f(c_2)-T_{2,m})) + POS(B_{N,m}*(f(c_N)-T_{N,m})).$$

If $A_m=0$ and the filter color m is a Target Color, set a Target Color Indicator, S, to the Target Color values; otherwise set S to a value indicating that it is a non-Target Color. $T_{n,m}$ is the threshold for color component n and color filter type m, $f(c_n)$ is a function of $c_n$, and the Bias $B_{n,m}$ (or "scale parameter") for color component n and color filter type m. The function POS (A) such that POS (A)=0 if A is less than or equal to 0, ELSE POS (A)=A. The function $f(c_n)$ can simply be any function that emphasizes Rich Color for example $f(c_n)=[E_1*c_n]+E_2$ or it might be $f(c_n)=[E_1*c_n*c_n]+[E_2*c_n]+E_3$ for input parameters $E_1$, $E_2$, $E_3$.

The Rich Color filter could be implemented in other ways. For example, each of the terms between the plus signs in the distance equation could be implemented with IF tests. Similarly, a Rich Color Look-Up Table could have been used to produce similar results. The basic idea is the same; search for the presence of Rich Colors in the Rich Color Ratio Space.

FIG. 21 shows a method where the Rich Color Indicator, S, can be used along with two types of Data-Sets (Line-set and Point-Set) to find Rich Color Transition Curves that are then used to find objects and targets in images. Again, a line set is a set of consecutive pixels all having the same Target Color ID and containing three pieces of data: the start pixel location of the pixel cluster, the end location, and the Target Color ID. A Transition Point Data-Set (or just Point-Set) consists of four data sections: an ID section, a point location, a backward Line-Set, and a forward Line-Set. The ID section includes a Transition Point ID number, a Transition Curve ID number, a Back-link Transition Curve number, and a row/column indicator. The point location has a search-line number, and the Transition Point location (X) on the search-line. Last two sections are the Rich Color Line-Sets that flank the Transition Point. The location X is defined by a statistical measure of the distance between the nearest start and end locations of the two Line-Sets and any non-Target pixel colors that fall between these locations.

Steps 13 and 14 shows the image being processed along search-lines (rows, columns, etc.) initializing and updating data sets for new image and new search-line. If the new pixel's Rich Color Indicator, S, is the same as it was for the previous pixel then simply update current Line-Set with an end location=j. Otherwise go to step 16, FIG. 21, and create a new Line-Set with the location of the start and end both set to the new pixel location and the Target Color ID set to that of the new pixel. Also, when the Target Color ID changes, begin testing for a Rich Color Transition by checking if there is the start location of the previous Line-Set is within a tolerance distance of another Line-Set further back in the current Search-line such that both have different but non-zero Target IDs. Any Line-Set further away than a distance tolerance, $T_{LD}$, is usually purged from memory to minimize memory requirements. If a Line-Set is found within the distance tolerance, $T_{LD}$, then a Transition Point Data-Set is created or updated. Steps 19 and 20 in FIG. 21 show how a Point-Set of the current search-line can be used to link to Point-Set on a previous search-line to form a Transition Curve and then possibly link up to a previous Transition Curve on the current search-line to identify targets.

FIGS. 22 and 23 show a detailed example of how the method to find a possible Rich Color Transition Curve is applied to a set of pixels on a search-line. This example is similar to Target 910 that is seen in FIG. 9 with the threshold and bias values below:

| | Thresholds ($T_{1,m}$, $T_{2,m}$, $T_{3,m}$) | | | Biases ($B_{1,m}$, $B_{2,m}$, $B_{3,m}$) | | |
|---|---|---|---|---|---|---|
| a. | R | 1. | .7 | .7 | −10000 | 10000 | 10000 |
| b. | G | .7 | 1. | .7 | 10000 | −10000 | 10000 |
| c. | B | .7 | .7 | 1. | 10000 | 10000 | −10000 |

Step 1—Input (R,G,B)-7 Step 2—Ratio Space (r, g, b)-7 Step 3—Rich Color Distance ($A_r$, $A_g$, $A_b$)

| Step 4 - Indicator Flags ($q_r$, $q_g$, $q_b$) -7 Step 5 - set Target Color Indicator S | | | | | | | | | | | | |
|---|---|---|---|---|---|---|---|---|---|---|---|---|
| J | $C_1$= R | $C_2$ = G | $C_3$ = B | $c_1$ = r | $c_2$ = g | $c_3$ = b | $A_r$ | $A_g$ | $A_b$ | $q_r$ | $q_g$ | $q_b$ |
| 100 | 159 | 101 | 124 | 1 | 0.635 | 0.779 | 799 | 7447 | 4553 | 0 | 0 | 0 |
| 101 | 185 | 55 | 81 | 1 | 0.297 | 0.438 | 0 | 10027 | 8622 | 1 | 0 | 0 |
| 102 | 179 | 54 | 80 | 1 | 0.301 | 0.447 | 0 | 9983 | 5531 | 1 | 0 | 0 |
| 103 | 189 | 51 | 78 | 1 | 0.27 | 0.413 | 0 | 10302 | 5873 | 1 | 0 | 0 |
| 104 | 187 | 50 | 79 | 1 | 0.267 | 0.422 | 0 | 10326 | 5775 | 1 | 0 | 0 |
| 105 | 105 | 46 | 80 | 1 | 0.438 | 0.762 | 619 | 8619 | 2381 | 0 | 0 | 0 |
| 106 | 70 | 44 | 81 | 0.864 | 0.543 | 1 | 4358 | 9210 | 1642 | 0 | 0 | 0 |
| 107 | 48 | 43 | 81 | 0.593 | 0.531 | 1 | 7074 | 7691 | 0 | 0 | 0 | 1 |
| 108 | 50 | 44 | 83 | 0.53 | 0.53 | 1 | 6976 | 7699 | 0 | 0 | 0 | 1 |
| 109 | 48 | 43 | 84 | 0.512 | 0.512 | 1 | 7286 | 7881 | 0 | 0 | 0 | 1 |
| 110 | 51 | 46 | 87 | 0.529 | 0.529 | 1 | 7138 | 7713 | 0 | 0 | 0 | 1 |
| 111 | 47 | 46 | 85 | 0.553 | 0.541 | 1 | 7471 | 7588 | 0 | 0 | 0 | 1 |
| 112 | 103 | 108 | 99 | 0.954 | 1 | 0.917 | 5630 | 2537 | 6370 | 0 | 0 | 0 |

FIGS. 22 and 23 show how the above pixel data can be used to construct both Line-sets and Transition Point data-sets. A Red data set ending at pixel 104, FIG. 23, is within a tolerance distance of 4 of the Blue data set starting at pixel 107. It is irrelevant that there is a Line-set of non-Target colors between these two. All that matters is that the two are within tolerance of each other and of different but Target Colors. The Transition Point Y value is usually set to the current search-line number. A simple statistical measure of the Transition Point X value is an average of the end pixel number and start pixel number of the two Line-sets respectively. Another measure would be a weighted average of the pixel locations using the original red and blue component values to weight the band of pixels starting at 104 and ending at 107 as shown below:

$X$=[104*(187+79)+105*(105+80)+106*(70+81)+ 107*(48+81)]/[187+79+105+80+70+81+81+81]
$X$=105.2

The values above are used in FIGS. 22 and 23. In this example, it is assumed that scan-line 23 is the first line that crosses target 910. Thus, the first Transition Point is found at X=103.4 and a Transition Point-Set is created with a Point ID=1 and a Transition Curve ID=1 since these are the first Transition Point and Transition Curve of the image. But since there is no previous Point-Set on this search-line, the Back-link Curve ID=0. Later on the same search-line another Transition Curve is uncovered at X=111.4. This being the second Point found in the image and on a new curve the two IDs here are set to 2. The associated Back-link Curve ID is set to 1 since the Forward Line-Set in the last Point-Set is the same as the backward Line-Set for the new Point-Set (106, 3, 110). With no other Transition Points found in the image, the search-line moves on to search-line 24. Here in FIG. 23 a Transition Point is found at X=105.2 and a new Point-Set is created for Point ID=3. Then look for Point-Sets on the previous search-line that is located within a tolerance of Point ID=3 with the same color pairing. Since Point ID=1 passes both tests, the Curve ID of the new Point-Set is set equal to that of Point ID=1 (i.e. the new Curve ID is set to 1). However, there is no Point-Set to the left of the new Point-Set and so the Back-link Curve ID is set to zero. Later on the same search-line another Transition Curve is uncovered at X=112.4. This being the fourth Point found in the image, the Point ID=4. Searching the previous search line for a Point-Set within tolerance and having the same color pairing leads to setting the new Curve ID to 2. The associated Back-link Curve ID is set to 1 since the Forward Line-Set in the last Point-Set is the same as the backward Line-Set for the new Point-Set (107, 3, 111).

The resulting curves together with their flanking Rich Color patches can be compared to target properties in a target database. By creating a set of Transition Curves, the original problem is reduced to one of comparing a database of target properties to a small set of curves with simple geometric and color properties. The absolute and relative size, and orientation as well as shape and color can be used to detect, identify, locate and orient (in 2D or 3D space), and characterize a set of objects or targets. A sequence of images together with associated database properties can be used to determine physical properties of the objects to which the targets belong. A sequence of video images can be used to define physical properties such as velocity, momentum, acceleration, etc. and further filter the data by enhancing image quality (averaging target data) for targets that have matching characteristics. These characteristics should allow for further tracking refinements and rejection of potential targets that cannot physically change properties radically as seen from frame to frame.

Once a target has been identified along with its geometric and other properties, these can be used with a database and a lookup table to manipulate computer interfaces, computer programs/macros, or devices. Both hardware and software implementations are disclosed. A smart camera with this method implemented in hardware could analyze each frame while the next frame is being acquired and then transmit (wired or wireless) a small data set of Transition Curves only if a target is detected in the frame. This method requires only a small amount of buffer memory and a very few multiples, adds, if tests and bit manipulation per pixel processed. The speed and flexibility of the method make it possible to use a variety of targets at the same time. If targets with unique color and geometry are used, then each target that is found can trigger a unique action based on their absolute or relative location and orientation together with their associated database properties.

Figure 24:
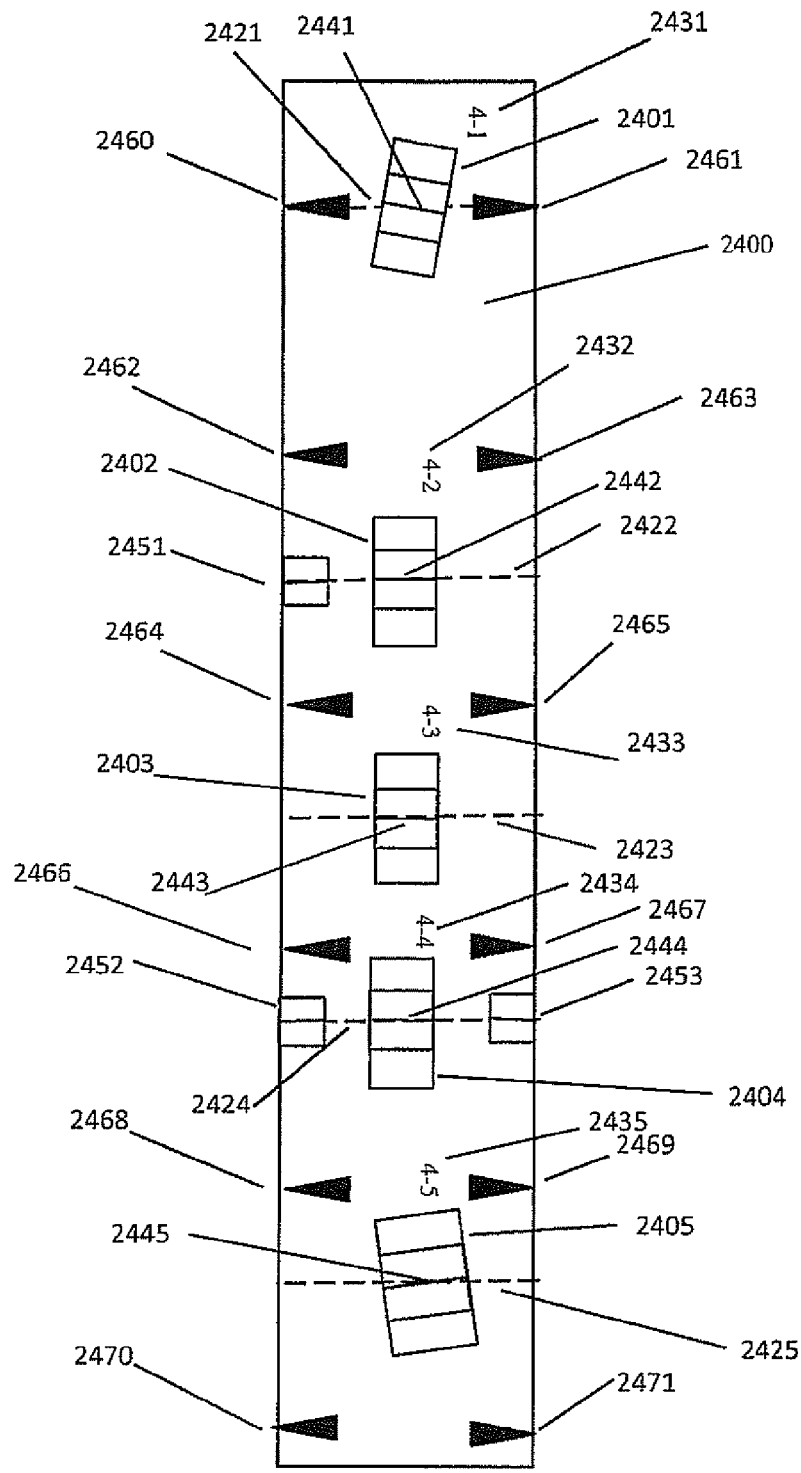
FIG. 24 is a pictorial representation of an example of tape implementation of Rich Color Target Sequences.

FIG. 24 shows how a Sequence of Rich Color Transition Curve Targets can be implemented on a tape 2400. The side edges of the tape have measurement markings (2460, 2461, 2462, 2463, 2464, 2465, 2466, 2467, 2468, 2469, 2470, and 2471) like a tape measure. The targets (2401, 2402, 2403, 2404, and 2405) in this example each have four Rich Color stripes that are separated by any one of five distinct interval lengths measured from the centroids (2441, 2442, 2443, 2444, and 2445) of each target. It is helpful to mark the tape with special lines (2421, 2422, 2423, 2424, and 2425) that both passes through each target centroid and is perpendicular to the line through the target centroids. The targets in this example are limited to five distinct rotation angles in degrees (−20, −10, 0, 10, 20) as measured from the line between target centroids. These targets have one of three distinct sizes (small, medium, large). Each target is shown with an identification number (2431, 2432, 2433, 2434, and 2435) to its left. Even if the number of Rich Colors are limited to three, Red, Green, and Blue, there are 120 unique color patterns of four stripes for each of these five targets. This allows over a billion unique target combinations that are part of such a sequence of five Rich Colored targets to be identified. This is an incredible result for such a few set of parameters. A roll of Rich Color Sequence Tape could have unique sets of five targets but a set of three targets is more likely since there is unlikely to be a need for a billion unique combinations of target sequences. FIG. 24 also shows the optional use of small "satellite" targets (2451, 2452, and 2453) in the neighborhood of a central sequence target. These provide an additional way to differentiate targets.

The complete implementation of the Rich Color Target Sequence would include both the sequence and its corresponding database. An example of such a database is shown in FIG. 25. The database can be made available via the internet or other data storage method. The database contents would include the relative location, and orientation of each target and the interval between each target along with their length and width. Further, the database would include the target shape and Rich Color patterns.

The example of a Rich Color Target Sequence in space is shown in the table in FIG. 25 where a set of targets on a ribbon have unique characteristics. Target2 and Target4 in this sequence are identical in shape, color, size, and orientation but the intervals between their neighbors on the left and right differ greatly. The sequence of target shapes, color patterns, area, orientations, and separations can be stored in a small database associated with the ribbon/tape. The same sequence in FIG. 25 could apply to define a Rich Color Target Sequence in time if the interval between targets was in fractions of a second not inches and the sequence was played like a video of varying display rates on a single LED display.

A Rich Color Target Sequence (RCTS) tape, together with its database, has the added advantage that makes it simple and economically possible to setup a variety of applications with the same hardware and methods. Examples of such applications are movie making, physical therapy or health applications, teaching how to use handheld tools (from surgical to carpentry), scientific measurement, CAD interfaces, or gaming to name a few. A preprinted ribbon that includes Rich Colored Targets could be tacked onto walls, equipment, furniture, or other items or sown into clothes or armbands. Just cut off the required length of ribbon, identify the target numbers on the ribbon for the start and end of the ribbon segment used, load the capture computer with the database information for this ribbon segment and go. Often current machine vision applications have specific codes written for specific applications. This is expensive and the loss of generality leads to small markets with buggy application code. The use of RCTS tape should lead to much more robust applications.

If inexpensive passive targets were used outdoors without specialized lighting or targets, the number of pixels captured by ordinary cameras would be staggering. Imagine the number of pixels that have to be analyzed if the motion tracking was done on a city street. In order that each actor is captured by two or more camera to capture stereo pairs to triangulate 3D location and orientation over a large real world scene, large number of cameras would have to be located at overlapping locations and orientations to get good resolution and avoid occlusion as one actor gets in front of one camera or another. The higher the resolution of each camera, the fewer cameras would be needed; but the total pixel data remains roughly the same. For professional applications, hundreds of cameras might be used to capture the scene from multiple angles and points of view.

The Rich Color Transition Curve tracking method dramatically reduces the volume of data that needs to be collected from any camera frame. In this example, consider a video camera with a frame resolution of 4000×4000 pixels capturing ten targets such that each target is made up of three Rich Color stripes and covers an area of 10×10 pixels. If each pixel took up three Bytes of memory (0-255 for each color), a frame of RAW data would take up 48,000,000 Bytes. Now let's consider a hardware implementation of the Rich Color Transition Curve method applied in-line with the camera capture. Assuming that the transition points are stored as long integers and each curve had a long integer to define the color pair involved and the right/left orientation of the pair, then the Rich Color Transition Curve tracking would require only 10×(10+2)×2×2 Bytes or 4800 Bytes, thus, reducing storage by a factor of 10,000. By converting each target to a 3D vector and a colored identification data set, the data that must be transmitted and stored for post-processing is roughly 50 Bytes per target per frame per camera. This is roughly 500 Bytes in this example reducing the data by a factor of 100,000.

If this camera were operating at 128 frames a second to capture an action sequence for 10 minutes, the RAW data file would be 3.686 Terabytes. The Rich Color Transition Curve vector file for this would be roughly 40 Megabytes or less than ⅓ the size of a RAW file from a single high resolution photos of the Nokia Lumia cell phone. This is small enough for 100 such cameras to easily transfer their capture data files to a cloud storage facility in real time. Likewise the small number of arithmetic operations required for the Rich Color Transition Curve method means that the data file could also be created in real time. In the future the number of pixels per frame will skyrocket. Since the Rich Color Transition Curve method is roughly linear to pixel count of the camera, this should not be problematic.

For movie making, it may be desirable to have small inconspicuous targets. The smaller the target, the less curvature that can be detected and the less variation between Rich Color Transition Curves that can be distinguished. Ideally higher resolution cameras of the future will clear this up. But for now, the most common targets for our actors will consist of 2 or 3 simple straight uniform stripes. These fit the bill for small output files and that are fast to compute. However cameras today generally have poor color resolution compared to what is expected over the next decade. This means, for example, that while a green pixel sensor may have peak sensitivity in the green part of the spectrum, it is sensing a lot of photons from the Red or Blue part of the spectrum as well. Until color resolution improves and until new sensors are added to the typical three (RGB) that make up current camera data, most Rich Color Transition Curve implementations can only use three Rich Colors. For example, four unique two stripe targets and twelve unique three stripe targets may be provided. But for our street scene we will need hundreds of targets.

This is still better than the situation for some passive target systems that use retro reflectors where all targets look alike. They get along by first identifying each target and then track it in each succeeding frame by finding the target that most closely matches the location, orientation, and vector velocity on the last frame. There can be a tedious startup identification and additional post processing work if a target is occluded at some point. The sequences provide simple identification even in cluttered environments with multiple cameras and large number of actors and objects to be tracked.

This is where the method that will be referred to as the Rich Color Target Sequence (or RCTS) comes in to play. This method defines far more uniquely identified targets. It is more automatic. This method delivers far better overall 2D and 3D location and orientation accuracy. Also calibration and scene stitching are easier. All this comes from the ability to identify a large number of unique sets of targets with accurate relative geometry using the corresponding RCTS database. Other targets can be identified located and oriented based on their proximity to one or more RCTS in the frame. Targets in the RCTS can be identified by their relationship to the members of the sequence.

Ribbon sequence allows one to easily attach large numbers of targets on the periphery and interior of the capture volume and on actors and objects. The sequence allows both accurate location and orientation and identification. Use one set of target patterns for references and another set for actors and objects. For example the actors and objects could use Bull's Eye targets with two or three Rich Colors while the ribbons used in the background for reference could use four Rich Another advantage of this method is that these targets can be located and removed from any frame, using automated image editing to replace the target with a predefined image.

A restricted version of the Rich Color Transition method can be used when lighting is well controlled over time, roughly uniform, and the cameras involved have excellent low light capability. To understand this, consider an image composed of k=1, K pixels each having N color components Ci and divided into Rich and non-Rich colors by a color component thresholds Ti. Then the sum of the color components for pixel k can be written as "a(k)" such that $$a(k)=C1+C2 \ldots CN$$

If the illumination is fairly uniform and constant over time, then a(k) can be approximated by a constant "A". When applying thresholds to Rich Color Transition Curve methods for this restricted class of problems, there are times that the standard thresholding for a pixel k $$Ti<[Ci/a(k)]$$

can be approximated by $$[Ti*A]<Ci.$$

Figure 26:
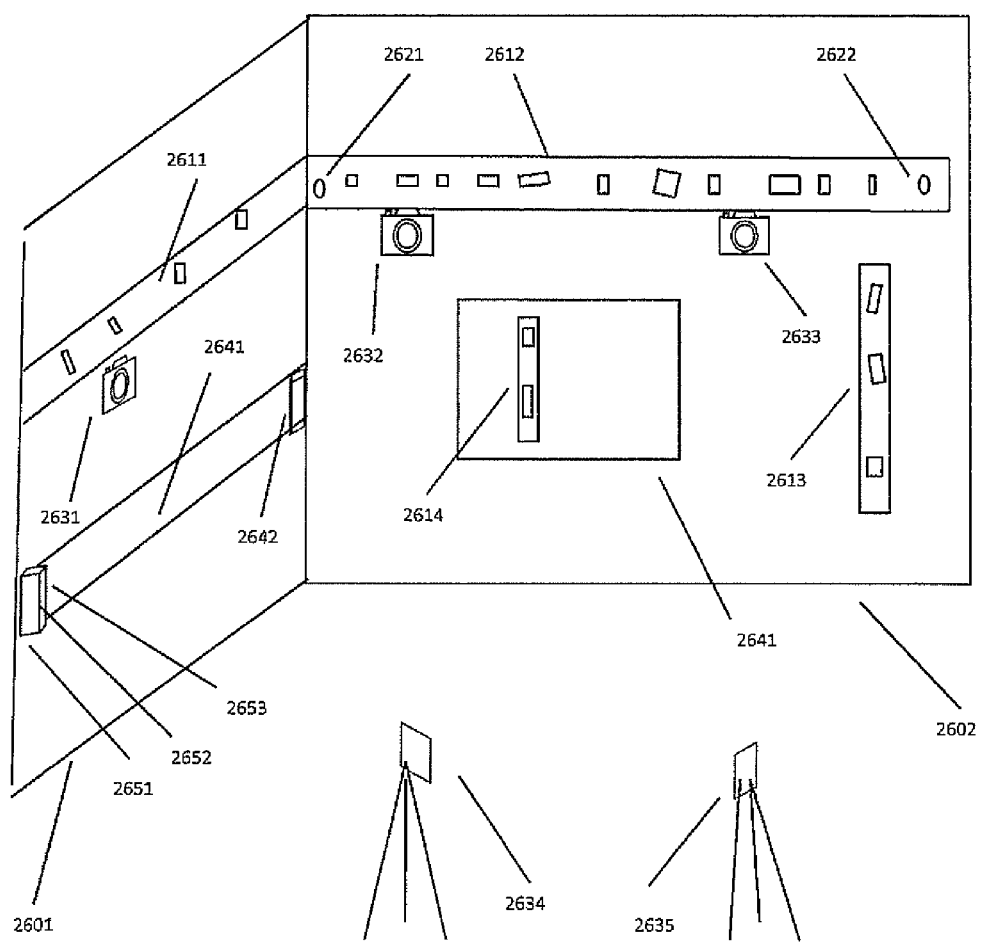
FIG. 26 is a pictorial representation of an example of an optical motion capture room using rich color target sequences.

FIG. 26 shows a set of RCTS on the walls of a room being used for a motion capture application. Sequence 2611 is painted on the side wall. Sequence 2612 is tacked onto the back wall 2602. Sequence 2613 is taped vertically onto the back wall while sequence 2614 is displayed vertically on an LED screen. Three smart cameras (2631, 2632, and 2633) are attached to the walls next to Rich Color Target Sequences. A stereo pair of cameras (2634, 2635) is positioned looking at the back wall.

If the room is ringed with cameras and target sequences, every part of the room can be seen by cameras that in turn can see RCTS that have cameras attached at known points. Each camera can see at least five targets as well as other information for identification and geometry. The measuring tape markings on the ribbon or tape can be entered into the database to further define the location of wall cameras or sequence start/stop target locations relative to corners in a room. Cameras 2634 and 2635 are capturing multiple target sequences traversing the image horizontally as well as vertically to produce accurate calibration. Since they are seeing many or the same targets, standard stereo triangulation can be used to calibrate the 3D capture space. Cameras that can see the location of other cameras next to target sequences can use this information to calibrate those cameras. Multiple cameras ringing a capture volume provides redundancy in case of occlusion and removes pixel truncation errors.

In FIG. 26 a box 2651 is attached to a ribbon used for sequence display 2641. The ribbon comes in the box 2651 and is drawn out for the required length with the unused portion of the ribbon remaining stored in the box. The ribbon is composed of a display technology such as an OLED display on a flexible transparent material such as a plastic film or Corning WILLOW GLASS. The box 2651 also contains a microprocessor 2652 with internet communication 2653 capability that can take color pattern data files from the cloud and display them on the ribbon's OLED display. An attachment tab 2642 of the ribbon is attached by thumb tacks, nails, adhesive or the like to a wall or other surface. This OLED ribbon can display a Rich Color Target Sequence for calibration and again display the full sequence or a subset as required by a machine vision application. When no machine vision applications are in use, the ribbon can display something pleasing such as an ornamental design or simply the wall color. For some applications the targets can be displayed as the same targets as were used in calibration except that there color can be a slight variation from the background color of the ribbon. In this case only the region of the image where the ribbon and the target used to be are searched. Any pixels in this region with color components that differ from the ribbon background color by more than an input threshold value will be mapped into the corresponding Rich Color component of the original target. This would allow us to use the Rich Color methods to be used in a less conspicuous manner.

It is anticipated that very small smart cameras (cameras with communication and computers) will hit the market in a few years that are basically smart phones without the phone or display shrunk down to the size of an IPod Shuffle (roughly 1.5×1.5×.3 inches). Ideally such a camera should have a built in hardware version of Rich Color Transition Curve tracking. Such cameras could be placed around a virtual reality rooms used for gaming, teaching, health, or other applications. Simple motion capture setups using these small low-cost cameras will use RCTS ribbons to both redundantly define the capture volume and to define the camera locations and orientations. By attaching the cameras to these ribbons, the locations and orientations of the complete camera set can be computed using overlapping camera images together with the geometric information associated this target sequence to iteratively calibrate the 3D geometry of the room or capture volume. Such rooms could have RCTS Ribbons around the walls, floors, and ceilings. By placing the targets next to sequence targets, the location orientation and identity of each camera can be determined from surrounding cameras. The same can be said to define the location, orientation, and identity of RCTS ribbons. RCTS can be displayed on an LED display also. Thus setup and calibration of such a capture volume could become automatic.

The more reference targets the more accurate the calibration. The more frames that are averaged together, the more accurate the calibration. A panorama can be constructed from an overlapping set of images that share a common tape of RCTS using Transition Curve targets. If one were setting up a movie scene with motion capture on a city street one might ring the capture space with horizontal strips of Rich Color Target Sequence tapes and occasional vertical strips.

FIG. 27 shows a flat surface (a wall, a floor, a table top, a kitchen counter, a driveway, etc.) with a set of RCTS attached to this surface at reference locations (corners, edges) and/or next to objects of interest. For this discussion we assume that the surface is a wall. Two Rich Color Target Sequence Tapes (2701 and 2702) define the top and left side of the wall. In this example a picture 2710 is hung on the wall. The targets of the two tapes together with their corresponding database information are enough to calibrate any image which includes the tapes using standard calibration methods.

The camera 2760 found on the back of the tablet 2750 is used to take a photo of the picture on the wall together with the tapes. The image is displayed on the touch screen display 2770 of the tablet 2750. The two tape sequences on the top and side of the wall that are captured and displayed in the photo image as 2731 and 2732 are used to calibrate the image. By touching any location on the screen such as the lower corner of the picture frame, one can make measurements on the image such as the distance to the upper left corner of the wall. Much more accurate measurements can be made by attaching additional sequences to points of interest. By adding additional sequence tapes, 2703 and 2704, starting at the lower left and upper right corners of the picture frame 2742 and we can accurately compute the point where the two lines would meet using the pixel data from all of the targets that make up the target sequences (2703, 2704) can be accurately computed.

Figure 28:
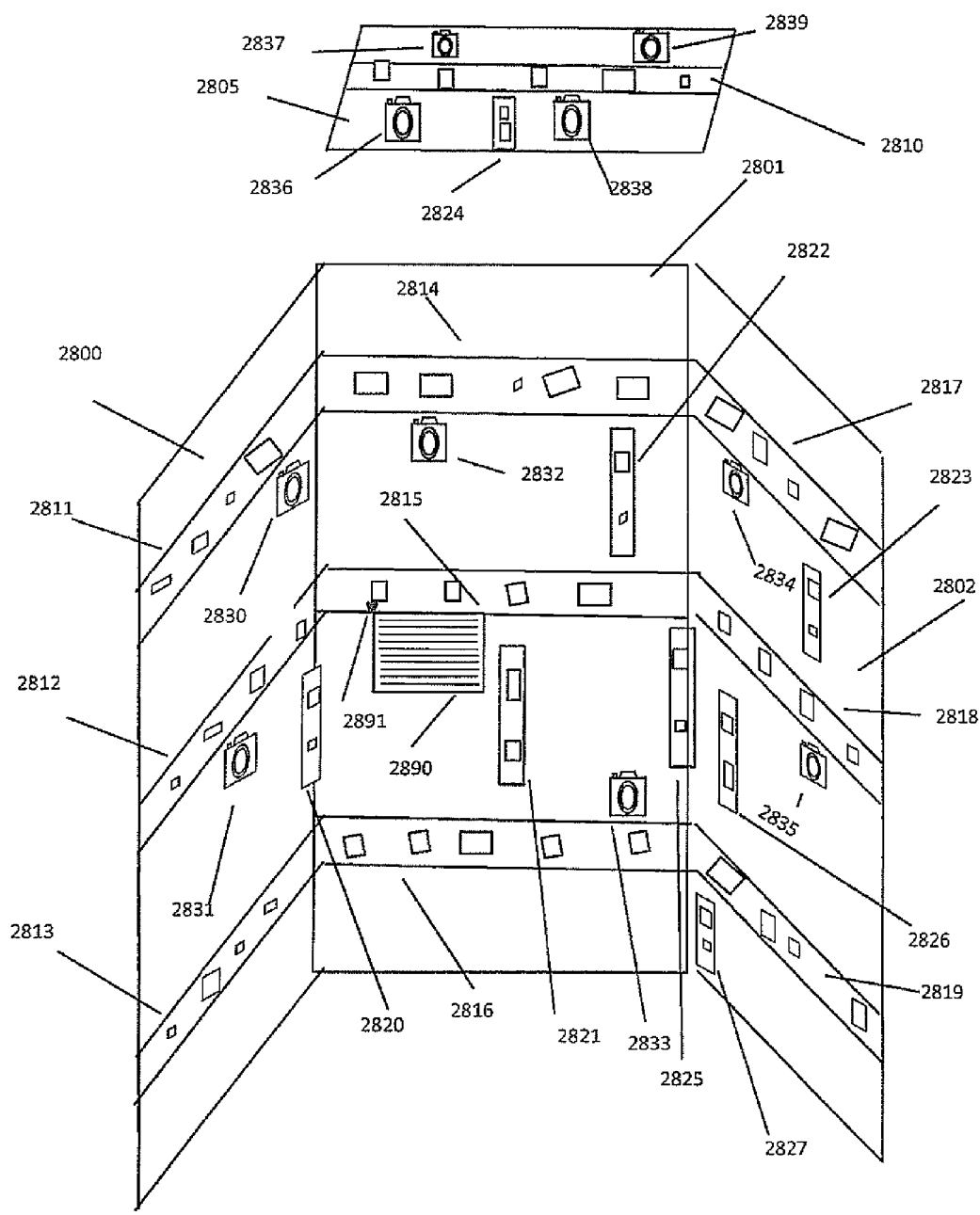
FIG. 28 is a pictorial representation of a room that is setup for automated calibration of the room using Rich Color Target Sequences.

FIG. 28 shows a simple rectangular room with three walls (2800, 2801, 2802) that meet at right angles and are covered by a ceiling 2805. Throughout this application a "room" is used in many drawing figures for the simplicity making a drawing; but really this could apply to most any space bounded by or containing planar surfaces. FIG. 28 shows a room that has a multitude of target sequences (2810, 2811, 2812, 2813, 2814, 2815, 2816, 2817, 2818, 2819, 2820, 2821, 2822, 2823, 2824, 2825, 2826, and 2827) and cameras (2831, 2832, 2833, 2834, 2835, 2836, 2837, 2838, and 2839) on the walls.

One common way to calibrate the cameras and the room as a whole is to use a 2D array of dots or squares displayed on a movable surface such as a sheet of cardboard 2890. In this example, the camera's intrinsic matrix is computed in the calibration process. This movable surface could also be a sheet of paper or a tablet or large yet thin OLED sheet with a microcomputer running the display. The tablet or OLED might be a better choice since the size of the array could be easily changed to match the camera zoom setting. Capture one image of the array precisely placed next to a location marker 2891 on a long sequence tape 2832 that stretches completely across a wall horizontally. Then capture one or more images on the same camera with the array moved and rotated in 3D in the field of view of the camera. Repeat this for all cameras in the room. This method both defines the intrinsic matrix for the camera and defines a 3D coordinate system for the camera field of view that is attached to the sequence tape on the wall. Now use an optimization routine to tie all of these camera coordinate systems into a single 3D coordinate system that represents the whole room. Triangulation with stereo pairs of cameras looking at any uniquely identified target can be used to better define the 3D position within the world (room) coordinate system.

The following describes another more automated calibration procedure for a room such as that shown in FIG. 28. This assumes that a camera database exists for each camera that contains the intrinsic matrix used to take out lens distortion, pixel aspect ratio, and other such problems. Use the intrinsic matrix to matrix multiplication of the pixel location of each target centroid in the camera plane and then solve for the position in world coordinates that corresponds to the target position in the camera planes of multiple cameras using inverse rotation and translation matrices computed by the calibration method described next.

This also assumes that the geometry of the room is provided in a 3D CAD (Computer Aided Design) database. Consider a camera aimed so that its field of view contains the corner formed by the wall 2801 and the wall 2802 and portions of at least two target sequences for each wall. In this example use sequences (2815 2825) for wall 2801 and sequences 2816 and 2817 for wall 2802. Further, let the field of view capture at least three targets per sequence. The targets and 3D CAD geometry are enough to make each wall serve the same purpose as the planar sheet 2890 shifted to two positions as described in the paragraph above. Again, a more accurate 3D data would be obtained if a second camera could see the same corner and triangulation was used. Place smart camera on the walls with overlapping field of views each seeing sequence tapes that other cameras can see. In general, this image data together with the 3D CAD data can be used to stitch together multiple camera images and solve the 3D position of targets within the room.

The fact that a target sequence is typically formed by targets whose centroids fall on the centerline of a tape can be used to greatly enhance accuracy of any results. After multiplying the vector made up of target centroid locations in the camera image by the intrinsic matrix found in the camera calibration, the centroids must fall on a line except for image error. This is result that falls out of the affine geometry that defines the relation between the camera plane and any object plane in the field of view.

Figure 29:
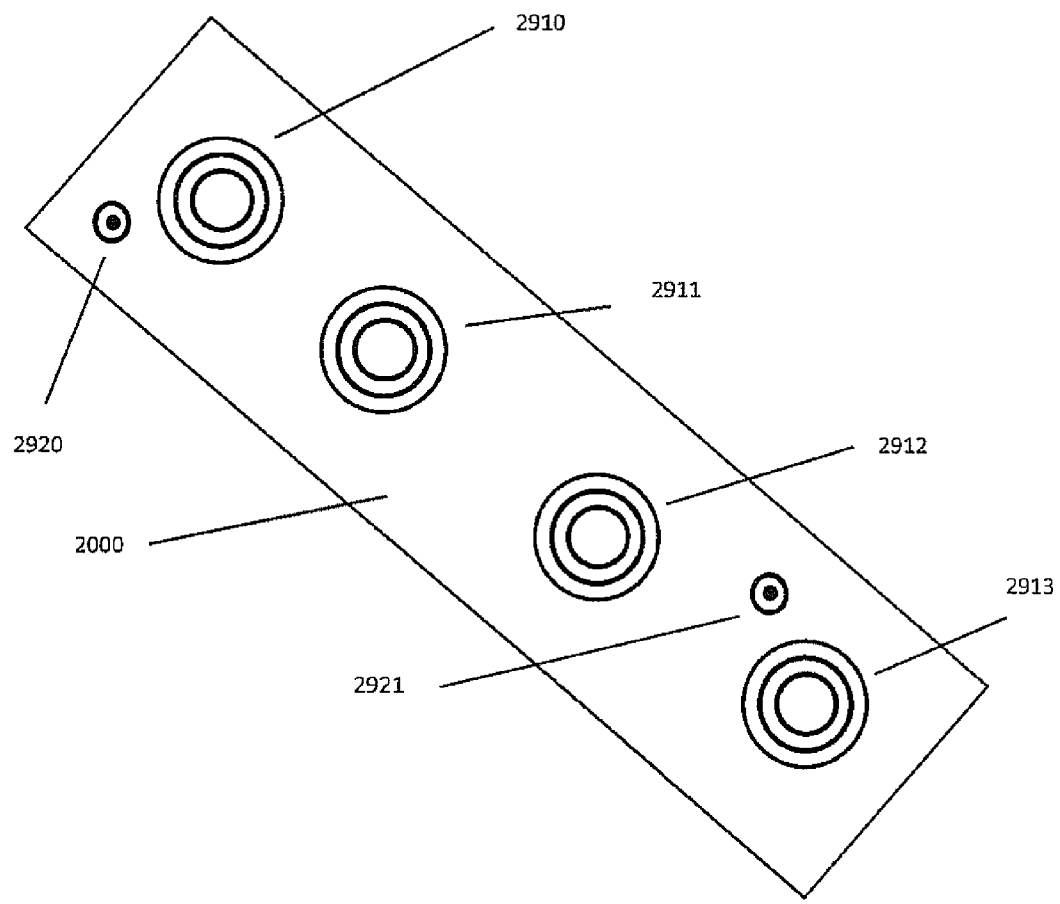
FIG. 29 is a pictorial representation of an example of a Bulls Eye Target Sequence.

FIG. 29 shows a sequence of circular Bulls Eye targets laid out on the centerline of the tape 2900. Each of these Bulls Eye targets (2910, 2911, 2912, 2913, 2914, and 2915) is constructed with three concentric circles each of which is composed of a Rich Color. Alone these targets have no directionality in the plane of the target. Previously it was described how image data can be traversed on one or more times along different scan line directions. However, it is faster on today's computers to only traverse an image with horizontal scan lines. Thus, targets are most valuable if they tilt only moderately in the target plane (plus or minus 30 degrees) such that transition curves are mostly vertical. In cases where the targets can appear at any angle in an image circular Bulls Eye targets can be employed. The sequence database together with the image capture data allows one to construct very accurate angle data and pretty good location data. The ability to differentiate one sequence target from another can be enhanced by placing a small satellite target close to it at some specific angle. In this example the main targets of the sequence (2910, 2911, 2911, 2912, and 2913) are laid out on the centerline can be identified as having four transition curves (i.e., five stripes) and the ID modifiers or satellite targets have only two transition curves (i.e., three stripes). The number of satellite targets, their color pattern, and their angle relative to the centerline provide additional methods to distinguish a target on a RCTS tape.

Figure 30A:
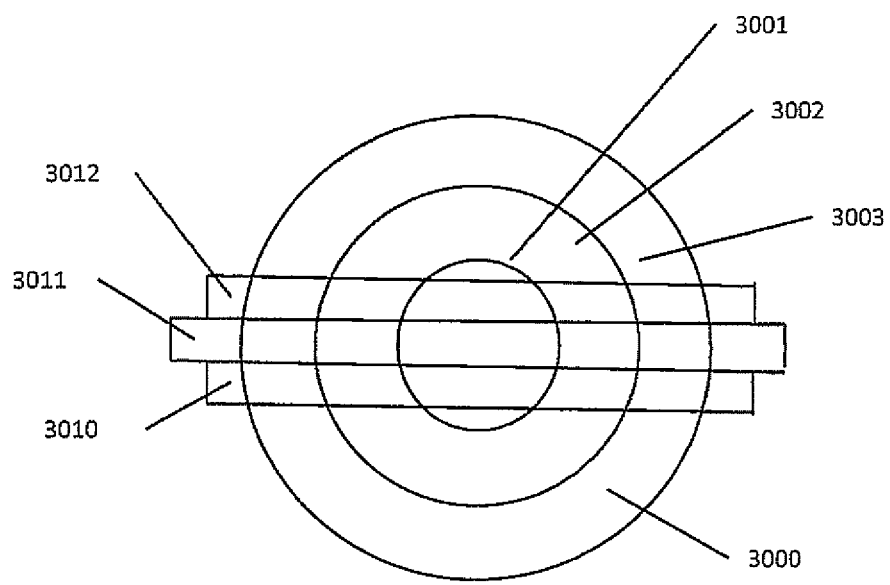
FIGS. 30A and 30B are pictorial representations illustrating how a horizontal scan line would view a Bulls Eye Target using Rich Color Transition Curves.
Figure 30B:
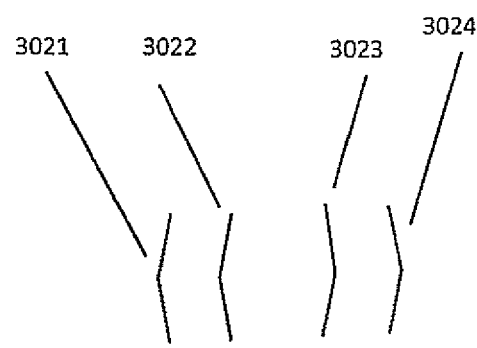

FIG. 30A shows how a circular target would appear as a set of striped targets to a horizontal scan line implementation of the Rich Color Transition Curve method. The target 3000 is composed of three Rich Color circles—Red 3001, Green 3002, and Blue 3003. A set of horizontal scan lines are shown passing through the center of a Bulls Eye target. In this example four Rich Color Transition Curves are created which serve to detect, identify, locate, and orient the target. A convention that scan lines pass from left to right is used. Thus, in FIG. 30B transition curve 3021 transitions Blue to Green. The transition curve 3022 transitions Green to Red. The transition curve 3023 transitions Red to Green. The transition curve 3024 transitions Green to Blue.

Figure 31:
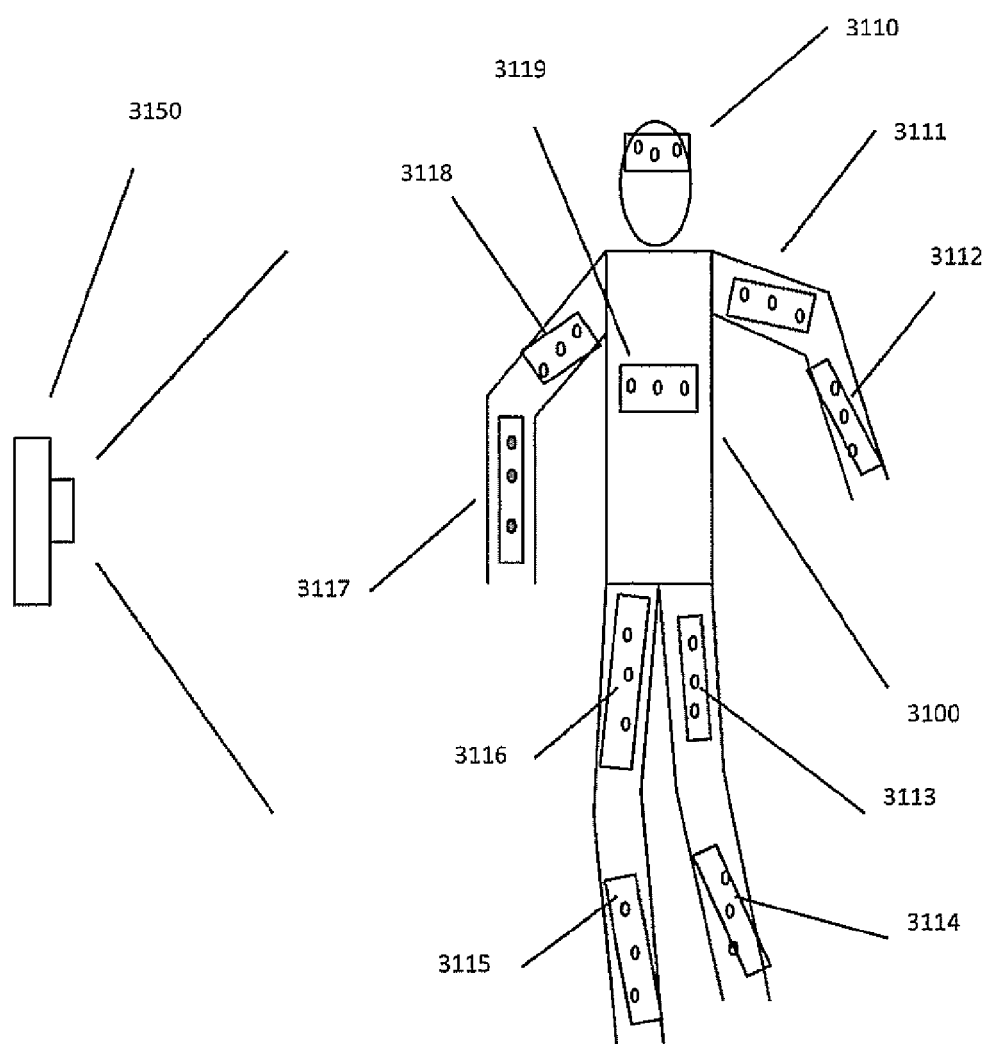
FIG. 31 is a pictorial representation illustrating an actor wearing Rich Color Target Sequences for motion capture.

FIG. 31 shows a set of sequence tapes (3110, 3111, 3112, 3113, 3114, 3115, 3116, 3117, 3118) attached to an actor's body 3100 and clothes viewed by a video camera 3150. As described previously in the case of striped targets, unique sequences dramatically increase the number of unique identifiers and also greatly increase the accuracy of position and orientation for measurements.

Rich color targets do not have to be printed on a stark white tape. They can be buried in a colorful scene that consists of non-rich colors except for the targets. Your eye naturally averages out the colors and makes the targets hard to see unless you without the use of the Rich Color Transition Curve method. The reverse is true for the Rich Color Transition Curve method for which white or black or pale colors and any colors that are not designated Rich Colors that will produce Rich Color Transition Curve separated appropriately by designated ratios will appear to be invisible.

Figure 32:
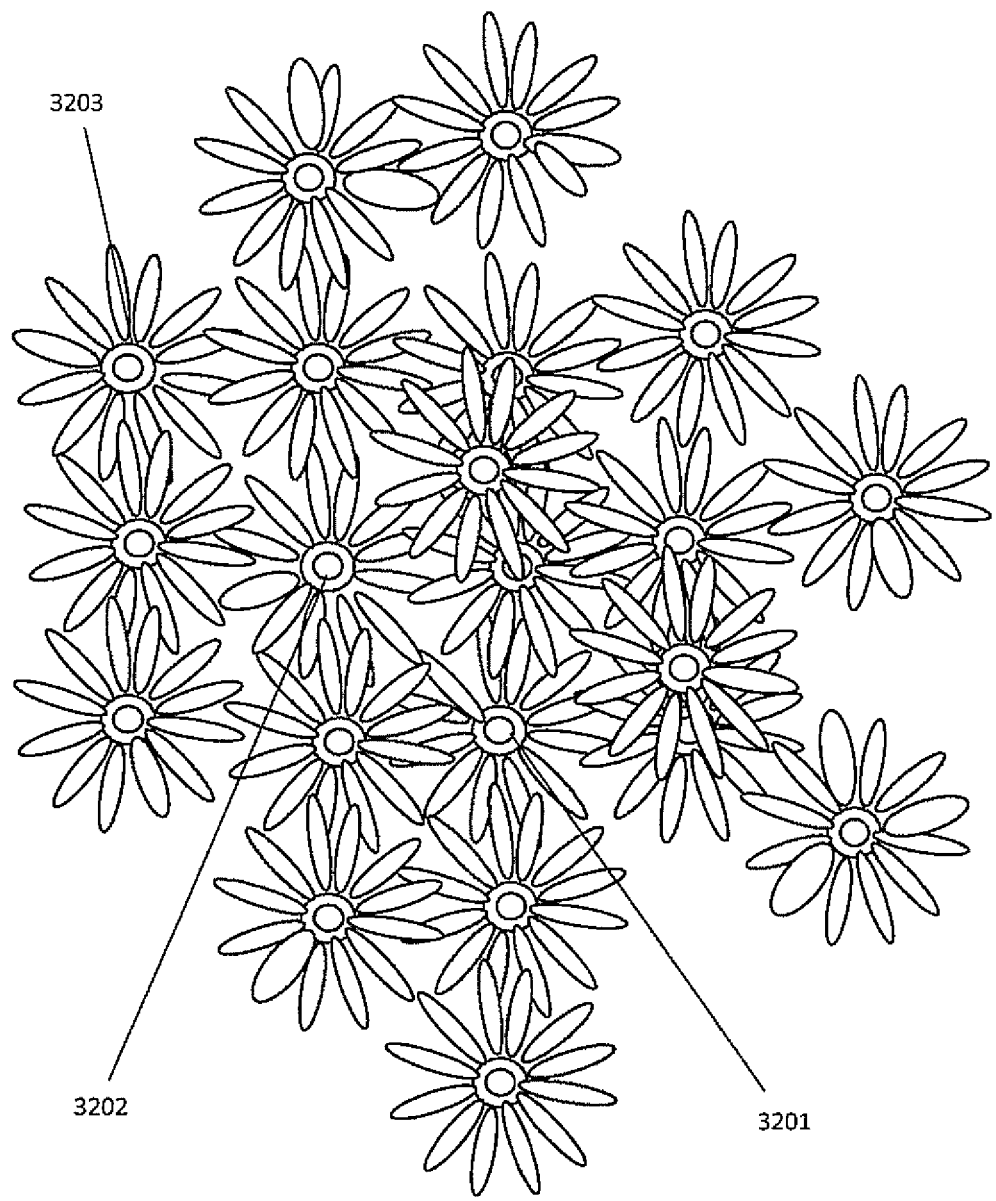
FIG. 32 is a pictorial representation illustrating how a Rich Color Target can be hidden from human vision using an artistic display and yet be the only thing that a Rich Color Transition Curve method can see.

In FIG. 32 targets are hidden in an artistic display so that they are not overwhelming to the human eye. The centers of flower targets 3201, 3202, and 3203 are made up of two Rich Colors and form a Rich Color Target Sequence of three targets. The rest of the flowers are limited to any pale color with color components below the Rich Color component thresholds, black, or white. If target colors are limited to Rich Red, Rich Green, and Rich Blue, then the painting could also use Rich Yellow, Rich Magenta, and Rich Cyan. It could even use one circle with Rich Red, Rich Green, or Rich Blue and have the other circle with a non-Rich color since no Rich Color Transition Curve would result So that one can imbed a sequence of Rich Color Targets in an artistic display such as a tape with a floral pattern as shown in FIG. 32 as flower targets 3201, 3202, and 3203. with Rich Color Target Components of Rich Red and Rich Blue on the outer and inner 3221, Rich Blue 3222, Rich Green 3223, Rich Blue 3224, Rich Red 3225, Rich Green 3226, and Rich Red 3227.

Figure 33:
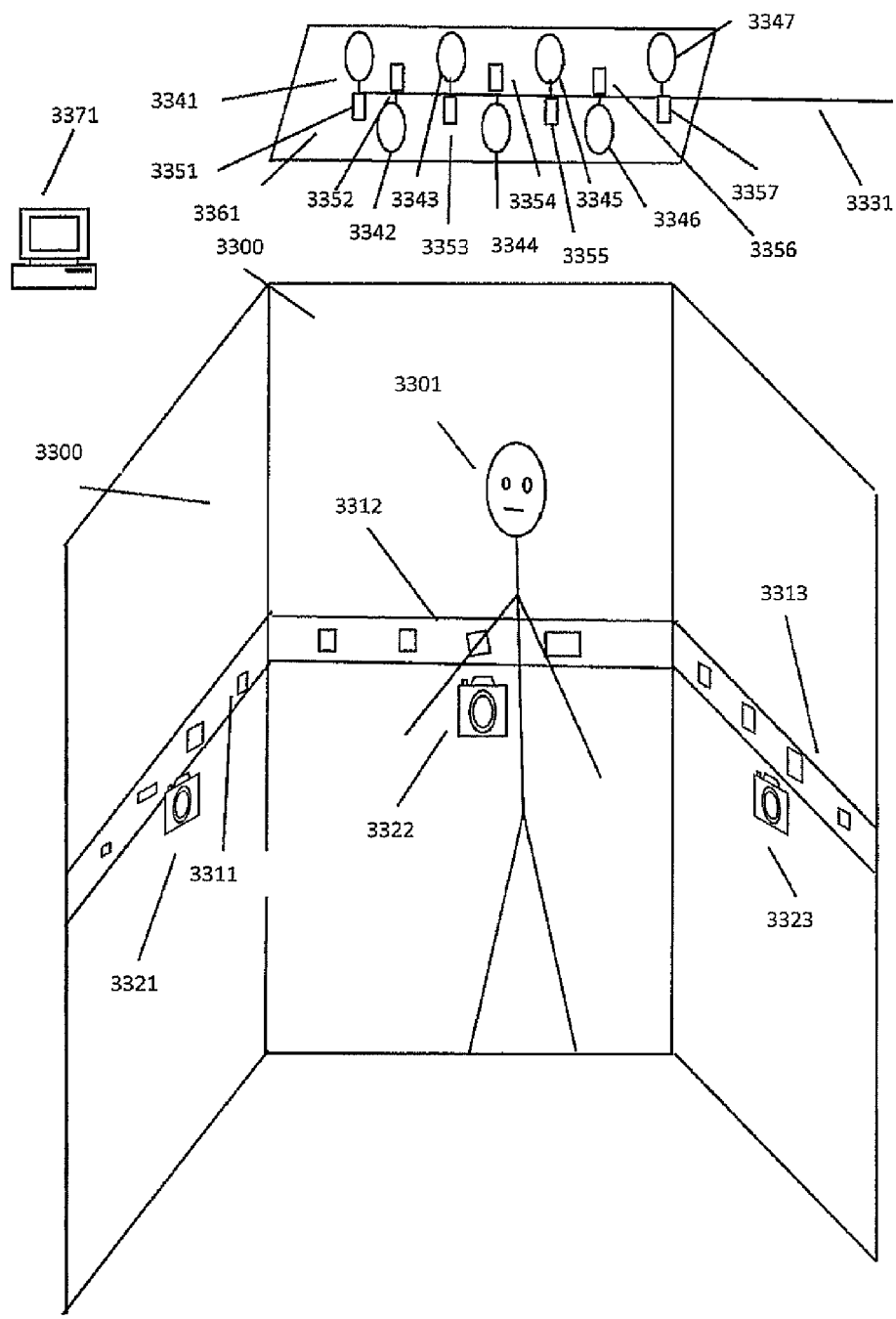
FIG. 33 is a pictorial representation of an example of an application that would best be performed by hardware implementation of Rich color Transition Curve methods Example of Rich Color Transition Curve hardware in order to preserve the modesty of a user in a wireless age.

FIG. 33 illustrates a shower stall that uses smart cameras (3321, 3322, and 3323) that are a hardware implementation of the Rich Color Transition Curve. The person taking a shower (3301), hereafter called the bather, in FIG. 32, is shown as a stick figure in a shower stall (3300) with RCTS (3311, 3312, and 3313) implemented in bathroom tile on the shower walls. A camera with hardware implementation of the Rich Color Transition Curve method that includes a microcomputer and communication capable to sending and receiving cloud data can be manufactured so that the only output possible are data sets defining each target detected such as the target's centroid, orientation, color pattern, and size but no images are output. Such a device will be referred to as a Secure Smart Rich Color Camera or SSRCC. Without any output image, the SSRCC is as innocuous as a light switch preserving the bather's modesty. Data from the SSRCC (3321, 3322, and 3323) can be sent wirelessly to computer 3371 without the fear that someone with malicious intent might intercept camera images of the bather and publish it on the internet. Since no image data can be output, such efforts would be thwarted. The use of normal cameras in home settings potentially places the residents at risk.

In this example, SSRCC 3321, 3322, and 3323 capture Rich Color Transition Curve data sets of the Target Sequences in the tiles on the shower stall wall and send the data sets wirelessly to a computer 3371. The computer compares them to the stored data set when nobody was in the shower stall. The transition curves that are missing compared to the stored file represents those that are occluded by the body of the bather. The cameras from each wall can indicate where the bather is and which shower head must be turned on or off so that the bather is covered with water but otherwise water is not wasted on empty space. The computer 3371 takes in the camera data and computes which shower head (3341, 3342, 3343, 3344, 3345, 3346, and 3347) must be turned on and which must be turned off. It then sends a wireless message to the microcontroller (3351, 3352, 3353, 3354, 3355, 3356, and 3357) that controls each motor driven valve that allows water to pass from the water source pipe 3331 the corresponding shower heads (3341, 3342, 3343, 3344, 3345, 3346, and 3347).

Figure 34:
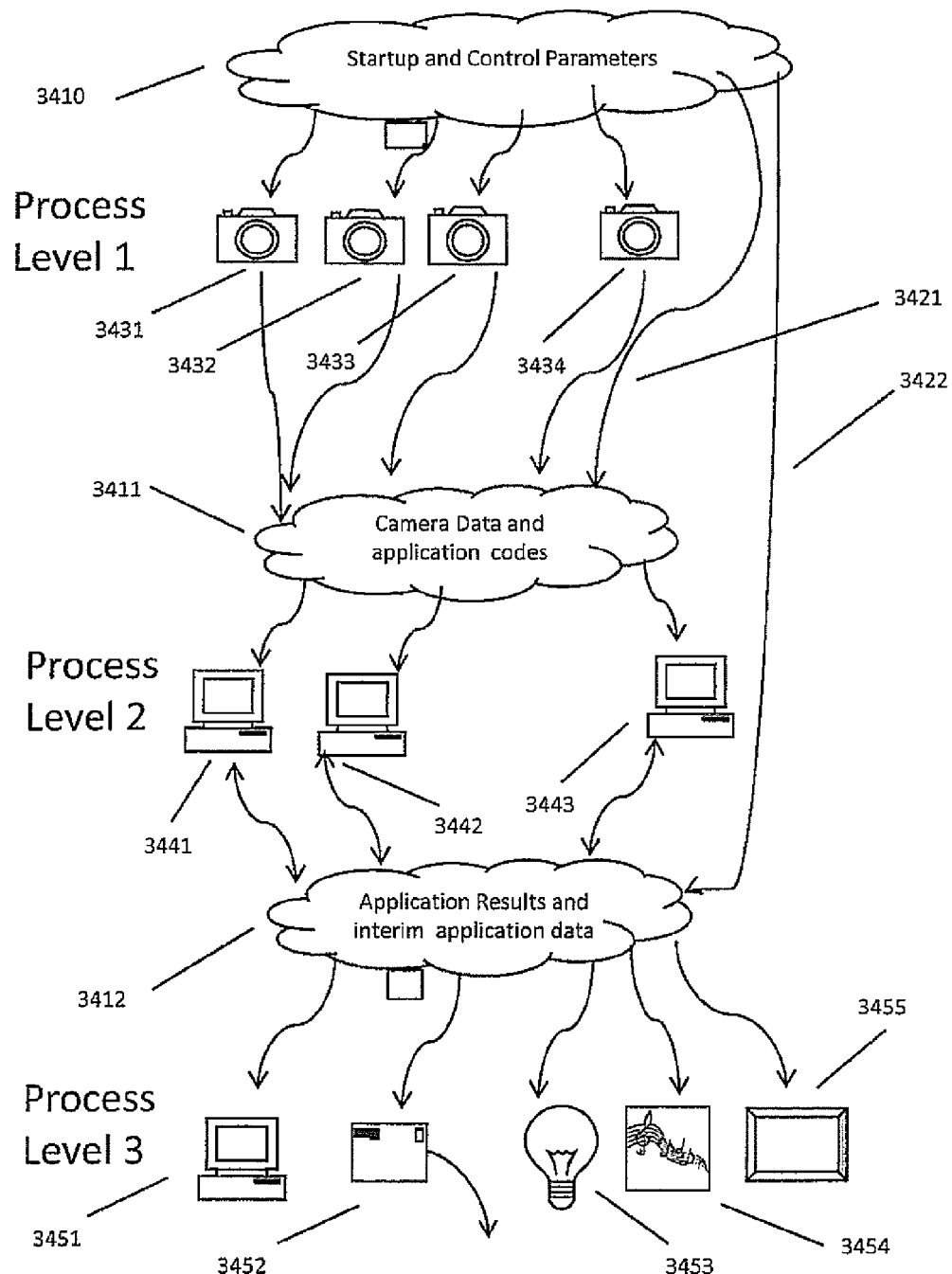
FIG. 34 is a block diagram illustrating how a set of repeatable hardware and software components can be used in a three-step process tied together with cloud communication to solve a variety of machine vision tasks for rigid bodies using Rich Color Transition Curve methods with Rich Color Target Sequences.

FIG. 34 is a block diagram showing how machine vision applications can repetitively use prepackaged vision hardware and software components to solve problems with minimal development. In general machine vision applications are difficult to develop, and time consuming to debug. Only by using experts in the field does one stand a chance of solving even simple problems. When done does manage to get a solution, any minor change to the hardware, the environment, or the lighting can make the whole setup fail. A large number of machine vision applications can be developed with minimal code development by use of rich colored targets and sequences of Rich Colored Targets as shown in the block diagram. As computing devices and cameras get to be small inexpensive devices that can effortlessly send data packets back and forth to each other or to interim cloud storage devices, we can create a set of hardware/software modules that are reusable for many different applications.

The current software trend is to avoid using markers in machine vision applications. But the world is infinitely complex. Typical marker-less application code is written for a limited environment and set of objects to be analyzed. Using Rich Colored Transition Curve targets, we can remove many environmental problems such as variable lighting. We also can remove the need for specialized illuminators, or projection devices. These are passive targets that can be nearly as cheap as paper. One can use as many as necessary and by using them in special sequences as described above to uniquely identify them; And since one can uniquely identify each of hundreds or even thousands of targets, we can easily compare their locations and orientations from multiple cameras. Averaging this data would allow much more accurate location and orientation. Further, 3D locations and orientations can be established as well panoramic data sets.

FIG. 34 illustrates a method to make an ordinary room responsive to the occupants using machine vision technology. This system is designed for quick installation and easy modification. New applications can be added in the same way that one adds new apps to a tablet or cell phone. This system relies on six basic elements:
(1) A cloud storage/retrieval technology that allows software and hardware elements to store and retrieve data between elements and where apps can be stored along with operational parameters.
(2) Smart video camera that consist of computational power capable processing image data with Rich Color Transition Curve methods and handling standard I/O communication with a cloud
(3) Rich Color Transition Curve targets and Rich Color Target Sequences that can be simply, inexpensively, and prolifically placed around the room as the applications dictate.
(4) Computer software capable of using Rich Color target data together with application specific insert able routines to accomplish specific applications.
(5) Computing devices to process the software in (4) and to handle standard I/O communication with a cloud.
(6) Computer hardware capable of handling standard I/O communication with a cloud and utilizing the results of a given application. The devices here will probably be typical smart phones or tablets.

One can envision an interactive room similar to the example of the shower stall surrounded by Rich Color Target Sequence tapes and filled with hotspot locations using such tapes. The room has smart cameras at various locations and angles such that the volume of the room is covered redundantly. The redundancy allows for 3D calibration and fully stitched together 3D space. We use "room" as a proxy for any capture volume such as a factory, warehouse, studio, living room, street scene, etc.

FIG. 34 shows how a vision application can be divided into three process levels each handled by a set of autonomous devices. Each process level is connected to the following level by intermediate data storage preferably a cloud. For simplicity from this point forward, the term "cloud" is used when more generally one could use intermediate data storage of many types. The control parameters (including when to start and stop) that define how the devices in each process level will be operated are stored in a cloud file 3410. The parameters are sent to cloud file 3410 from any smart phone, tablet, or computing device connected to the internet. Every device on Process Level 1-3 an ID and an on/off parameter associated with this ID. Likewise every application "app" has an ID and an on/off parameter associated with its ID. Similarly, to turn on or off or change any application, a user sends a parameter file to the appropriate cloud file. Each device (3431, 3432, 3433, 3434, 3341, 3442, 3443, 3451, 3452, 3453, and 3454) polls the cloud layer above their level searching parameter packets for identifiers of data packets to operate on or control parameters to initiate, modify, or stop their processing as dictated by these parameters. The first process level utilizes a set of smart cameras (3431, 3432, 3433, and 3434). A smart camera means a video camera with an attached computing device and communication capable of sending and receiving cloud data. The smart camera will apply the Rich Color methods to camera data. One implementation is the hardware implementation of the Rich Color Transition Curve method described above. Each frame of the smart camera is processed using the Rich Color Transition Curves method and then sent as data sets to a cloud storage file 3411. The Transition Curve data can be processed immediately and sent as target centroid, color pattern, orientation, and size or sent via the cloud as transition curve data and processed later into target data by application computers (3441, 3442, and 3443) of the second process level. Included in each camera data set is the ID of the camera, the time, date, and frame number. The format of these data sets is consistent so that any application operating on a computer in Level 2 can read and process the incoming data in the same fashion. Process Level 2 has a set of computers (3441, 3442, and 3443) that operates on either target data and solves for a complete application or operate on a subset of the application where it reads the input of one computational subset and outputs the result of that subset to be used by the next subset until all of the computational steps have been completed. The final results are sent to a cloud file to be handled by the third and final process level. Process Level 3 displays, sends the result to storage files, uses results to trigger an action or otherwise uses the result data. The most common devices of Process Level 3 are Internet TVs 3455, or mobile computing devices (tablets and smart phones) for task such as displaying results 3451, send data 3452, turning on equipment 3453 or playing music 3454.

It is only Process Level 2 that has any specific application code. If the application software is written as a sequence of routines each of which reads an input data set and outputs a data set for the next step, the application specific code can be downloaded to the Level 2 computers when the control parameters are initialized or changes and then downloaded.

The steps of Process Level 2 applications will start with using the color pattern and neighboring target data to identify the sequence that a target is part of and from this the target ID, its location and orientation. The sequence database information for the target can then be used together with the cameras calibration data to transform the target location and orientation into absolute coordinate system. Note that the first frame data of each camera will be used to establish the calibration data. If the camera is not stationary relative to a set of background RCTS, then a subset of the calibration must be performed for each frame. Once all of the targets in the video frame are detected, identified, located, oriented and transformed to the calibrated coordinate system, the application code can be used to process this information and produce a result data file that is sent to the cloud. The result data file will include all of the information that will be needed to use the result such as which application this belongs to, the time, date, cameras used, etc. A target rigidly attached to a rigid body with a geometric definition available can be used to locate or orient any part of that body in time and space using multiple video cameras as described herein. The hard thing in machine vision applications is reliably coming up with this information. Typically, the rest of the application (making use of this information) is the easy part.

To better understand, consider the examples shown in FIG. 27 and FIG. 33. In the example of FIG. 27 we use the memory of the tablet 2750 instead of true cloud memory. Also all of the devices for Process Levels 1 through 3 use the same tablet 2750. A simple interface step or app sets the on/off parameter for this example app to on. The software of Process Level 1 polling the memory file sees the app ID has an "on" value. It then loads this value and the setup data for this app into Process Level 1. The camera of the tablet 2760 then captures one image as setup parameters dictate. The image is processed to capture Rich Color target data using the Rich Color Transition Curve method. Finally, the memory file (or the cloud storage 3411) is sent the target data along with its app ID and camera ID and its polling event indicator set to 1. Level 2 has a program the constantly polls for the event indicator set to 1. Upon finding it, this event indicator is reset to 0 and a set of repeatable machine vision tasks are performed using the target data. First the target data is used to detect, identify, locate and orient every target using target data together with target sequence data. Then this information is passed into a calibration function. If more than one camera were part of this application, then the pairs that could be used for stereo image data would be used for 3D calibration and the total assembly would be used to develop a panorama calibration. Further the results would be used to optimize the accuracy of the calibration. Finally, all sequence marker locations and sequence angles are computed in the calibrated coordinates.

Only at this point is it time to use specific application code. This app makes measurements between two corners of an object identified by markers on two Rich Color Target Sequence tapes. The app asks the user to touch near two corners of objects in the display image. The app then searches for the targets nearest each of the two touches. Then the app finds the tape sequence that each of these targets is part of and then finds the sequence mark nearest the touch positions. Finally using the calibration, the coordinates of the two sequence marks is computed and placed in a memory file. Process 3 identifies that a new data file from Process Level 2 is available. The software of this level reads the point data, recognizes the data as defining a line which it displays along with the value of its length.

In the example of FIG. 33 true cloud memory is used, one camera one each wall of the shower stall, one computer 3371 to process Level 2, and seven microprocessors 3351-3357 to control the valves for seven shower heads (3341, 3342, 3343, 3344, 3345, 3346, and 3347). A simple interface step or app sets the on/off parameter for this example app to on. The software of Level 1 polling the memory file sees the app ID has an "on" value. It then loads this value and the setup data for this app into level 1. The cameras on the walls begin to capture frame images as setup parameters dictate. These images are processed to capture Rich Color target data using the Rich Color Transition Curve method. Finally, the memory file (or the cloud storage 3411) is sent the target data along with its app ID and camera ID and its polling event indicator set to 1. Level 2 has a program the constantly polls for the event indicator set to 1. Upon finding it, this event indicator is reset to 0 and a set of repeatable machine vision tasks are performed using the target data. First the target data is used to detect, identify, locate and orient every target using target data together with target sequence data. Then this information is passed into a calibration function. If more than one camera were part of this application, then the pairs that could be used for stereo image data would be used for 3D calibration and the total assembly would be used to develop a panorama calibration. Further the results would be used to optimize the accuracy of the calibration. Finally, all sequence marker locations and sequence angles are computed in the calibrated coordinates.

Only at this point is it time to use specific application code. This app finds targets that are covered by the bather's body. By comparing which targets are visible in the calibration step to the targets no longer visible in the current frame from each camera, we can calculate where the bather is standing. Then shower heads needed to cover the bather with water are identified to be turned on and the rest are identified to be turned off. Finally, this shower head on/off data is placed in a memory (cloud) file. The microprocessors in Process Level 3 each identifies that a new data file from Process Level 2 is available. Each microprocessor acts to turn their valve to a new on/off position if the data file dictates.

To summarize:

1) This method uses inexpensive passive Rich Color Transition Curve targets by themselves or in Sequences such as tapes described above. The Rich Color methods allow us to use ordinary lighting and automatically ignore all but the targets in the room. From this point on, the only camera data that is used comes from target data packets greatly simplifying machine vision solutions.

2) Since the targets and sequence tapes are inexpensive, targets are used liberally so that a significant number of targets are seen by two or more other cameras allowing for 3D calibration around the whole room.

3) Using the Rich Color methods described in this application, it is possible to identify any target that is not blocked by a person or object.

4) Large numbers of cameras can be used to cover all angles and focus needed for the application. If the cameras are placed next to target sequences, it is possible to use the associated sequence database together with target data from multiple cameras to calibrate the full room.

5) The Rich Color methods are essential for cloud usage since only when the data is reduced to a small data set that can be transferred in real time.

6) Since most residents value their privacy, home applications that use cameras connected to the Internet are likely to appear risky. It is best to use the hardware implementation of the Rich Color Transition Curve as discussed in the example of the shower stall which will show nothing but a few lines of target transition curves.

7) The applications considered in this method all use targets attached to rigid bodies. Knowing a target's 3D orientation and orientation allow a computation of the same for any part of the rigid body.

8) Everything up to this point is the same for any application. Process Level 2 reads the target data in a standardized format independent of the application. Then each target ID, location and orientation needed for the specific application is sent to the application code and a result is calculated and sent to the results cloud file.

9) In Process Level 3 each device that uses the cloud results of Level 2. Each device in Process Level 3 constantly poles the cloud until the result file that it operates on has changed and is now available. Then this device uses the data as its setup parameters dictate.

10) Note that only a portion of the code in Process Level 2 is unique to an application. Also, most of the code in Process Level 3 is composed of reusable code.

U.S. Pat. No. 8,064,691 discloses a means of filtering out all but Rich Colors of interest within an image under inspection. The resulting Rich Colored patches can be used to identify and track targets or Rich Colored objects.

In this patent application, the Rich Color methodology is extended and used to replace tracking methods like blob analysis. This is a robust method using a computer or embedded computer chip or specialized camera circuitry to rapidly find the location of a target within an image by searching for Rich Color patches adjacent to each other within a tolerance. This process can be performed in one process as it sweeps across the image one search-line at a time. An image with N color components can have up to N factorial (N!) Rich Color types. In the case of a RGB image (N=3), six possible color types can be identified for a pixel (Red, Green, Blue, Cyan, Magenta, Yellow). The sub-set of color types that are searched for are called Rich Colored Target Colors or just Target Colors. If the color type of the pixel is not a Target Color, the color indicator of the pixel is identified as a "non-Target Color" type. This method searches for Target Color patches different color type that are located adjacent to each other within an input tolerance. The method creates sets of adjacent pixels that have a common color type (including the color type of "non-target color"). The image is processed along search-lines (rows, columns, diagonal lines). Anytime on the same search-line that the end of one such pixel set is located within a tolerance of the beginning of another pixel set from the same search-line and both have different Target Color types, then a Transition Point can be defined. The Transition Point is located along the search-line at a weighted statistical location between the end and the start locations of these two pixel sets. These Transition Points can be strung together forming Transition Curves whose geometric and color properties and proximity to other Curves are used to detect and identify targets and objects of interest as well as locate, orient, and characterize them. This information can then be used to initiate computer applications and determine input data.

The method includes the step of using a distance equation (described in the definitions section) in this Color Ratio Space which is used to determine the presence of any of the N factorial Rich Color types that are used to identify the object or target that is being searched for. For a pixel located I, j the color distance equation is defined as follows in terms of ratio space color component values ($c_1$, $c_2$, . . . cN):

$$A_m = POS(B_{1,m}*(f(c_1)-T_{1,m})) + POS(B_{2,m}*(f(c_2)-T_{2,m})) \ldots + POS(B_{N,m}*(f(c_N)-T_{N,m}))$$

Where, for color component n and color filter type m, $T_{n,m}$ is a color threshold, $B_{n,m}$ is the Bias, $f(c_n)$ is a function of $c_n$ and the function POS (A) such that POS (A)=0 if A is less than or equal to 0, ELSE POS (A)=A. Since only a binary result (zero or non-zero) answer is of interest, the POS functions above can be replaced with traditional IF tests.

Alternatively the method further includes the step of creating a corresponding look-up-table for each primary color and secondary color used in a target capturing an image and subtracting from each pixel in the image the bias of each camera color component apply the ratio space look-up-table to each pixel in the image for each primary and each secondary color used in the target to implement a color filter in this color ratio space to determine the presence of any of the N factorial Rich Color types that are used to identify the object or target that is being searched for.

A robust method using a computer or embedded computer chip or specialized camera circuitry to rapidly find the location of a target within an image by searching for Rich Color patches adjacent to each other within a tolerance.

This method can be implemented on a variety of platforms. It could be developed as a software program running on common personal computers, tablets or smart phones. It could be implemented at a hardware level as a dedicated chip that could be designed-in to hardware systems such as digital cameras. It could be implemented as a stand-alone appliance that could be retro-fitted to existing systems.

The method described herein can be used iteratively on the same data to find the optimal thresholds and bias parameters.

This method can be extended to include more than just the typical three sensor channels (R,G,B). It is likely that digital cameras will soon be commercially available with four sensor channels and cameras with even more channels will be available later in the decade. Furthermore, Security cameras commonly include infrared sensors.

Poor quality data streams (for instance those shot in very low light) could be enhanced to emphasize their rich color characteristics prior to processing by this method in order to allow the processing of data that might otherwise be unusable.

The method further includes the step of setting an indicator for each pixel that identifies the type of Rich Target Color present or the lack of a Rich Target Color.

The method further includes the step of identifying a pixel as having a non-Rich Color if each of its input color components is less than a black tolerance.

In this disclosure, a rich color transition curve sequence (RCTS) refers to a set of three or more sub-targets on a planar carrier such that their centers are collinear. Each sub-target is composed of a set of patches of rich color. This sequence is referred to as a "ruler" or R1D for ruler in one dimension. The boundary between rich colors is called a transition curve. The sub-target centers are defined by an ideal camera using the RCTS method. Each RCTS has a database entry that defines: 1) the size, colors, shapes, transition curves of each sub-target, 2) the offset from a best fit of centerline fit, 3) a unique ID, number, and 4) the separation distance between the sub-target centers as represented along the centerline. For simplicity of description this document will assume that the sub-target centers fall on the centerline. In real life, we might have to have a best fit line through the sub-target centers and treat the projections of the centers on this line as the center points. A "multipoint line segment" (MLS) is the line segment and the set of collinear sub-target center points, $P_1(x_1, y_1, x_1), \ldots, P_N(x_N, y_N, x_N)$, that form it. The MLS intersects the outer edge of the associated RCTS carrier at an offset distance of CI1 and CIN respectively. The MLS and offset distances for any sub-targets and carrier interest offsets are stored in the database associated with the targets. A single coordinate sequence can define the 3D location and orientation of the line itself. If the targets are attached to a rigid body, multiple solutions exist for rotations around the line used as an axis of rotation. A second coordinate sequence viewed by a camera in any VO can determine the rigid body location and orientation. For many 3D measurement applications, the rotation problem is irrelevant (see discussion of FIG. 38A).

A pair of coordinate sequences can be used to define the complete location and orientation of a rigid body to which they are attached or define a 3D coordinate system. Two types of such pairs of R1Ds are used throughout this document. An "iron cross" (IC2D) is a target composed of two RCTS sequences that are coplanar, collinear, and orthogonal to each other. The form has a central sub-target that is shared by both target sequences. A variant is a "carpenter square" (CS2D) where the two coplanar, collinear, and orthogonal sequences form a right angle and share a common start sub-target at the origin for each sequence.

A "vision room" (VR) is a 3D space that contains "room elements" (RE). The VR is used to track and record the location and orientation of targeted objects. The VE of a VR can be: 1) VOs (described below) that are a modules used to deploy smart cameras, standalone smart cameras, "tracking objects" (TOs) that are targeted objects being tracked, a "room computer" (RC), and a database. Each TO is composed of a real world rigid body with one or more RCTS or IC2D or CS2D targets. The RC compiles the 3D data from the camera image analysis and transforms the data into the coordinate system of the room (RCS). Then it checks the list of instructions with associated 3D location and orientation described in the last patent as a "see-this" list. Each entry has an associated "do-that" instruction that is sent to an application program to be acted upon.

The "room coordinate system" (RCS) is the single common reference coordinate system that is used to determine the location and orientation of any VO in a VR.

A "vision object" VO is a real world object composed of a computer, one or more smart cameras, one or more targets or coordinate sequences, and a database that includes transformation matrices, calibration data, and other information. Ideally the targets are IC2D or CS2D targets. A VO is likely to be a vase, lamp shade, piece of furniture, picture frame, TV, or other object appropriate for the room setting. The VO's computer (VOC) gathers target data from the smart cameras of the VO. The VO's computer determines the ID of the target sequences, then locates and orients them in 3D and transforms this to the object coordinate system of the VO. This data having been processed with the RCTS method can now be sent as small data packets to the RC.

A "vision element" (VE) is a computer, a target sequence, a database, or a smart camera that compose a VO. A VO has multiple VEs.

A 'smart camera" is defined here as a computing device that has a camera (with a lens, focal plane, and other features found in an Apple iPhone camera), for example. The computing device and the camera may be integral as a single component or separate, but coupled together. It also has a CPU and memory as well as communication capability such as Wi-Fi. The smart camera used here can grab a video frame and process it with the RCTS methods and the Wi-Fi packets containing RCTS location and orientation. A modern tablet computer or smart phone are good examples of smart cameras.

An "object coordinate system" (OCS) is as a single common reference coordinate system for all VE in a VO. These are used to determine the location and orientation of any target in the VO or anything in the field of view of any camera in a given VO.

This identifies methods and apparatus for measuring, locating, and orienting objects in 3D using VOs. The VOs are easy to calibrate and the cameras of the VOs have fields of view that cover the regions of interest in the 3D space where items to be tracked are most likely to move. The methods described herein make it possible to increase the pixel density of a given region in the 3D space by simply placing more VOs in that region.

Using RCTS as optical targets together with a large array of smart cameras, a relatively inexpensive tracking system can be produced to turn ordinary rooms into simple control interfaces for computer driven applications or recording of 3D data. A simple method for self-calibration for the complete room of cameras and targets is disclosed. By using electronic displays of RCTS, such as OLED strips, several characteristics of RCTS can be optimized for faster detection and processing. The method discloses how a simple VO can be constructed with today's smart phones and tablet computers.

Pioneering products such as Intel's Curie computer lead the way to a world of ubiquitous, small, inexpensive devices called the "Internet of Things (IOT)". The development of cheap camera chips semiconductors and button sized battery powered computers that include wireless communication open up applications using multiple smart cameras that can self-calibrate and communicate with each other and to other computers that use this data and apply it to control and record keeping applications. While large arrays of cameras would make many engineering applications possible, the chances of seeing these outside of a laboratory setting is unlikely unless several problems are addressed:

Cost: Nothing stops wide spread application of a technology like cost. Once simple smart cameras are produced in the $25 price range, the technology described herein will complete the low cost system. A simple system set-up is disclosed which will eliminate the need for costly technicians for installation, modification, and maintenance. The tracking and data handling methods of the RCTS vastly reduce the costs for computing and data transmission. Targets can be simple printed paper, painted, or electronic displays. A party version for game control could be constructed using the smart phones and tablet computers of the party goers.

Simplicity and Reliability: Users have grown to expect simple reliable products. The quickest way to kill a product is to fail to address this problem. An element of any application of multi-camera tracking is simple set-up. The system must also be immune to inconsistent lighting due to cloud cover or changes to artificial lighting as day turns to night. The rich color methodology was designed to handle variable lighting problems. One of the reasons for using multiple cameras is to see the same object from multiple sides and multiple views. If a person walks in front of one camera and occludes the view of an object being tracked, one of the other cameras can take over and still determine the objects location and orientation.

Data Compression, Processing Speed, and Privacy: The RCTS method quickly filters out almost all of the pixel data of an image as it finds a target's location, orientation, and ID. This leads to speed, data compression, and privacy. By reducing the demands for number crunching, small low cost computing devices can be used throughout the system. Further, only small data packets need to be sent over the Wi-Fi network. The latter is vital when potentially hundreds of high speed high resolution cameras are at work simultaneously. Also the data collection of multiple targets over time can be a relatively simple task if the data packets are very small. Both the RCTS method and the new autonomous smart camera processing methods described herein, are well suited for parallel processing.

Extensibility and Rearranging Objects: In the same sense that a person might buy a lamp to enhance the lighting in a dark corner of a room, there might also be a need for more cameras to cover a region of the room. The method daisy chains the camera data from one VO to another and presents all camera data in a single world coordinate system. VOs can be added, removed, or rearranged at a moment's notice if the system regularly sets-up. The cycle time for this set-up would depend on the need. It might be every frame of the camera or every new use of the room. This also makes the system more reliable in case someone knocks a system object while operating the system.

Accuracy: Attaching multiple cameras to rigid objects that have targets that can be seen from multiple cameras from multiple sides has the advantage that the location and orientation of the object and everything attached to it can be determined by statistical averaging methods that improve the measurements greatly over a single calibration measurement.

In this method and apparatus lens distortion is not considered and it is assumed that the pinhole camera approximation is good enough. It is also assumed that all cameras are in focus for the targets that are being used. These are considered as refinement details with solutions in the open literature or built into hardware. It is assumed that the intrinsic camera calibration (focal length etc.) is known and the units of the pixel distances in the camera plane are in the same units as the target and room data is given in a manufacturer's data base.

To build a seamless optical tracking system for control of computer applications, a dense pixel coverage is needed within a limited 3D volume (referred to as a "room"). Coverage is needed from multiple angles. Cameras are also needed to be placed within the interior of the volume. Ideally these cameras should be fitted on or to objects (vision objects) that appear natural to the room. These objects are referred to as VOs. A VO is a rigid body that includes multiple VE such as a computing device, targets and cameras, as well as a database for all the VE in the VO. This database contains computer data that identifies and describes every feature, location, and orientation of these VE. Any VO has an OCS that can serve as a single common reference to describe the location and orientation of anything in the field of view of any camera in the VO. For simplicity, in this description only two types of coordinate sequence targets are used in the VO, the iron cross and the carpenter square. Each of these targets is composed of two coplanar collinear target sequences that are orthogonal to each other. The two target sequences define a coordinate system where the x and y axes lie in the direction of the sequences and their cross product defines the z axis which points out of the VO surface. The origin of the coordinate system associated with the iron cross is defined by the intersection point of the two sequences forming the cross. The carpenter square shares a common sub-target at the end of one sequence and the start of the second sequence. Again, for simplicity, the intersection point of the two sequences coincides with the center of a sub-target shared by both sequences. The X and Y axes are distinguished from each other by the target sequence IDs and other characteristics described in the VO database. The positive and negative coordinate directions of the axes are defined to be consistent with the Z axis direction and the database information. A set of offsets can be stored in the associated VO database and used to translate the coordinate system of the sequences to a more useful location.

Classical linear algebra shows that any point in 3D described in terms of the bases of one Cartesian coordinate system can be rewritten in terms of a second Cartesian coordinate system if the offset vector between the two origins and the angles of rotation the corresponding axes are known.

$$A = C*B + T$$

The vector and matrix manipulation needed for this transformation are standard in graphic processor units (GPUs) today and CPU software. So for any VO we could quickly transform any 3D point defined in a VE coordinate system to the values in the OCS of the VO. From here we could transform the point to the coordinate system associated with any other VE in the same VO. The calibration of any VO and all of its VE could be done in a factory and shipped in an associated data base as transformation matrices. So already the problem of a multi camera system is reduced to the targets on objects to be tracked and a small number of VOs.

Using rich color target sequences, much of the complex slow calculations usually associated with 3D photogrammetry can be eliminated. So much of the complexity comes from the need to determine a single point in 3D purely from camera data information. Stereo photogrammetry stationary typically requires two cameras of known separation distance and known orientations to view the same point. FIG. 38 A,B,C,D illustrate how a single camera snapping a single frame from an arbitrary location at an arbitrary angle can make 3D measurements and even define coordinate transformations for calibration of the room.

Rich colored transition curve sequences are used to uniquely identify, locate, and orient VOs and their VE. Sequences that fall on a straight line or can consistently be best fit to such a line segment are used so that the separation distances of the sub-targets making up the sequences are known and can be used to determine the unique location and orientation of the line segment in camera coordinates. This line can be expressed in the OCS of the VO containing the camera. If the targets seen by the camera are an iron cross of a second VO, the transformation matrices of these VOs can be used to rewrite any point in one OCS in that of another. This is straight forward linear algebra except for the missing step of determining the target sequence in 3D camera coordinates.

This can be reduced to a simple problem of tracking objects with RCTS and VOs with iron crosses leading to fast, cheap, and easy to use methods and apparatus for 3D tracking. The simple problem is just looking for rich colored transition curve sequences (from as few as three per sequence). Typically, optical tracking uses cameras of known separation and orientation to find points in 3D with unknown relative locations and orientations. Instead, this coordinate method uses coordinate sequence targets composed of three or more sub-targets with known location and orientation with respect to each other. All sub-targets of a sequence are coplanar.

Figure 35:
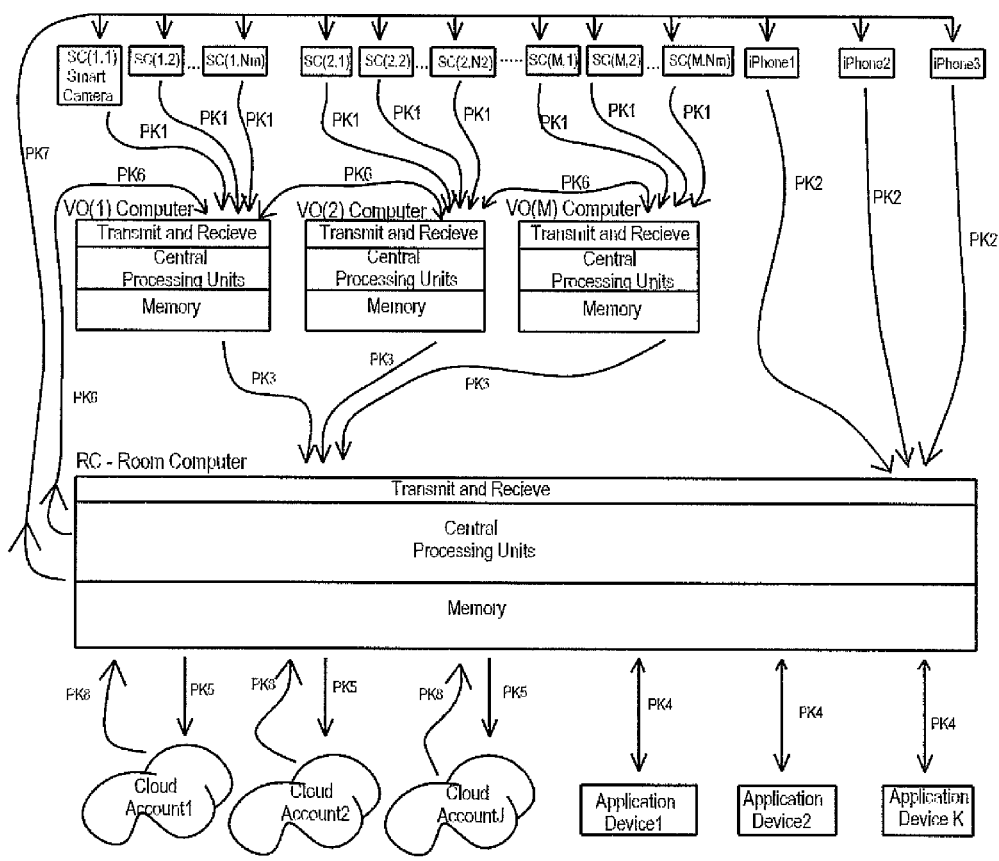
FIG. 35 is a diagram of the data flow from smart cameras to VOs to RC to storage or applications.

FIG. 35 is a diagram that illustrates data flow from smart camera to VO to room computer and finally to use the results by storing the 3D paths of objects or generating control commands for application devices. Over the life span of this patent computer technology will change dramatically and where computing is performed will depend on the power of the devices. FIGS. 37 and 38 will cover how this method can be implemented by parallel computing, for example.

In the following description of the method of tracking an object position in a 3D space, the method is described as providing at least one target on one object in the 3D space, where the target includes a plurality of sub-targets arranged in at least one sequence, as well as providing at least one camera in the 3D of target IDs along with target location data in a camera image frame taken by the camera to determine the 3D coordinate position of the object in the 3D space, it will be understood that the method also encompasses a plurality of targets carried on or attached to a plurality of objects in a 3D space, a plurality of cameras, also attached as a VE to a VO in the 3D space where at least one target is associated with at least one camera, and a computing device associated with at least one camera.

Eight types of packets that carry data around the vision system of a VR are shown as PK1 to PK8. A smart camera has one or more processors that analyze an image frame of a camera with the RCTS method and puts the information in PK1 data packets that are then sent to the associated VO for further processing. There is a PK1 for each sub-target in each frame of each camera in each VO. Each PK1 has all of the information needed for the next processing stage in the VO. A typical PK1 has the following sub-target information: 1) the x, y location in camera coordinates of the target center, 2) the rich color ID of this target, 3) the orientation of the line through the target's transition curve centers, 4) the orientation of the electronic display carrier (see discussion of FIG. 39 or 40 for static display), 5) the size of the target, 6) the coordinated universal time (UTC) that the frame was taken, 7) an index number identifying the sub-target found within the frame (from first through last or 1=1,I), 8) an index number identifying the frame number (j=1,J), 9) the camera ID of the VO (k=1,K), and 10) finally rich color transition curve shape. If the camera changes in parameters due to automated processing such as for lighting or focus, the parameter information associated is included in PK1.

The VO receives PK1s from all of its cameras and sorts these into sets of sub-targets i, from a given camera k, and frame j. Those sets are sorted into the RCTS sequences that are in the room database. Since the sub-target centers used here are collinear on the real world sequence, they should be linear image points of the camera focal plane. Now for each RCTS sequence found in each camera frame, the 2D image centers of the sub-targets define a best fit line and the sub-target center can be replaced by points on this line nearest to the center locations in PK1. For simplicity these points will be referred to as sub-target center points. The analysis of FIG. 37 shows that three collinear image points together with the ID of the sequence giving it the separation distances is enough to determine the 3D location of each of the real world points in camera coordinates. Transformation matrices provided by the manufacturer of the VO allow all sequences seen by any camera in the VO to be represented in the OCS of the VO.

The results of the analysis of the VOs are then packaged up as PK6 and transmitted either to another VO that is daisy chained to the receiving VO (see discussion of FIG. 40) or packaged directly as PK3 and transmitted to the room computing device (RC). The PK6 packets are the same as the PK3 packets except that they are received by a VO and their data is then converted to the new VO's OCS and ultimately transmitted to the RC. A typical PK3 has the following sequence information: 1) the 3D location (x, y, z) of the two outermost sub-target centers in the VOs OCS coordinates, 2) parameters for the line between these two sub-target centers that define the other sub-target centers as well as the intersection of this line with the outer edges of the carrier, 3) an identification number for the OCS used to represent the 3D locations, 4) the coordinated universal time (UTC) that the frame was taken, 5) an index number identifying the frame number (j=1,J), 6) the camera ID, and 6) the VO ID.

These smart cameras shown here as iPhone1 to iPhone3 are not connected to any VO. PK2 data packets are the same as those of PK1 but the burden of processing is left to the room computer which handles this data as though it were a VO.

Data packets received by the RC are then processed. The two outermost center points of each sequence are sorted in time using the UTC. These form two paths in time. If the sequence is stationary the data is averaged to produce a more accurate result. A refinement can be made using weighted averages upon measuring the quality of the image data. Using database information, the locations of points of interest on the rigid body to which the sequence target is attached can be determined. Linkages and relative positions can be computed. The results can be stored in PK5 packets that are sent to cloud accounts or they can be used to define control parameter packets PK4 sent to application devices. The application devices can, in turn, modify the RC application software parameters.

Manufacturer data, user data, setup data, operational parameters can be sent over the Internet to a user cloud account. From there the information can be sent as PK8 packets to the RC. From here to information can be distributed appropriately to the smart cameras with PK7 packets and to the VOs with PK6 packets.

The computing device can be any type of computing device, including a handheld, desktop, or other form of single computing device, or it can be formed of multiple computing devices. A CPU in the computing device can be a conventional central processing unit or any other type of device, or multiple devices, capable of manipulating or processing information. A memory in the computing device can be a Random Access Memory device (RAM) or any other suitable type of storage device. The memory can include data 106 that is accessed by the CPU using a bus. The memory can also include an operating system and installed applications. The installed applications include programs that permit the CPU to perform the method described herein.

The computing device can also include secondary, additional, or external storage, for example, a memory card, flash drive, or other forms of computer readable medium. The installed applications can be stored in whole or in part in the secondary storage and loaded into the memory as needed for processing.

The various targets, and the smart cameras and vision objects or computing devices associate with each target are coupled for wireless communication for the above-described data transmission. Thus, as shown in FIG. 35, each of the smart cameras are wirelessly coupled to its associated VO computing device. The VO computing devices can in turn be wirelessly coupled to other VO computing devices and to the room computing device. The separate smart phones, not associated with a VO computing device, wirelessly communicate via Bluetooth, Internet or other wireless communication protocols directly to the room computing device.

Figure 36A:
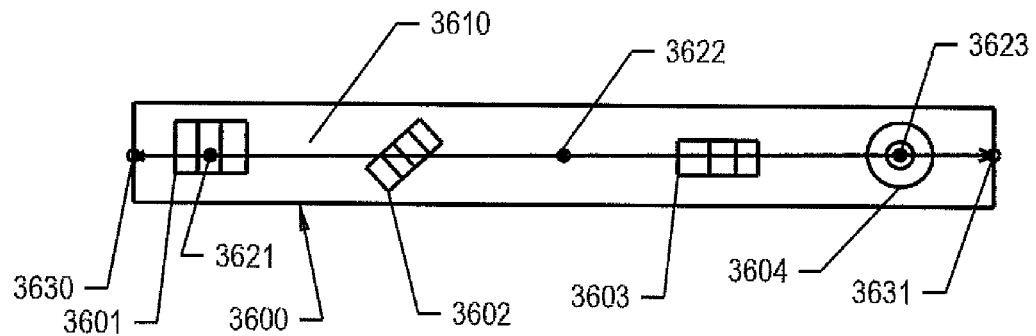
FIG. 36A illustrates an example of a single RCTS sequence", "ruler", composed of four sub-targets on a planar strip carrier that define a line in 3D.
Figure 36B:
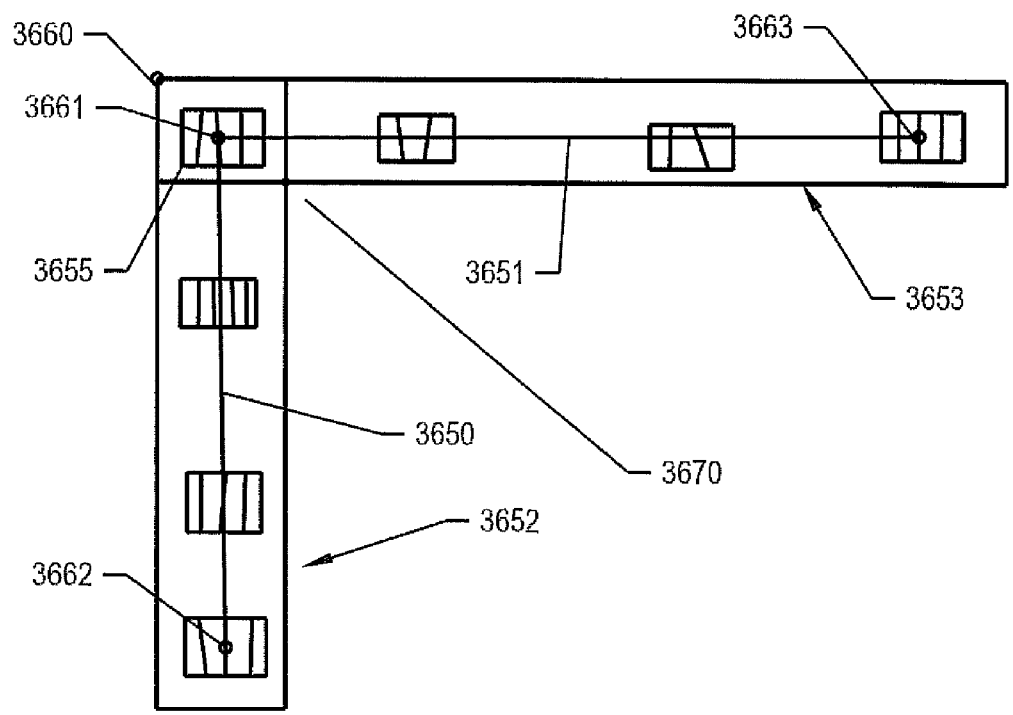
FIG. 36B illustrates an example of a pair of RCTS sequences, "carpenter square", each composed of four sub-targets but sharing one of these on that define a plane in 3D and a 3D coordinate system.

FIGS. 36A and 36B show three rich color target sequences in real 3D space. In FIG. 36A, the first sequence 3600 is used together with camera images to determine the location and orientation in 3D with respect to other objects. In this example the sequence is made up of a plurality of four sub-targets (3601, 3602, 3603, and 3604). For simplicity the sub-targets are displayed as rectangular blocks targets of rich colors each separated by simple straight line transition curves. Occasionally a bull's-eye target is displayed to remind readers that rich color transition curve targets can be composed of a variety of colored patch shapes. A least squares method is used to determine the best fit line 3610 through the centers of the sub-targets. A start point 3621 is located on this best fit line that is nearest to the center of sub-target 3601. An end point 3623 is located on the best fit line nearest to the center of sub-target 3604. Likewise, any sub-target center has a nearest point on the best fit line. The math associated with FIGS. 37A and 37B all use these "adjusted" sub-target points. When a camera grabs an image of sequence, the RCTS methodology described in the inventor's co-pending U.S. application Ser. No. 14/014,936, can identify the sequence and look up the associated database information such as the distance between "adjusted" sub-target centers, first and last points on the best fit line, any offset information, and geometry information about the object to which the sequence is attached. Additional points, such as the intersection of the best fit line with the edge of the carrier 3630, 3631, can be established for measurement applications using database offset information associated with the sequence.

FIG. 36B also shows a coordinate sequence in the form of a carpenter square formed by a pair of coplanar, co-linear orthogonal sequences 3652, 3653 used to define a 3D coordinate system. The sequence pair share a common sub-target 3655 that starts each of the orthogonal sequences. The best fit line 3650 of sequence 3652 forms an x axis and best fit line 3651 of sequence 3653 forms a y axis. Unlike the simple best fit of the line 3610, this best fit has the additional constraints that the lines 3650 and 3651 are orthogonal and coplanar. The intersection of the lines can define an origin point 3661 for a 3D coordinate system with the Z axis outward from the object surface to which the sequences are attached. Additional points such as 3660, 3670, 3671, 3672, can be established for measurement applications using database offset information associated with the sequences.

Figure 37A:
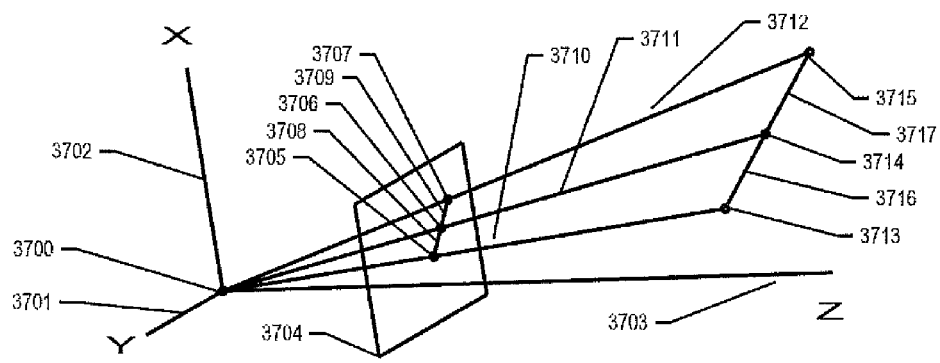
FIG. 37A illustrates three rays in camera coordinates passing from a focal point through three image points on a camera's focal plane to three points in 3D on the centerline of a "ruler"

In FIG. 37A, three collinear and unequally spaced (distance $L_1$ and $L_2$ apart shown as 3716 and 3717) target center points 3713, 3714, 3715, denoted $P_0$, $P_1$, $P_2$ are shown in the 3D camera coordinate system. The images of the targets in the camera focal plane 3704 are denoted $p_0$, $p_1$, $p_2$ (shown as 3703, 3706, 3707) separated by the distances 3708 and 3709. The camera coordinate system is shown with a focal point or origin at 3700, x and y axes as 3702 and 3701 and a positive z axis 3703 with a focal plane perpendicular to the z axis at a distance f from the focal point. The components of the 3D direction vectors through the image points are given by the 3D image point coordinates as follows:

$$p_i = (x_i, y_i, f), i = 0, 1, 2.$$

Let $P_0$ be the closest endpoint target at distance $l_0$ from the focal point. The distances to the other two targets are $l_1$ and $l_2$, respectively. The seven points—i.e., three target points, three target images in the focal plane, and the camera focal point—are all coplanar and lie in the "image-line/target-line plane" formed by the three rays 3710, 3711, and 3712.

Figure 37B:
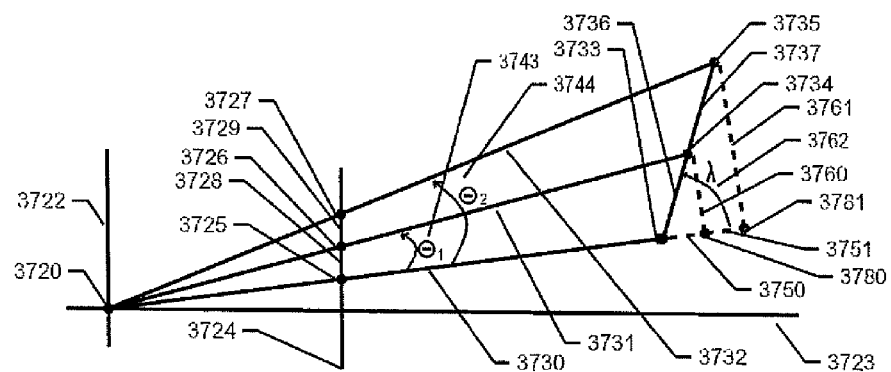
FIG. 37B illustrates the same three rays passing through the same six points but this time the drawing sheet is parallel to the plane formed by the camera rays.

In FIG. 37B the "image-line/target-line plane" is tilted over so that it is parallel to the plane of the drawing sheet. This is a major simplification, all the interesting distances and the actual 3D locations of the target points in the 3D camera coordinate system can be determined using simple planar trigonometry. This plane contains the focal point or origin of the camera coordinate system, 3720. The "horizontal" and "vertical" axes (3723 and 3722), however, are arbitrary since, in general, the plane through the seven points does not contain the any of the camera coordinate axes. The angle $\Theta_1$ is formed between rays 3730 and 3731 and passing from the focal point 3720 through the points $P_0$ 3733 and $p_0$ 3725, and $P_1$ 3734 and $p_1$ 3726. The angle $\Theta_2$ is formed between rays 3730 and 3732 and passing from the focal point 3720 through the points $P_0$ 3733 and $p_0$ 3725, and $P_2$ 3735 and $p_2$ 3727. Extend ray 3730 to point 3781 where a perpendicular line 3761 from this ray strikes the end of ray 3732 at point 3735. Draw a perpendicular line 3760 from point 3780 on the extended ray 3750 to the end of ray 3731 at point 3734. The angle $\lambda$ 3762 is formed between ray 3730 and the line passing through the points $P_0$ 3733 and $P_2$ 3735.

The angle $\Theta_2$ and $\Theta_2$ are given by the following dot products between the rays $$\Theta_1 = \cos^{-1}(p_0 \cdot p_1 / |p_0| * |p_1|) = \cos^{-1}[(x_0 x_1 + y_0 y_1 + f^2)/\mathrm{sqrt}((x_0^2 + y_0^2 + f^2)*(x_1^2 + y_1^2 + f^2))],$$

$$\Theta_2 = \cos^{-1}(p_0 \cdot p_2 / (|p_0| * |p_2|)) = \cos^{-1}[(x_0 x_2 + y_0 y_2 + f^2)/\mathrm{sqrt}((x_0^2 + y_0^2 + f^2)*(x_2^2 + y_2^2 + f^2))],$$

As an aid to the analysis, the ray to the endpoint target is extended so that the right triangle (dotted lines in green) can be constructed. The angle $\lambda$ 3762 between the extended ray and the line that passes through the three collinear target points is unknown.

The following equations are obtained from the tangents of the base angles in the two right triangles, respectively:

$$\tan \Theta_1 = L_1 \sin \lambda / (l_0 + L_1 \cos \lambda),$$

$$\tan \Theta_2 = (L_1 + L_2) * \sin \lambda / (l_0 + (L_1 + L_2) * \cos \lambda).$$

Each of these equations can be solved for the unknown $l_0$ as follows:

$$l_0 = L_1 * (\cot \Theta_1 * \sin \lambda - \cos \lambda), \text{ or}$$

$$l_0 = (L_1 + L_2) * (\cot \Theta_2 * \sin \lambda - \cos \lambda).$$

By equating the last two equations, the unknown $l_0$ is eliminated, and the remaining expression can be solved for the unknown angle $\lambda$ as follows:

$$\lambda = \cot^{-1}[(L_1 + L_2) * \cot \Theta_2 - L_1 * \cot \Theta_1]/L_2.$$

Once $\lambda$ is known, the value of $l_0$ is given by either one of the above expressions for $l_0$. Further, the Pythagorean Theorem can be used to obtain the lengths, $l_1$ and $l_2$, of the other two rays as follows:

$$l_1 = \mathrm{sqrt}[(l_0 + L_1 \cos \lambda)^2 + L_1^2 \sin^2 \lambda] = \mathrm{sqrt}(l_0^2 + 2 l_0 L_1 \cos \lambda + L_1^2),$$

$$l_2 = \mathrm{sqrt}[(l_0 + (L_1 + L_2) \cos \lambda)^2 + (L_1 + L_2)^2 \sin^2 \lambda] = \mathrm{sqrt}[l_0^2 + 2 l_0 (L_1 + L_2) \cos \lambda + (L_1 + L_2)^2].$$

With the lengths of the rays to the three collinear points known, the locations of the points in the 3D camera coordinates can be determined. Finally, the 3D position vectors $P_i$ that emanate from the focal point and end at the target points are given by the following products of the unit direction vectors along the rays and the lengths of the rays, respectively as $$P_i = l_i * p_i / |p_i|, \; i = 0, 1, 2.$$

This method using image points $p_i$ for finding 3D locations of points $P_i$ along a line associated with a RCTS target sequence will be referred to as the Lambda Method.

Since the position vectors to the 3D space points are linear extensions of the position vectors to the three points in the camera focal plane, the three target points are collinear if and only if the three focal points are collinear. Any consistent measure that determines three co-linear points is sufficient to locate a line in 3D with a single camera so long as the line is within 45° of parallel to the camera plane. Likewise, any consistent measure that determines two orthogonal lines in a plane is sufficient to determine the coordinate transformation needed to so long as the plane is within 45° of parallel to the camera plane. Although the FIGS. 35 to 45 exhibit the use of collinear points, the equations also work for non-collinear points that are rectified with the help of best fit methods. The ultimate test is whether the distance between the first and third targets equals the sum of the distances between the first and second, and second and third target points, i.e.

$$\text{Collinearity if and only if } d(p_0, p_2) = L_1 + L_2.$$

While it can be said that there will always be errors in location and orientation due to pixel noise and finite resolution of any camera image, statistical weighted averaging and best fit methods can reduce these problems. A truly collinear line can only come from a best fit method such as least squares. Likewise, target data used to define an iron cross must be processed by such methods since not only must the two lines be collinear, they must also be co-planar and orthogonal and their sequence centers must coincide. Fortunately, the large number of cameras and targets results in an abundance of redundant data that can be used to average out noise and other data error.

Figure 38A:
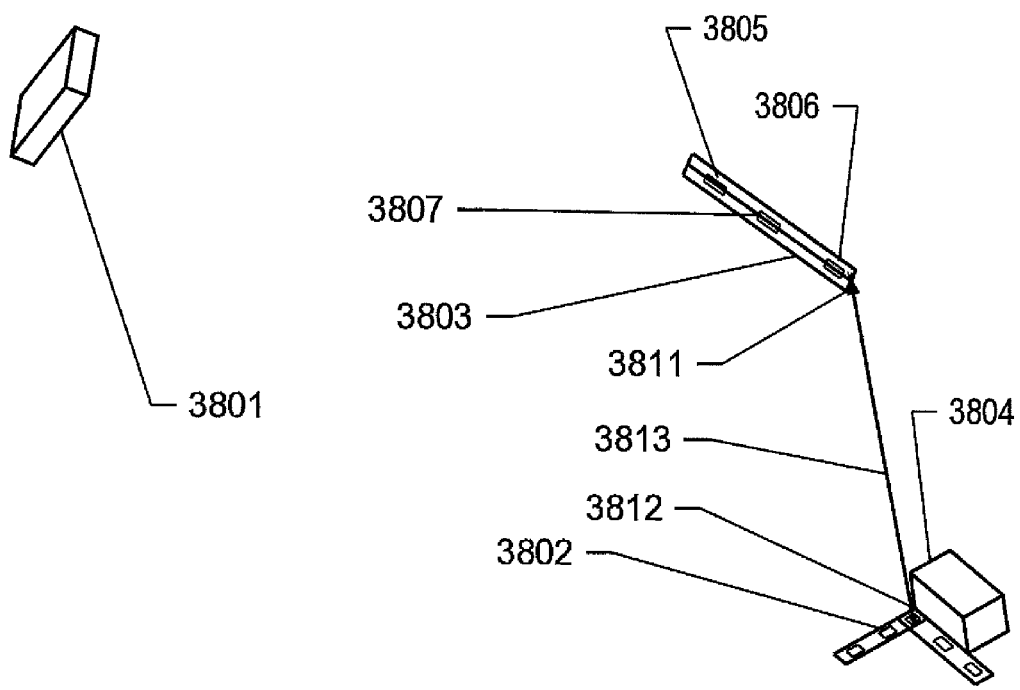
FIG. 38A illustrates how a 3D measurement can be made using a single photo from a single smart camera and a few target sequences.

FIG. 38A illustrates how a 3D measurement can be made using an ordinary mobile device (smart phone or tablet) and a few target sequences. Finding the location and orientation of an object in a room relative to some feature of interest such as a box 3820 can be a challenge. Nobody wants to go through a lengthy calibration process. A smart phone camera 3801 takes a single picture of a scene that includes a carpenter square sequence target 3802 and a RCTS ruler sequence 3803. Place the carpenter square at the corner of the box. This will define a common coordinate system with the origin at the intersection of the two best fit coplanar orthogonal lines through the sub-targets on the arms of the "carpenter square". The outside corner 3812 of the carpenter square can be obtained by using the offsets found in the database of the CS2D. Place the RCTS ruler sequence 3803 at a location of interest in the 3D space of the room.

This measure of the 3D distance using the relative location and orientation of the ruler sequence relative to the carpenter square can be determined with a single frame of a single camera held at an arbitrary location and orientation. The smart phone camera 3801 had to be in focus with a fixed but known focal length, and with enough pixel density for good tracking. It assumed that the focal plane of the camera and planes of the sequence carriers be more parallel than perpendicular. And the carpenter square and the linear sequence have to be in the same image. These are fairly simple requirements.

If the CS2D and the sequence coordinate do not move relative to each other for a few seconds, then the user could snap a set of images with the camera 3801 from various arbitrary locations and orientations. Each could produce a measure of the location and orientation of the linear sequence with respect to the box. An average of these results would improve accuracy. Other users with other cameras could likewise snap images that could be added to the set of measurements and used in the average to improve accuracy. These extra cameras don't have to be synchronized or linked together in any way other than to send the results to a common device to be included in the computation of the average. This makes for the essential simplicity of the method.

Now consider the case where the coordinate sequence 3803 is moving with respect to the carpenter square 3801. A computer receiving coordinate data of the pair of outermost sub-target centers (SC1 and SCN) 3831, 3832 on a center-line 3814 from a multitude of cameras can quickly construct a path of SC1 and SCN as a function of time if the data packets for each camera frame includes the sequence ID and a timestamp. The data packets are buffered and sorted by time stamp on the fly so data from any valid camera source. The points ordered as a function of time trace out two curves in 3D (one for SC1 and one for SCN). In this method all cameras act autonomously so that the interactive room can automatically be enhanced by a new camera entering the room with its user. The path curves can be smooth with a best fit method.

It should be noted that there is a difference in this problem and the problem of the ruler attached to a bulky item as the human arm. The arm can be rotated around the ruler's centerline and still have the centerline in the same location and orientation. Using a second RCTS sequence such as a iron cross target would eliminate this problem. Another way this ambiguity can be removed is if the ruler were attached to an object which cannot rotate about the target centerline. An example of this would be a vase on a table where the orientation is restricted to slide on the surface of the table and the ruler target would be parallel to the table surface.

Figure 38B:
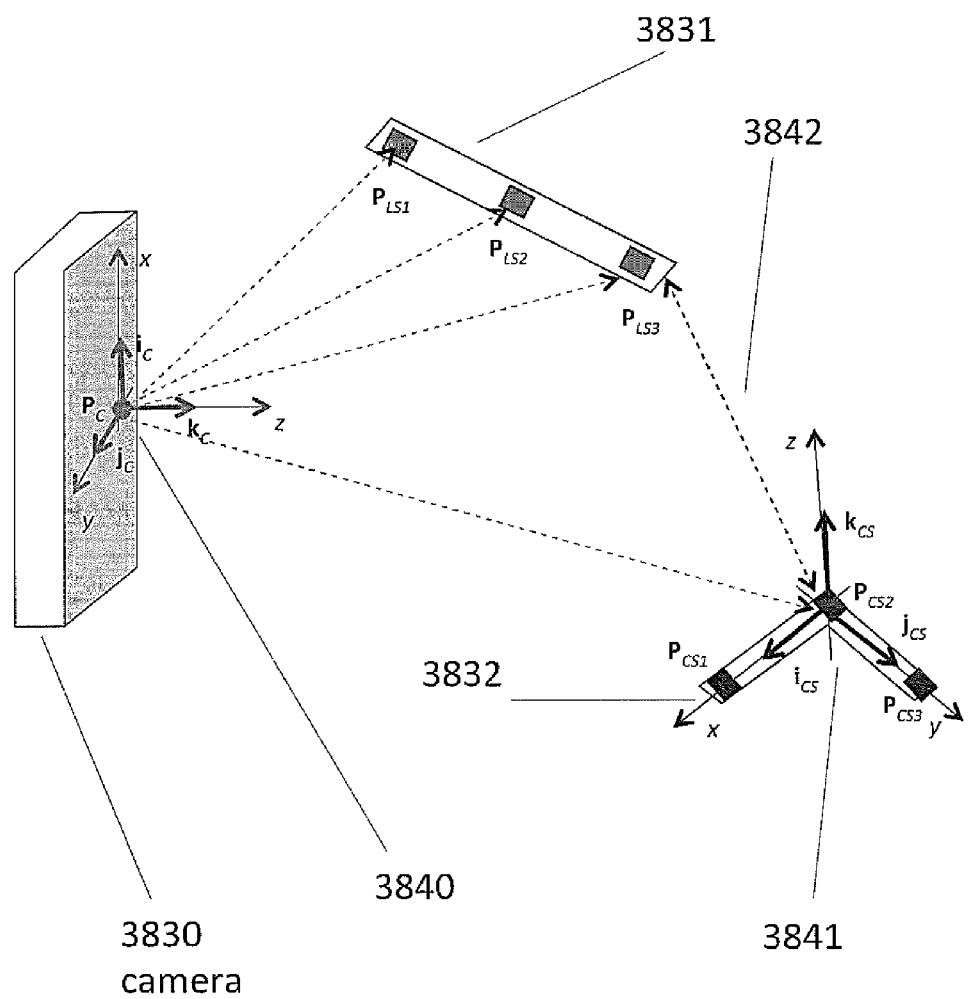
FIG. 38B illustrates the coordinate systems used to develop the math associated with FIG. 38A.

FIG. 38B shows the same elements as FIG. 38A except the emphasis is on the coordinate systems used for the mathematical discussion.

Consider the math behind the case of a carpenter square and a ruler sequence in camera coordinates. The case in which a carpenter's square and a RCTS ruler sequence of targets are in the field of view of a camera is depicted in FIG. 38B. The camera 3830 coordinate system has origin (0, 0, 0) 3840, and unit vectors $i_C$, $j_C$ and $k_C$. The goal of this example is to determine the locations of the RCTS ruler sequence 3831 of targets with respect to the carpenter's square 3832 coordinate system 3841.

The three targets on the arms of the carpenter's square have locations $P_{CS1}$, $P_{CS2}$, and $P_{CS3}$ expressed in terms of camera coordinates. These three points establish the following local carpenter's square coordinate system:

Origin = $P_{CS2}$, $i_{CS} = (P_{CS1} - P_{CS2})/|P_{CS1} - P_{CS2}|$, $j_{CS} = (P_{CS3} - P_{CS2})/|P_{CS3} - P_{CS2}|$, $k_{CS} = i_{CS} \times j_{CS}$.       Unit vectors The three collinear targets along the RCTS ruler sequence have locations $P_{LS1}$, $P_{LS2}$, and $P_{LS3}$ expressed in terms of camera coordinates.

Linear Transformation between Camera and carpenter's square: The linear transformation from a point $R_C$ ($x_C$, $y_C$, $z_C$) in the camera coordinate system to a point $R_{CS}(x_{CS}, y_{CS}, z_{CS})$ in the carpenter's square target coordinate system is given by the following matrix equation:

$$R_{CS}=DC_{CCS}*(R_C-P_{CS2}), \quad \text{(Camera-to-Carpenter's Square)}$$

where the direction cosine matrix $DC_{CCS}$ is given by $$DC_{CCS} = \begin{pmatrix} i_{CS} \cdot i_C & i_{CS} \cdot j_C & i_{CS} \cdot k_C \\ j_{CS} \cdot i_C & j_{CS} \cdot j_C & j_{CS} \cdot k_C \\ k_{CS} \cdot i_C & k_{CS} \cdot j_C & k_{CS} \cdot k_C \end{pmatrix},$$

where $i_C$, $j_C$, $k_C$, $i_{CS}$, $j_{CS}$, $k_{CS}$, $P_{CS2}$, and $R_C$ are expressed in terms of camera coordinates 3840.

In particular, the locations $P'_{LS1}$, $P'_{LS2}$, and $P'_{LS3}$ in carpenter square coordinates, of the three targets in the RCTS ruler Sequence are given by $$P'_{LSi}=DC_{CCS}*(P_{LSi}-P_{CS2}), \; i=1,2,3.$$

Similarly any location on the ruler's centerline such as its intersection with the line 3842 which has coming from the corner of the carpenter square. If the corner position is defined in the database by offsets from the origin 3841, the line can be drawn and the distance given as the length of the line.

Figure 38C:
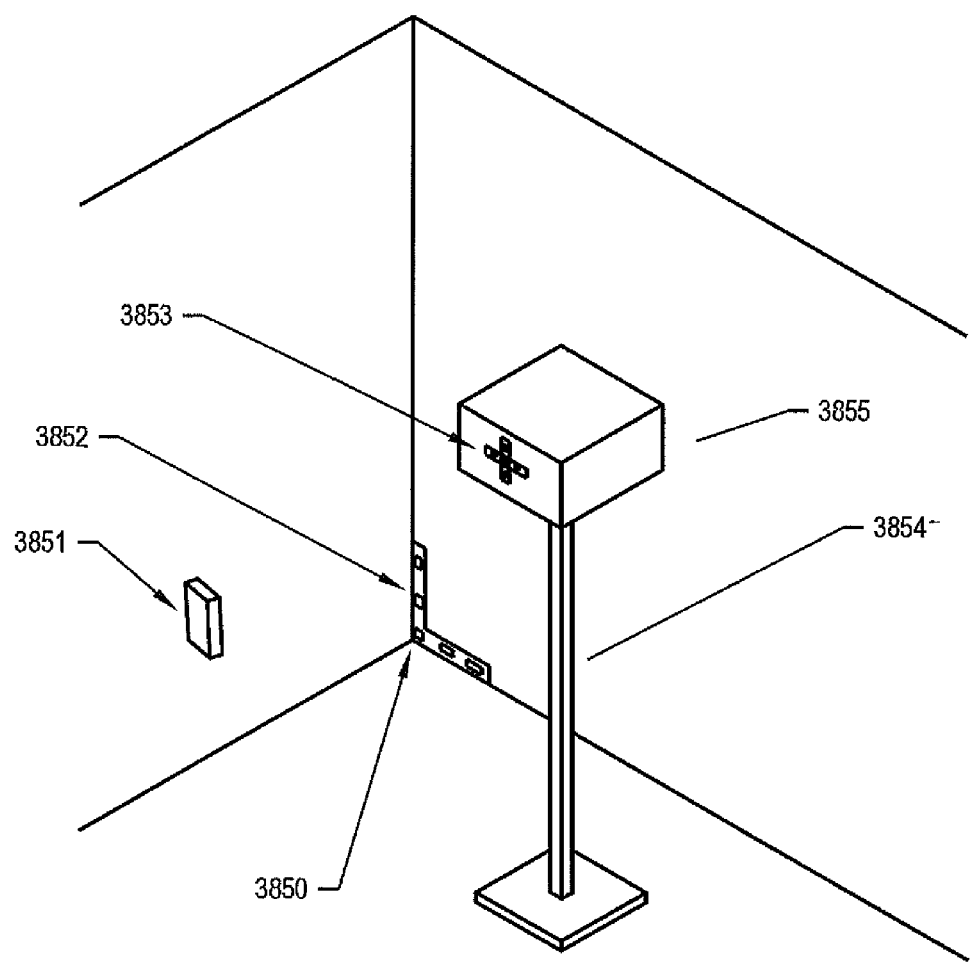
FIG. 38C illustrates how a single photo from a single smart camera can be used to define a transform that takes data defined in terms of a coordinate system associated with an iron cross to that of a carpenter square.

FIG. 38C shows a similar setup where a single camera 3851 takes a single picture of two separate 2D targets, a carpenter square 3852 in the corner 3850 of a room and an iron cross 3853 on the shade VO 3855 of a lamp 3854. This example shows how this one photo can define a transform that can be used to redefine all data in the VO 3855 in terms of the room coordinates in the corner of the room. The math turns out to be surprisingly simple. Using a single picture from an arbitrary mobile device underlines the simplicity of this method of setting up an interactive room filled with multiple cameras and targets. Again let it be emphasized that the math and the methods are simple to execute.

Figure 38D:
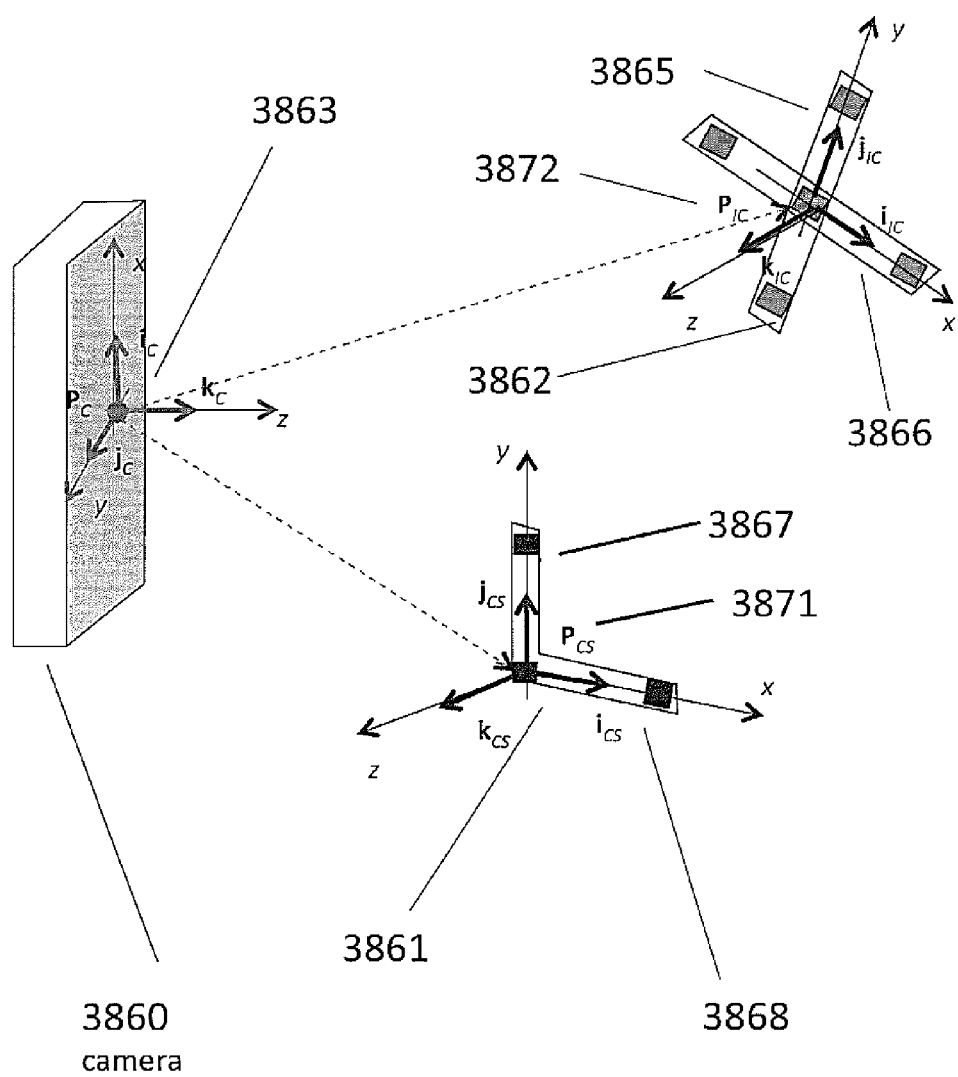
FIG. 38D illustrates the coordinate systems used to develop the math associated with FIG. 38C.

FIG. 38D shows the essentials needed to solve the math of this problem. The camera 3860 and its coordinate system 3863 are shown with an iron cross 3862 consisting of two RCTS sequences (3865,3866) with its coordinate system 3872 and a carpenter square 3861 consisting of two RCTS sequences (3867, 3868) with its coordinate system 3871. The camera coordinate system has origin (0, 0, 0), and unit vectors $i_C$, $j_C$ and $k_C$. The goal of this example is to determine the linear and inverse relationships between/among the three local 3D coordinate systems.

The following 3D Cartesian coordinate systems can be determined for the carpenter's square and the iron cross:

Origin=$P_{CS}$, Unit vectors=$i_{CS}$,$j_{CS}$,$k_{CS}$,  carpenter's square

Origin=$P_{IC}$, Unit vectors=$i_{IC}$,$j_{IC}$,$k_{IC}$,  iron cross where $P_{CS}$, $i_{CS}$, $j_{CS}$, $k_{CS}$, $P_{IC}$, $i_{IC}$, $j_{IC}$, and $k_{IC}$ are all expressed in camera coordinates.

Linear transformation between iron cross and carpenter's square: It is often useful to reference objects (e.g., an iron cross target) in the VR relative to the carpenter's square coordinate system. Since all the above vectors are expressed in camera coordinates, the linear transformation from a point $R_{IC}(x_{IC}, y_{IC}, z_{IC})$ in the iron cross coordinate system to a point $R_{CS}(x_{CS}, y_{CS}, z_{CS})$ in the carpenter's square coordinate system is given by the following matrix equation:

$$R_{CS}=DC_{ICCS}*[R_{IC}-(P_{IC}-P_{CS})], \quad \text{(Iron Cross-to-Carpenter's Square)}$$

where the direction cosine matrix $DC_{CICS}$ is given by $$DC_{ICCS} = \begin{pmatrix} i_{IC} \cdot i_{CS} & i_{IC} \cdot j_{CS} & i_{IC} \cdot k_{CS} \\ j_{IC} \cdot i_{CS} & j_{IC} \cdot j_{CS} & j_{IC} \cdot k_C \\ k_{IC} \cdot i_{CS} & k_{IC} \cdot j_{CS} & k_{IC} \cdot k_{CS} \end{pmatrix}$$

Figure 39A:
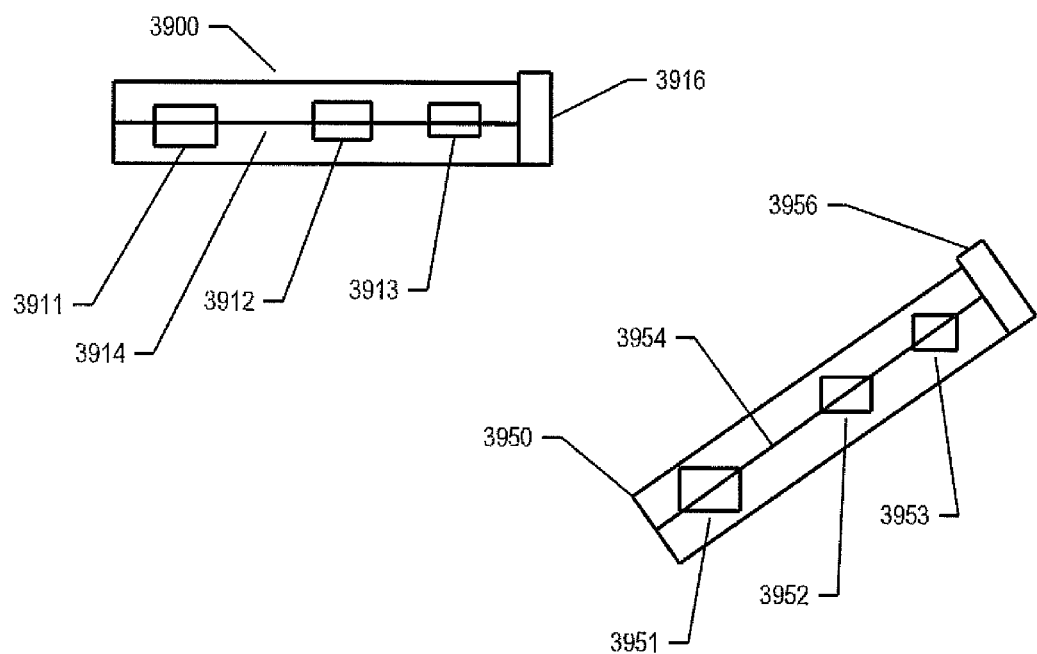
FIG. 39A illustrates an electronic display of a target sequence whose sub-targets are rotated to always align with the horizon thereby matching the most common orientation of camera pixel capture.

FIG. 39A illustrates two devices (3910 and 3950) each with an electronic display of a target sequence. Each device has a computerized display controller (3916, 3956) with a gyroscope that can detect the angle of rotation with respect to the horizon. The first device 3910 is held so that the three sub-targets (3911, 3912, 3913) are oriented parallel to the side of the display device. The second device is turned and the sensor in 3956 instructs the software to display the sub-targets 3951, 3952, 3953 rotated with respect to the display screen 3950.

The most natural orientation of a camera is parallel to the horizon. So the best display of a target sequence is such that the rich transition curves of the targets are roughly perpendicular to the horizon. For some applications such as physical therapy a targeted limb might rotate 90 degrees. Bulls-eye targets are useful here. But rectangular targets can be more accurate. The RCTS method allows for multiple passes through the image data with scanning the pixels for RCTS with transition curves at angles much different than vertical. However, the extra passes at the data slow down processing.

Figure 39B:
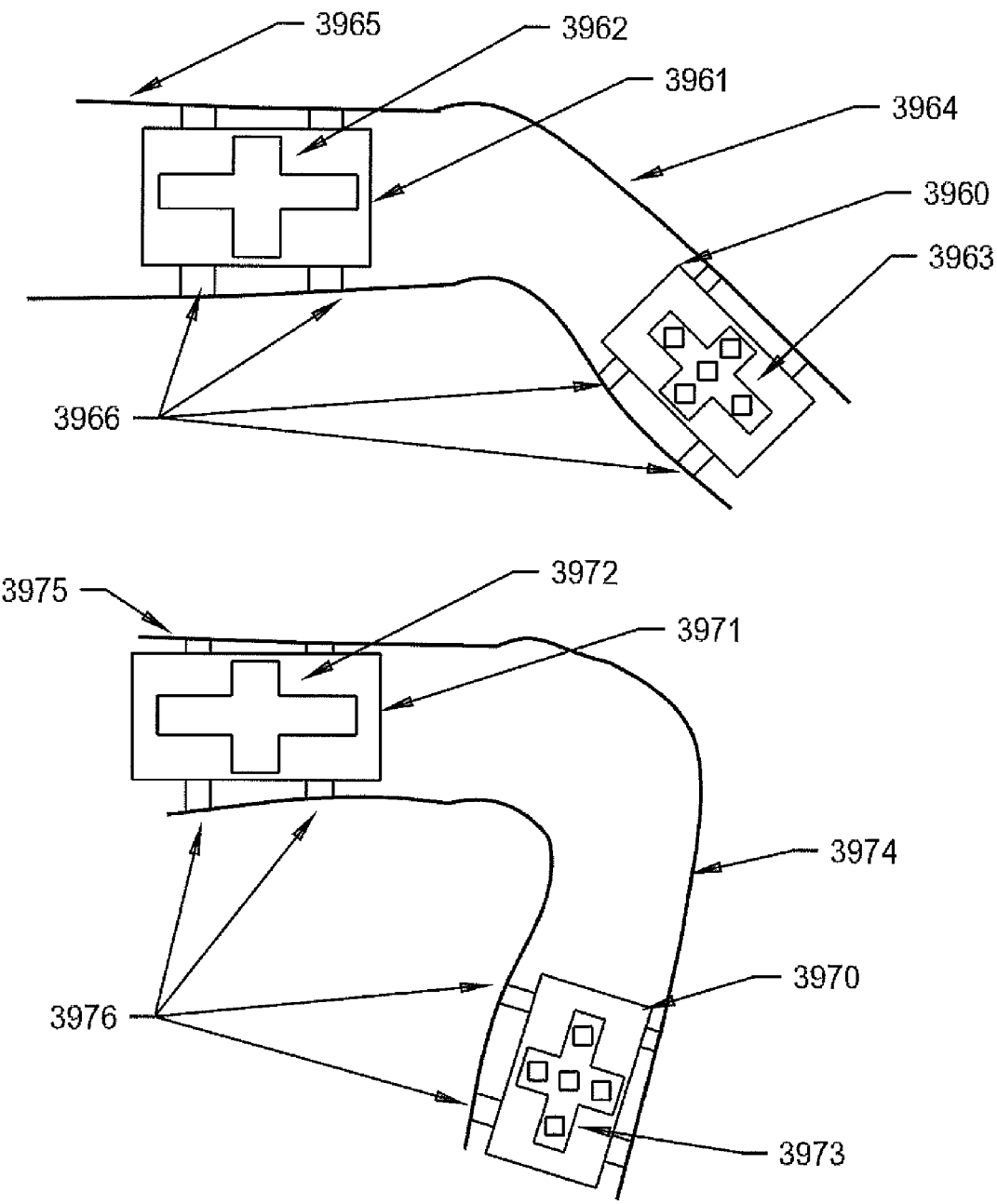
FIG. 39B illustrates an example of a smart phone strapped to a patient's leg as he does a physical therapy exercise.

FIG. 39B illustrates using this to implement tracking of a patient's leg for physical therapy for later evaluation. In the top image, a static target coordinate sequence in the form of an iron cross 3962 on a planar carrier 3961 is attached to the patient's thigh 3965 while the calf is raised. The calf 3964 has a smart phone 3970 held via straps 3966 with the electronic display of an iron cross 3963. The gyroscopic sensor in the smart phone instructs the sub-targets of the iron cross to be displayed such that they are oriented with their transition curves mainly going perpendicular to the horizon while the sub-target center points remain as they were, forming a cross aligned with the edges of the phone. The lower image is the same leg and targets but the leg is down. Again the thigh 3975 has a fixed iron cross 3972 on the carrier 3971 while the smart phone 3970 on the calf 3974 shows an iron cross 3973 with sub-targets rotated to continue their perpendicular orientation relative to the horizon.

Figure 40A:
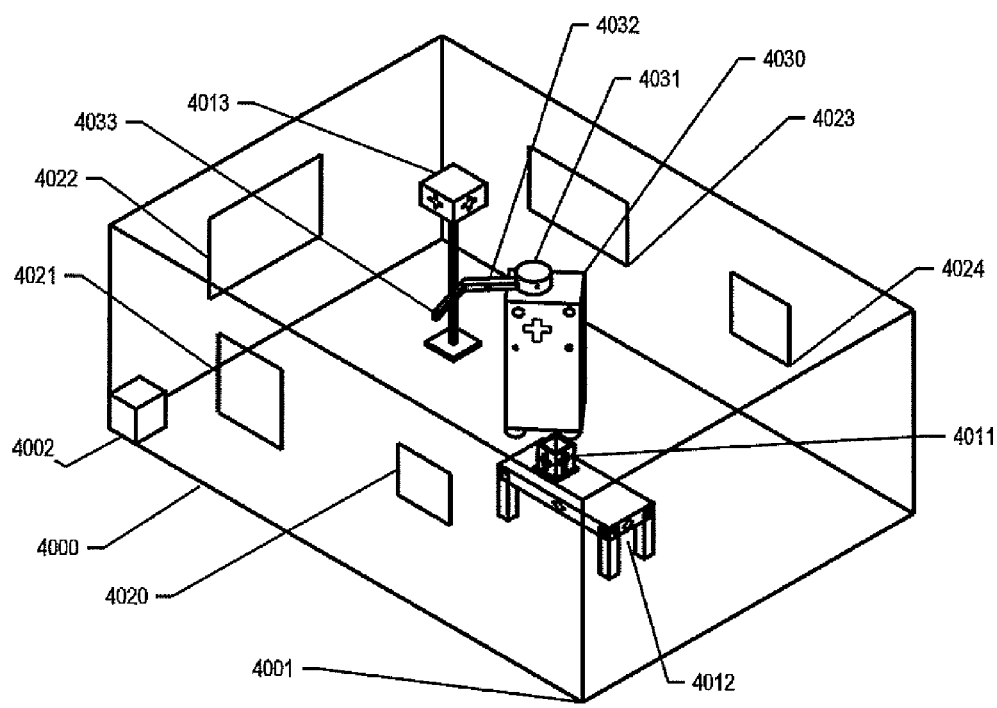
FIG. 40A illustrates how VOs placed throughout a 3D volume form a simple interactive space for tracking and control of computer applications.

FIG. 40A illustrates how VOs can be placed throughout a VR 4000 to form a simple interactive space for tracking and control of computer applications. The VOs illustrated here are composed of VE consisting of a database describing the VEs, one or more RCTS targets, and multiple smart cameras with different focus and pointed at different angles. Each VO has a central computer that gathers target data from the smart cameras of the VO and other VOs that are daisy chained to it.

The walls of the VR room 4000 have four picture frame VOs (4020, 4021, 4023, 4024) and one TV VO 4022 hung on them. The interior of the room has three additional VOs to help place cameras closer to the objects being tracked when these objects move toward the center of the room. The VOs in this example are a lamp shade 4013, a table 4012, and a vase 4011. There is also a mobile robot 4030 in the room which has a jointed arm 4032 attached to a rotary turret 4031. The robot illustrated here is unique in that it can serve both as the object being tracked and a robot that is sent control instructions by the primary computer 4050 governing the room. Further, the robot by definition is a VO that can be moved to a part of the room that may temporally need more camera coverage.

The room computer (RC) 4002 collects the target sequence data from each VO and transforms the data into the room coordinate system RCS 4001. The RCS is the single common reference coordinate system that is used to determine the location and orientation of any VO or targeted object to be tracked in a VR. Then it checks the list of instructions with associated 3D location and orientation described in U.S. application Ser. No. 14/014,936 as a "See-This" list. Each entry has an associated "Do-That" instruction that is sent to an application program to be acted upon.

The smart cameras of each VO send the sub-target data from each frame via wire or wireless transmission to the VO's central computer. Each VO's central computer assembles the sequences and determines the ID of the target sequences. It then locates and orients them in 3D and transforms this to the object coordinate system of the VO. This data having been processed and compressed can now be sent via wireless communication to a RC 4002 for the "room". The term "room" is used in the general sense to mean a 3D volume where a vision activity is taking place.

Figure 40B:
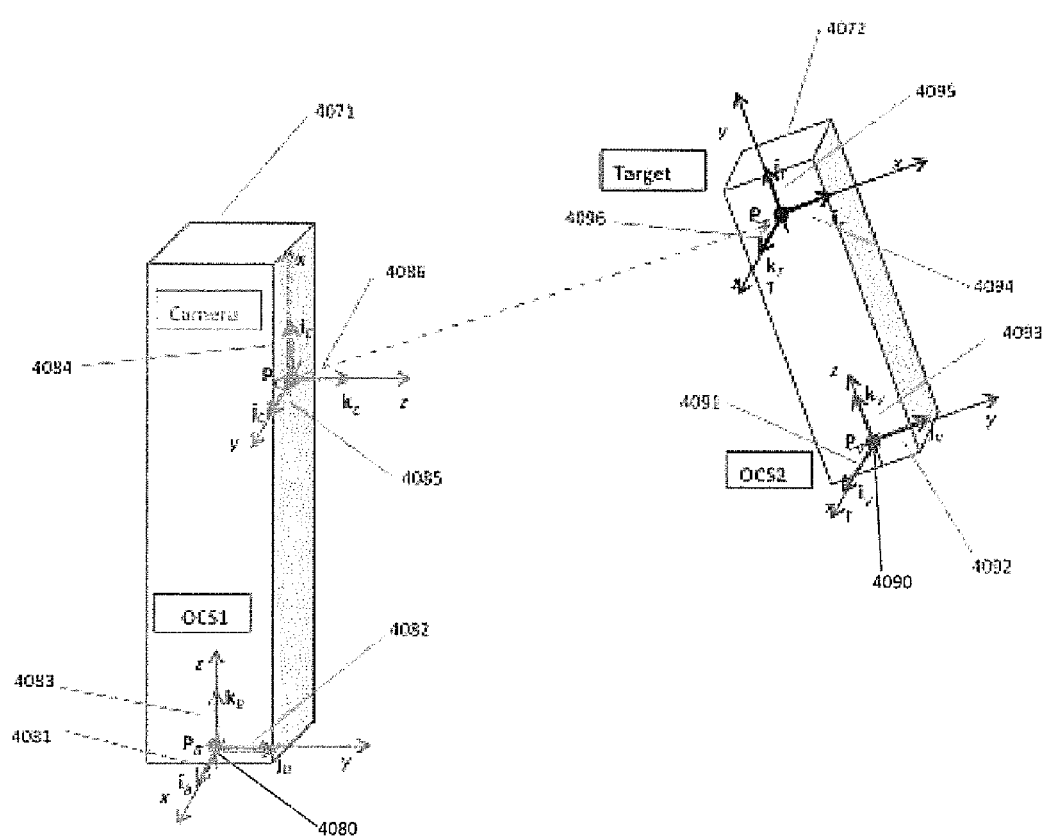
FIG. 40B illustrates how coordinate systems associated with two VOs can be written in terms of each other.

FIG. 40B illustrates how coordinate systems associated with two VOs (4071 and 4072) can be written in terms of each other. The first VO 4071 has a coordinate system (OCS1) defined by three unit vectors $i_B$, $j_B$, $k_B$ (4081, 4082, 4083). The second VO 4072 has a coordinate system (OCS2) defined by three unit vectors $i_V$, $i_V$, $k_V$ (4091, 4092, 4093). VO 4071 has a camera attached to it with camera coordinates defined by 3 unit vectors $i_C$, $j_C$, $k_C$ (4084, 4085, 4086). VO 4072 has an iron cross target affixed to it with coordinates defined by three unit vectors $i_T$, $j_T$, $k_T$ (4094, 4095, 4096). A camera and an iron cross target are left out of FIG. 40B since only the coordinates are relevant for the math. Just imagine that a camera is located over the coordinated 4084, 4085, 4086 and an iron cross lies under the coordinates 4094, 4095, 4096. The camera has the iron cross target in its field of view. The origins of the coordinate systems for OCS1, the camera, the iron cross target, and OCS2 are given respectively by $P_B$ (x, y, z), $P_C$ (x, y, z), $P_T$ (x, y, z), and $P_V$ (x, y, z). Note that the OCS1 and OCS2 coordinate systems are both given by (0, 0, 0) since they "anchor" the coordinate systems. Note also that the word base is used interchangeably with OCS1. Once it is understood how to link two VOs together it is easy to extend this to a multitude of VOs throughout the room to achieve a single coordinate system that can represent and manipulate and measure objects in the 3D space of the room.

In general applications, there may be multiple objects being tracked by a multitude of VOs with cameras, and iron cross targets located around the room. Modeling various activities using multiple, local coordinate systems is difficult to synchronize. To simplify the analysis, the goal of this section is to determine the coordinate locations of all origins in terms of only a single "Primary" base coordinate system. Once all critical "observers" have been located with respect to a, global coordinate system, then objects of interest (either stationary or moving) can be located within various fields of view and followed using the appropriate cameras.

The location, and orientation of each camera and target (also target definitions and IDs) with respect to the OCS and their corresponding transformation matrices are given by the "manufacturer" in a VO database. This reduces the number of distinct coordinate system needed to process data to the number of VOs plus maybe some coordinates related to the objects being tracked. In FIG. 40B an iron cross is viewed by a camera in another VO and used to link the two VO coordinate systems together with a simple matrix manipulation. This daisy chaining reduces the number of OCS needed to handle the vision data of the room. VOs that are set up correctly will daisy chain each other such that only one PCS is needed to represent all their combined vision data. This greatly simplifies storage, processing, and transmission of vision data. It also makes it much simpler to use weighted averages of location and orientation data gathered from optical tracking of rigid bodies using alternate cameras and targets.

Since these coordinate systems "anchor" their respective objects, the origin and unit vectors are given by the following standard values:

$P_B=(0,0,0)$ and $i_B=(1,0,0)$, $j_B=(0,1,0)$, and $k_B=(0,0,1)$. OCS1

$P_V=(0,0,0)$ and $i_V=(1,0,0)$, $j_V=(0,1,0)$, and $k_V=(0,0,1)$. OCS2

The coordinates of the target, however, when viewed by the camera are represented in the camera coordinate system, and these values depend upon the placement and orientation with respect to OCS1 and OCS2 respectively.

The locations in OCS1 coordinates of the camera, target, and OCS2 are determined in steps. The problem is broken up into a sequence of simpler steps. Coordinate values in one coordinate system must be transformed into coordinate values in another coordinate system. For example, the camera coordinates are known relative to the OCS1 coordinates, while the target coordinates are known with respect to both the camera and the OCS2 coordinates. These coordinates are determined using a linear transformation. If the base coordinates are needed relative to the camera, however, or if the OCS2 coordinates needed relative to the target, then an inverse transformation is required.

The following section summarizes how to determine coordinate values back and forth between two related coordinate systems.

Linear and Inverse Transformations between Two Related Coordinate Systems:

Consider a "primed" coordinate system that has been translated and rotated relative to an "unprimed" coordinate system. A point represented in the unprimed coordinate system has coordinate values R(x, y, z). The same point has coordinate values R'(x', y', z') relative to the unprimed coordinate system. The values of R and R' are related via the following linear transformation:

$$R'=DC*(R-P),$$

where P is the position vector from the origin of the unprimed system to the origin of the primed system. DC is the direction cosine (i.e., rotation) matrix between the unprimed and primed coordinate systems. Each component of the DC matrix is given by the dot product between two unit vectors—one from each coordinate system as follows:

$$DC = \begin{pmatrix} i' \cdot i & i' \cdot j & i' \cdot k \\ j' \cdot i & j' \cdot j & j' \cdot k \\ k'' \cdot i & k'' \cdot j & k'' \cdot k \end{pmatrix}$$

The component values of all vectors R, P, i, j, k, i', j', and k' are expressed with respect to the unprimed system.

The corresponding inverse transformation to obtain the coordinates R in the unprimed system for a point R' in the primed coordinate system is obtained by multiplying each side of the above equation by the inverse of the direction cosine matrix and adjusting terms to obtain the following result:

$$R = P + DC^T * R'.$$

Note that since the direction cosine matrix DC is unitary, its inverse is given by it transpose $DC^T$.

The following paragraphs summarize the linear and inverse transformations between various "neighboring" elements of the "daisy chain" that links OCS1, camera, target, and OCS2.

Linear and Inverse Transformations between OCS1 and Camera: These transformations are fixed and should be supplied by the manufacturer of the VOs along with camera characteristics in an associated database. The linear transformation from a point $R_B(x_B, y_B, z_B)$ in the base (OCS1) coordinate system to a point $R_C(x_C, y_C, z_C)$ in the camera coordinate system is given by the following matrix equation:

$$R_C = DC_{BC} * (R_B - P_C)], \quad \text{(OCS1-to-Camera)}$$

where $DC_{BC}$ is the direction cosine (i.e., rotation) matrix between the two coordinate systems. Each component of the $DC_{BC}$ matrix is given by the dot product between two unit vectors—one from each coordinate system—as follows:

$$DC_{BC} = \begin{pmatrix} i_C \cdot i_B & i_C \cdot j_B & i_C \cdot k_B \\ j_C \cdot i_B & j_C \cdot j_B & j_C \cdot k_B \\ k_C \cdot i_B & k_C \cdot j_B & k_C \cdot k_B \end{pmatrix}$$

where $i_B, j_B, k_B, i_C, j_C, k_C, P_B, P_C$, and $R_B$ are expressed in terms of base coordinates The base coordinates $R_B$ of a point expressed in terms of camera coordinates $R_C$ is given by the following inverse transformation:

$$R_B = P_C + DC_{BC}^T * R_C. \quad \text{(Camera-to-OCS1)}$$

Linear and Inverse Transformations between Camera and Target: These linear transformations are variable and depend upon the relative positions and orientations of the camera and target. The linear transformation from a point $R_C(x_C, y_C, z_C)$ in the camera coordinate system to a point $R_T(x_T, y_T, z_T)$ in the target coordinate system is given by the following matrix equation:

$$R_T = DC_{CT} * [R_C - (P_T - P_C)], \quad \text{(Camera-to-Target)}$$

where the direction cosine matrix $DC_{CT}$ is given by $$DC_{CT} = \begin{pmatrix} i_T \cdot i_C & i_T \cdot j_C & i_T \cdot k_C \\ j_T \cdot i_C & j_T \cdot j_C & j_T \cdot k_C \\ k_T \cdot i_C & k_T \cdot j_C & k_T \cdot k_C \end{pmatrix},$$

where $i_C, j_C, k_C, i_T, j_T, k_T, P_T, P_C$, and R are expressed in terms of camera coordinates.

The camera coordinates $R_C$ of a point expressed in terms of target coordinates $R_T$ is given by the following inverse transformation:

$$R_C = (P_T - P_C) + DC_{CT}^T * R_T. \quad \text{(Target-to-Camera)}$$

Linear and Inverse Transformations between OCS2 and Target: These transformations are fixed and should be supplied by the manufacturer. The linear transformation from a point $R_V(x_V, y_V, z)$ in the OCS2 coordinate system to a point $R_T(x_T, y_T, Z_T)$ in the target coordinate system is given by the following matrix equation:

$$R_T = DC_{VT} * (R_V - P_T), \quad \text{(OCS2-to-Target)}$$

where the direction cosine matrix $DC_{VT}$ is given by $$DC_{VT} = \begin{pmatrix} i_T \cdot i_V & i_T \cdot j_V & i_T \cdot k_V \\ j_T \cdot i_V & j_T \cdot j_V & j_T \cdot k_V \\ k_T \cdot i_V & k_T \cdot j_V & k_T \cdot k_V \end{pmatrix}$$

where $i_V, j_V, k_V, i_T, j_T, k_T, P_T$, and R are expressed in terms of OCS2 coordinates.

The OCS2 coordinates $R_V$ of a point expressed in terms of target coordinates $R_T$ is given by the following inverse transformation:

$$R_V = P_T + DC_{VT}^T * R_T. \quad \text{(Target-to-OCS2)}$$

Locations of OCS1, Camera, Target, and OCS2 Given in Terms of Base Coordinates: In the general case in which there are multiple VOs and Objects to be tracked, the key to the analysis is to express all objects of interest in terms of the global or "Primary" coordinate system associated with one of the VOs. Direct and inverse transformations are used to work from each local coordinate system back to their OCS. The locations in OCS1 coordinates of the camera, target, and OCS2 in FIG. 40B are determined in a sequence of simple steps.

Location of camera expressed in terms of base (OCS1) coordinates: The location $R_{C\_base}$ of the camera in OCS1 coordinates is given by the manufacturer in terms of base coordinates as $$R_{C\_base} = P_C.$$

Location of target expressed in terms of OCS1 coordinates: The target is seen by the camera and has its location expressed in terms of camera coordinates as $P_T$. The target origin location $R_{T\_base}$ in terms of base coordinates is given by the following inverse transform:

$$R_{T\_base} = P_C + DC_{BC}^T * P_T. \quad \text{(Camera-to-OCS1)}$$

Location of OCS2 expressed in terms of OCS1 coordinates: The location of the OCS2 in OCS1 coordinates is obtained by using the relationship of OCS2 to the target, the target to the camera, and, finally, the camera to OCS1. The location of the target in OCS2 coordinates is given by the manufacturer as $P_T$. The location $R_{V\_target}$ of the OCS2 origin in target coordinates is given by the following inverse transformation $$R_{V\_target} = P_T + DC_{VT}^T * P_V. \quad \text{(OCS2-to-Target in Object2)}$$

Once the target coordinates of the OCS2 origin are known, the location $R_{V\_Camera}$ of the OCS2 origin in terms of camera coordinates is given by another inverse transform:

$$R_{V\_camera} = (P_T - P_C) + DC_{CT}^T * R_{V\_target} \quad \text{(Target in Object2-to-Camera in Object 1)}$$

Once the camera coordinates of the OCS2 origin are known, the location $R_{V\_base}$ of the OCS2 origin in terms of OCS1 coordinates is given by the final inverse transform:

$$R_{V\_base} = P_C + DC_{BC}^T * R_{V\_camera}. \quad \text{(Camera in Object1-to-OCS1)}$$

Locations of Multiple Objects in Room Seen by Multiple Cameras:

A general interactive room can be developed using multiple VOs each having cameras, targets, an associated database, and an OCS. The setup of the interactive room requires that one OCS be designated the PCS. All the VE of all the VOs in the room, as well all the 3D locations and orientations of all objects being tracked can be written in the PCS if the VOs are properly placed around the room. To be properly placed the set of VO has to have cameras in focus with focal planes parallel to within 45 degrees to the planes of at least one target on each VO and each rigid body element to be tracked. Every VO that has a camera that properly sees a target of a second object can express all data from its cameras and all of its target sequences in terms of the OCS of the first VO. This is called daisy chaining. In a properly set up room every VO can follow a daisy chains back to the PCS.

The assumption is that each object has at least one target sequence that can be seen by at least one camera. In some setups, target sequences will be seen by more than one camera. In these cases, there can be multiple "daisy chains" that link a given target back to the base coordinate system. Depending upon the corresponding viewing angles, some of these chains will have better estimates of the target locations. It is sufficient to determine a suitable path; i.e., it is not worth the effort to identify the "best" path. It is also necessary to identify and eliminate internal "loops" that circle back on themselves without reaching the PCS.

VOs that are set up correctly will give a room coverage from cameras at different locations and orientations and targets on different sides of object so that at least one is has a camera focal plane that can see target sequences which are more coplanar than not. Target data from sequences in a plane that is too much out of co-planarity to the camera plane viewing should be discarded. Math reflects nature. If a target sequence is perpendicular to the focal plane of a camera transform matrices associated with this won't have an inverse (i.e. it results in a divide by zero). If the plane of the target sequence is too far (more than 45 degrees) out of co-planarity with the focal plane then it will be hard to see and transformation errors will be large. Multiple views of the same target sequences that produce good data can be averaged to minimize noise and other data error.

So the above methods provide for a simple means of calibrating a VR. The process of calibration of a 3D space for optical tracking covered here involves defining and storing the relative location and orientation of cameras and targets that make up the tracking system. These parameters are best stored in the form of transformation matrices that can take the 3D positions of sub-target centers from the lambda analysis and convert them to a common room coordinate system RCS. It is assumed that a database is available that completely describes the ID numbers, the colors, shapes, sizes, and separations of RCTS targets and sub-targets as well as the object to which they are associated. It is also assumed that manufacturer data for vision objects such as intrinsic camera specifications and relative position and orientation in the VO is provided in database form. Further, it is assumed that user input data used to tweak the effectiveness of the tracking system is provided. Finally, it is assumed that lens distortion and other errors can be ignored and later minimized as multi-camera data is averaged or statistically processed.

Figure 41A:
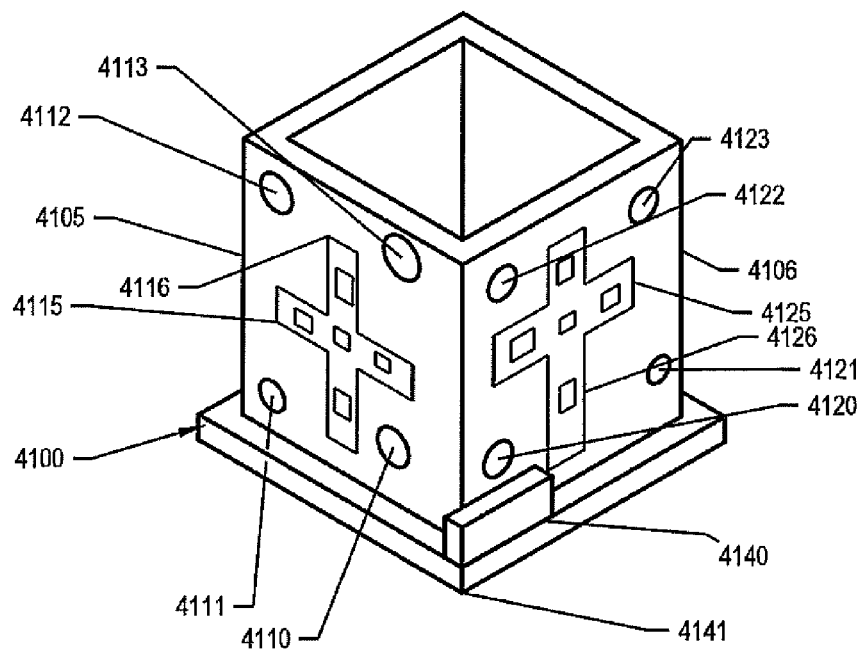
FIG. 41A illustrates one aspect of a VO as a vase.

In FIG. 41A, the vase of FIG. 40A is shown in more detail. Here a vase 4100 is shown with face 4105 having an iron cross target composed of two sequences (4115, 4116) and four cameras (4110, 4111, 4112, and 4113). Similarly the other face 4106 has an iron cross target composed of two sequences (4125, 4126) and four cameras (4120, 4121, 4122, and 4123). The Vision Object Computer VOC 4140 is shown in front. It is important to note that each sequence that makes up an Iron Cross or a simple linear sequence must be unique within the room. This is possible because of the vast number of sub-target combinations available for RCTS sequences. However, it may be desirable for the user to customize the sequences used to make sure that the sequences are unique.

Figure 41B:
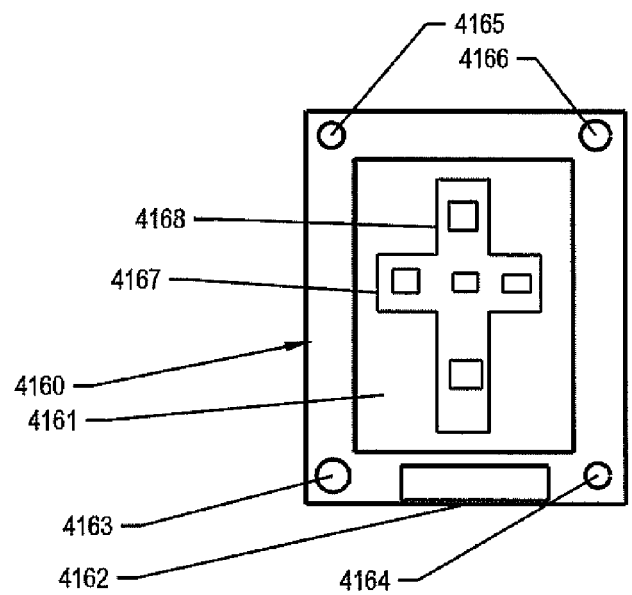
FIG. 41B illustrates one aspect of an electronic display that could be attached to the face of a VO.

FIG. 41B depicts a carrier 4160 that has an electronic display 4161 driven by the processor 4164 used to display an iron cross composed of two unique target sequences 4167, 4168. The display is shown as including cameras 4163, 4164, 4165, 4166. Such a device can be attached to a face of the vase or other VO. An example of such a device would be a smart phone or tablet computer. Alternatively the iron cross could be printed on paper by a color printer and taped to the face of the vase. The vase or any VO for that matter has a single common reference coordinate system (COS) that is used to determine the location and orientation of any VE in the VO. Every VE on a VO has an associated 3D coordinate system. The VO has an associated database that includes transformation matrices to and from a VE coordinate system and its OCS. Any camera on one VO that can clearly see an iron cross of a second VO in its field of view can define that Iron Crosses coordinate transformation matrix in terms of the first VO's OCS. This allows for a daisy chain of all such VOs. Thus a set of VOs that daisy chain each other can with matrix multiplication create a single PCS that all camera data can be expressed in.

Figure 42A:
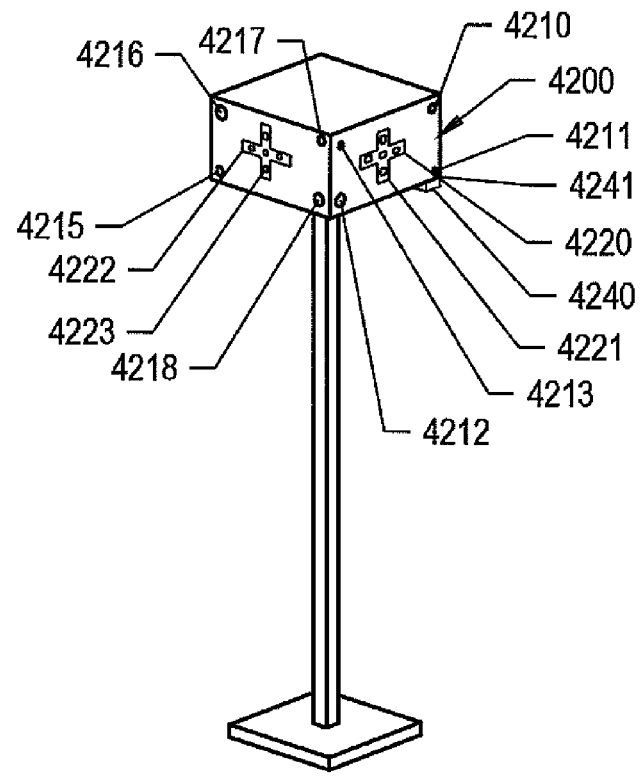
FIG. 42A illustrates an aspect of a lamp shade as a VO.

FIG. 42A illustrates the use of a lamp shade 4200 as a Vision Object. A multitude of cameras (4210, 4211, 4212, 4313, 4215, 4216, 4217, and 4218) are placed around the surfaces of the shade. The VOs computer VOC 4240 is shown at the bottom left of the shade. The cameras are tilted at different angles and have a variety of focus settings. Sequence pairs that form Iron Crosses are placed on the shade surfaces (4220, 4221, 4222, and 4223). The target sequences can be blended into the décor of the everyday objects.

Figure 42B:
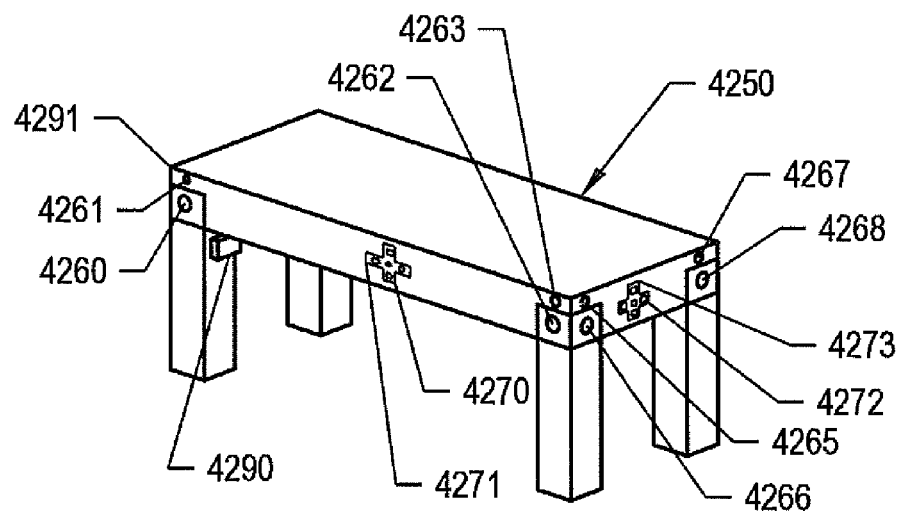
FIG. 42B illustrates an aspect of a table as a VO.

FIG. 42B illustrates the use of a table 4250 are used as a Vision Object. A multitude of cameras are placed around the surfaces of the table (4261, 4262, 6263, 6264, 4265, 4266, 4267, and 4268). The cameras are tilted at different angles and have a variety of focus settings. Sequence pairs that form iron crosses are placed on the table sides (4270, 4271, 4272, and 4273). The VOs computer VOC 4290 is shown on leg of the VO.

Figure 43A:
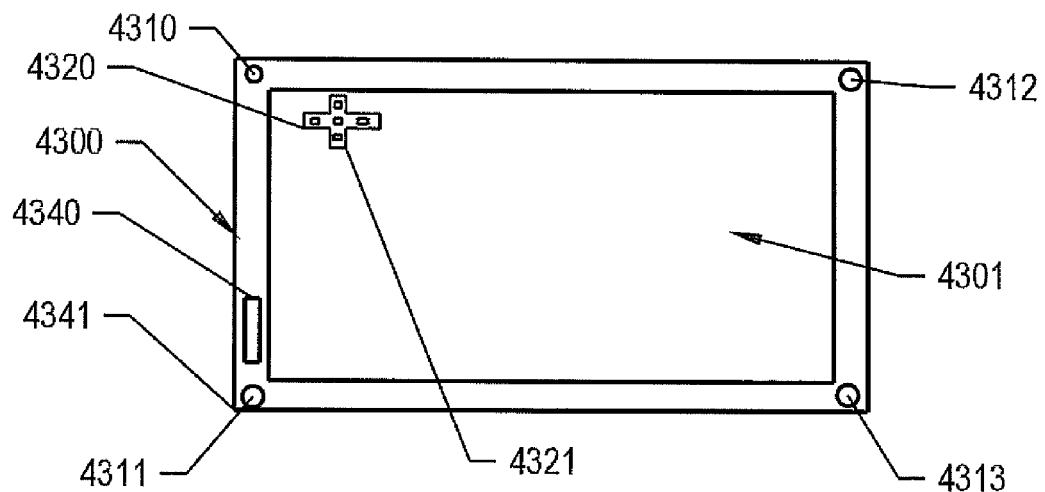
FIG. 43A illustrates an aspect of a Television as a VO.

FIG. 43A illustrates an example of a television 4300 as a VO. Smart cameras (4310, 4311, 4312, and 4314) are shown around the bezel of the television 4300. A display of two sequences (4320 and 4321) that form an iron cross are displayed at a predetermined location on the television during the calibration of the room. Often it might not be necessary to have every VO displaying their iron crosses at all times.

Figure 43B:
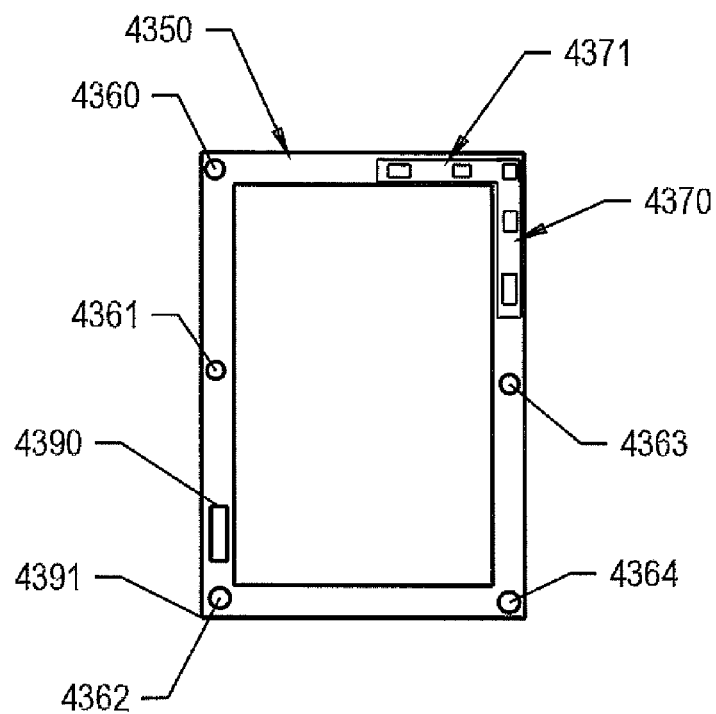
FIG. 43B illustrates an aspect of a picture frame as a VO.

FIG. 43B illustrates an example of a picture frame 4350 as a VO. Cameras (4360, 4361, 4362, 6363, and 6364) are shown around a picture frame 4350. Two sequences (5470, 4371) form a carpenters square where the corner sub-target is shared by both sequences.

Figure 44A:
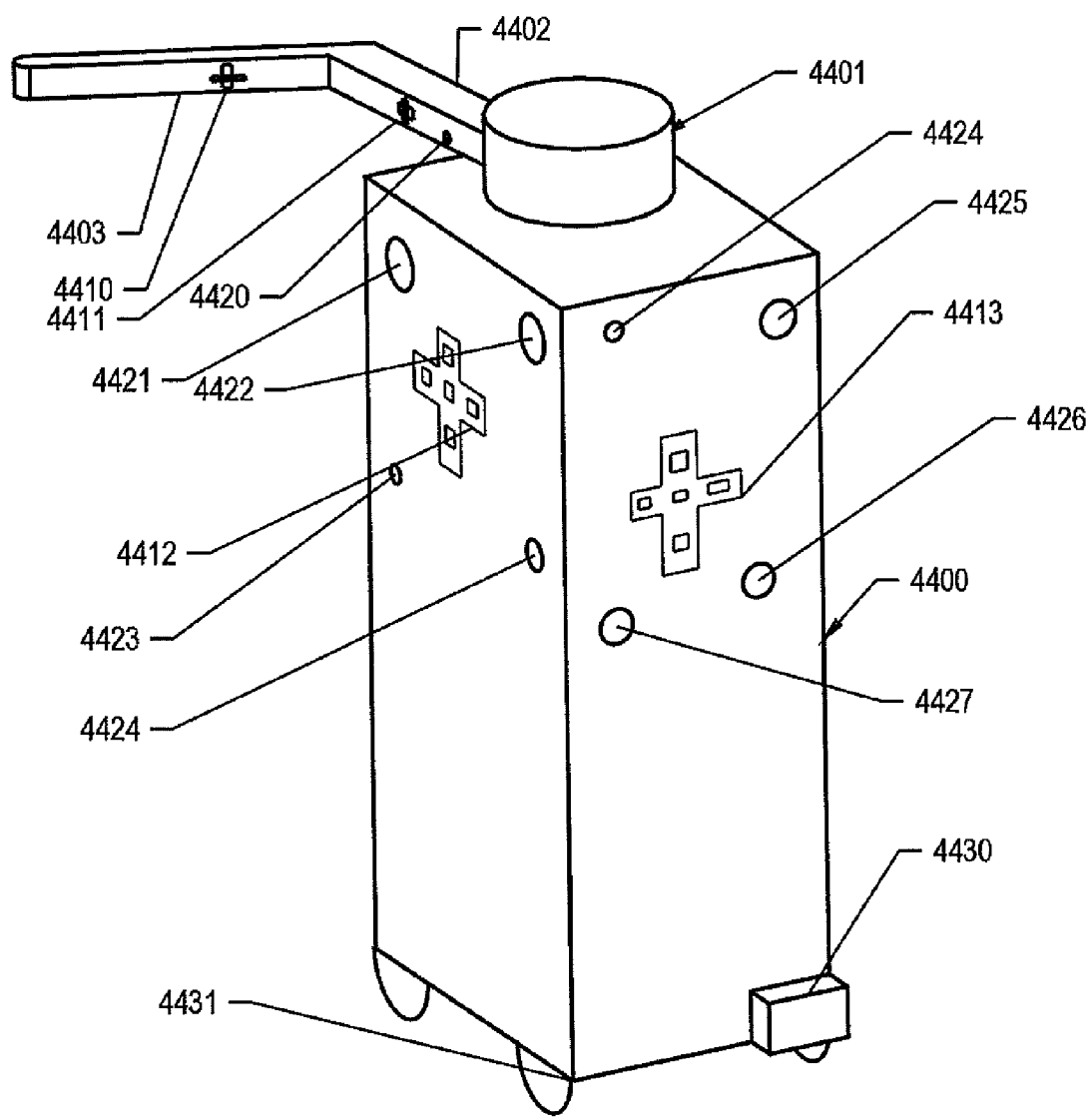
FIG. 44A illustrates an aspect of a mobile robotic device that can be tracked and controlled by external cameras and computers in a 3D interactive space.

FIG. 44A illustrates an example of a mobile robotic device or robot 4400 that can be tracked and controlled by external cameras and computers in a VR. FIG. 44 illustrates three different ideas: 1) tracking of arms and objects in a 3D space, 2) control of computer controlled equipment using multi-camera tracking and external navigation instructions, and 3) mobile Vision Objects. The turret 4401 at the roof of the robot 4400 can rotate. The robot 4400 has a jointed arm 4402 and 4403 that is attached to the turret 4401. Each jointed linkage (4403, 4402) of the arm has one or more targets (4410, 4411) on the surface of each linkage. A smart camera 4420 is placed on the linkage 4402. Smart cameras (4421, 4422, 4423, 4424, 4425, 4426, 4427, and 4428) and RCTS targets (4412, 4413) are placed on the robot surfaces. The robot's computer VOC 4430 is shown at the bottom right of the robot.

Figure 44B:
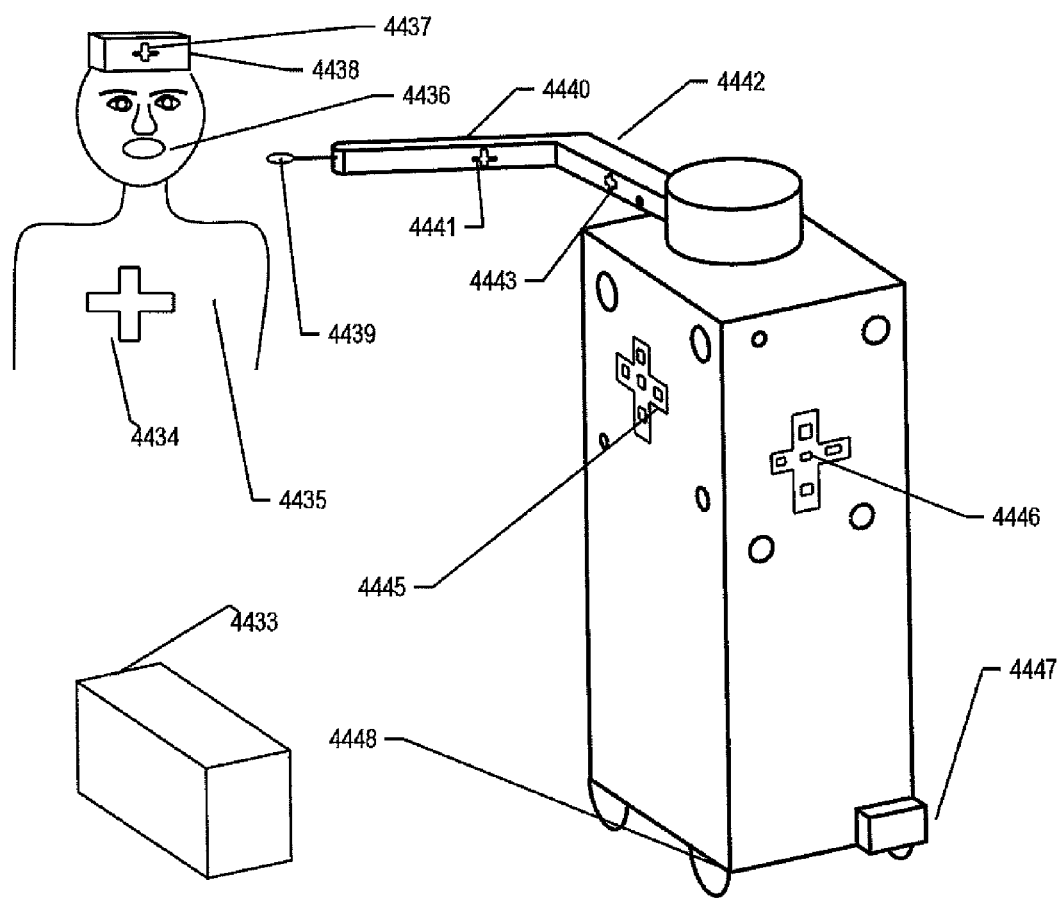
FIG. 44B illustrates how a similar robot in a similar interactive space could be guided by the rooms camera data to perform a nursing task, such as feeding a patient.

FIG. 44B illustrates the use of a vision room can be used to control a robot nursing application. In this example the robot is configured to care for a senior citizen or person with disabilities or even an ebola patient. The ebola patient would need someone to clean them up and feed them but their condition puts care givers at great risk. A robot could be cleaned with harsh chemical and even strong UV radiation that could possibly be lethal to a human care giver. Further, by placing targets on expensive medical equipment that is likely to be near the patient, a robot VR controlled can avoid knocking over the equipment, Multiple cameras in VOs placed around the room can view VOs, targeted objects and targeted robot arms. A patient 4435 has his mouth 4436 open waiting to be feed by the spoon 4439 held by the robot 4448. A transmission from the room computer 4433 to the robot computer 4447 instructs the robot on how to maneuver in the room and move its arm linkages 4440 and 4442 to best get the food in the patient's mouth as the patient also moves. The VOs around the room can track the patient's target 4437 on the cap 4438 and on the chest 4434. Normal face recognition could be used to determine whether the mouth was open wide enough to accept food. The robot can be tracked with its targets 4445 and 4446 and the arm targets 4441 and 4443. Many robots have a pair of cameras mimicking human eyes. These provide limited ability to accurately track all of the hazards of the room and keep up with the relative motion of the patient. The VOs let the robot be aware of people walking behind or around the robot. It can be aware of delicate hospital equipment if the equipment is targeted. With a room full of cameras to guide it the robot is less likely to be an embarrassment. A robot that is controlled by a large number of camera tracking elements can be made of inexpensive lightweight flexible materials since the relative position of the robot arms to the patient can be continuously be tracked and updated unlike a traditional industrial robot that operates off a predetermined path.

Finally, the robot has all of the elements that define a Vision Object. Think of it as a mobile VO that can be instructed to move to any part of the room that temporarily needs more camera coverage.

Figure 45:
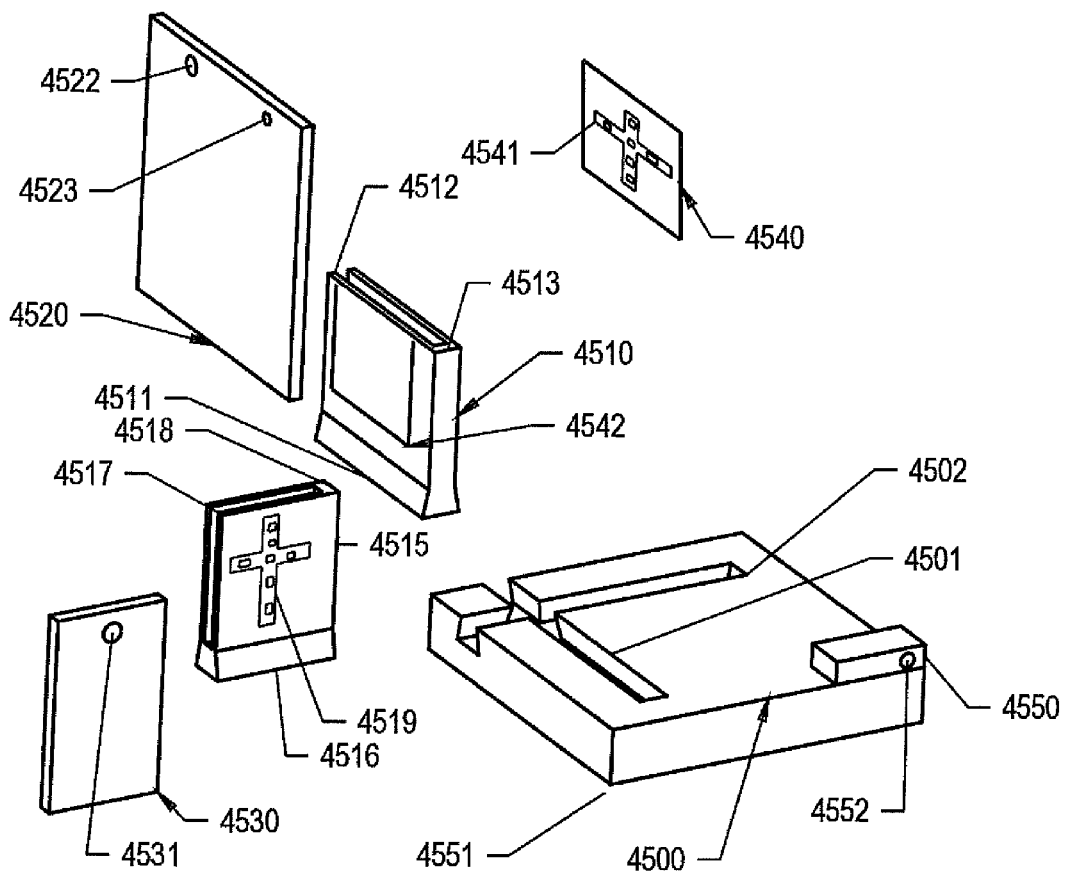
FIG. 45 illustrates how a VO can be created using ordinary smart phones and tablet computers.

FIG. 45 illustrates how a VO can be created using ordinary smart phones and tablet computers. A mobile device holder vision object (MDHVO) 4500 could be produced that makes it easy to construct VOs using mobile devices. The base of the MDHVO 4500 is shown with two dove tail base slots 4501 and 4502. The base slots 4501 and 4502 could have a variety of configurations: dove tail slot, or simple slot, slots at right angles or not, slots that intersect or not. For simplicity, this discussion is limited to the dove tail example shown. The VOs computer VOC 4550 is shown on the right of the base with a socket 4552 to attach a charging plug for the computer's battery. Two slotted holders 4510 and 4515 are shown with dove tail bottoms 4511 and 4516. A smart phone 4530 with a camera 4531 is slid into slot 4517 in holder 4515 until it fits snugly against the end wall 4518. Then this combination is slid all the way into the dove tail slot 4502 in MDHVO 4500. Likewise the tablet computer 4520 with cameras 4522 and 4523 is slid into slot 4512 in holder 4510 until it fits snugly against the end wall 4513. This combination then is slid all the way into the dove tail slot 4501 in the MDHVO 4500. The MDHVO 4500 would come with a set of index cards 4540 each having a unique iron cross target 4541 color printed on it. The set up would involve sliding index cards into the slots on either side of the holders 4510 and 4516. The final step would involve updating the database associated with the MDHVO with the make and model number of each mobile device and the index card IDs and their holder and side ID. It is the combination of a repeatable location and orientation of snug fit mobile devices in the MDHVO together with a table lookup of offset for device make and model that allow for precise camera locations and orientations with respect to the OCS of the MDHVO. Likewise the identification of which iron cross index card is inserted into which side of which holder allows for a transformation matrix from each iron cross to the OCS of the MDHVO. Inserting this camera and target information into an associate database, the MDHVO will act like any other VO described in FIG. 40 through 43. Image a party where the participants bring their own mobile devices used to create an interactive room for "holodeck" games.

What is claimed:

1. A method of tracking an object position in a 3D space comprising:
   providing a target on an object in a 3D space, the target including a plurality of sub targets arranged in at least one unique rich color transition sequence;
   determining a 3D coordinate position of a camera in the 3D space;
   capturing, by the camera, a camera image frame containing the target in the 3D space;
   determining a 2D coordinate position of the target in the camera image frame taken by camera;
   identifying, by the camera, the identity of each sub-target of the target in the camera image frame;
   communicating the sub-target identification for the target by the camera to a first computer associated with and communication coupled to the camera;
   storing target identification, sub-target sequences and distances between centers of sub-targets, and a plurality of target IDs;
   accessing, by the first computer, the stored target ID, sub-target sequences and center distances of the sub-target as the target image data of the target in the camera image frame; and
   determining, by the first computer, the 3D location and orientation of the target in 3D space based on distances between the centers of the sub-targets in the target with distances based on camera data and the target image data.

2. The method of claim 1 wherein providing the target comprises:
   arranging the sub targets with centers substantially along a best fit central line through all of the sub targets in one sequence on the target.

3. The method of claim 1 wherein providing the target comprises:
   providing the target with a pair of linear sub-target sequences orthogonally arranged with respect to each other.

4. The method of claim 3 wherein providing the pair comprises:
   arranging the pair of linear sub-targets sequences co-linear and co-planar to each other.

5. The method of claim 3 wherein providing the pair comprises:

forming the pair of linear sub-targets sequences as at least one of an iron cross and a carpenter square.

6. The method of claim 1, wherein a processor is associated with the camera, the method further comprising:
accessing, by the processor, a database containing the IDs of sub-target sequences used in the 3D space to determine the ID of the target in the camera image frame.

7. The method of claim 6 further comprising:
transforming, by the processor, the 2D coordinate position of the target in the camera image frame into a 3D coordinate system of the camera.

8. The method of claim 7 further comprising:
communication coupling the camera to a room computer, the room computer transforming the 3D coordinate system of the camera and the 2D coordinate position of the target in the camera image frame into a single 3D coordinate system for the 3D space.

9. The method of claim 8 wherein:
the room computer is communication coupled to a second computer;
transforming the 3D location of the target in the single 3D coordinate system to a 3D coordinate system of the second computer.

10. The method of claim 8 further comprising:
tracking, by the room computer, movement of the object through a plurality of camera image frames in the 3D space in the single 3D coordinate system of the room computer.

11. The method of claim 1 wherein:
providing the target on the object in the 3D space includes providing at least one target of a plurality of targets on a different one of a plurality of objects in the 3D space.

12. The method of claim 11, wherein a processor is associated with the camera, the method further comprising:
accessing, by the processor, database containing the IDs of sub-target sequences used in the 3D space to determine the ID of the target in the camera image frame.

13. The method of claim 12 further comprising:
transforming, by the processor, the 2D coordinate position of the target in the camera image frame into a 3D coordinate system of the camera.

14. The method of claim 11 further comprising:
communication coupling the first computer to a room computer associated with the 3D space, the room computer transforming a 3D coordinate system of the camera and the 2D coordinate position of the target in the camera image frame into a single 3D coordinate system for the 3D space.

15. An object tracking apparatus for tracking the position of an object in a 3D space, the apparatus comprising:
a target provided on the object in a 3D space, the target including a plurality of sub targets arranged in a unique rich color transition sequence;
a camera disposed in the 3D space;
a first computer associated and communication coupled to the camera;
the camera capturing a 2D image frame, the image frame containing the target;
the camera identifying an identity of each sub-target of the target in the image frame;
the camera communicating the identity of each sub-target of the target to the first computer;
the first computer accessing stored target ID, sub-target sequences and center distances of the sub-targets to identify the target in the image frame; and
the first computer determining a 3D location and orientation of the object in the 3D space based on transformation of distances between centers of the sub-targets and the target identified by the first computer with measured distances based on camera focal length and target image data.

16. The apparatus of claim 15 wherein:
the sub targets have centers substantially arranged along a best fit central line through all of the sub targets in one sequence.

17. The apparatus of claim 15 wherein:
the target includes a pair of sub-targets orthogonally arranged with respect to each other.

18. The apparatus of claim 17 wherein:
the pair of sub-targets are co-linear and co-planar to each other.

19. The apparatus of claim 18 wherein:
the pair of sub-targets are at least one of an iron cross or a carpenter square.

20. The apparatus of claim 15 comprising:
the first computer accessing a database containing the IDs of a plurality of targets disposed in the 3D space to determine the ID of the target in the image frame; and
the first computer transforming a 2D coordinate position of the target in the image frame into a 3D coordinate system of the camera.

21. The apparatus of claim 15 wherein:
the camera is communication coupled to a processor associated with the 3D space, the processor transforming a 3D coordinate system of the camera and a 2D coordinate position of the target in the image frame into a single 3D coordinate system for the 3D space.

22. The apparatus of claim 15 wherein:
the target on the object in the 3D space includes at least one unique target of a plurality of targets on a different one of a plurality of objects in the 3D space;
the processor accessing a database containing the IDs of a plurality of targets used in the 3D space to determine the ID of the at least one unique target; and
the processor transforming a respective 2D coordinate position of the at least one unique target captured by the camera into a 3D coordinate system for the 3D space.

23. A method of tracking an object position in a 3D space comprising:
providing of a plurality of targets on one object in a 3D space, each target including a plurality of sub targets arranged in at least a unique sequence;
determining a 3D coordinate position of each camera of a plurality of asynchronously operable cameras in the 3D space;
capturing, by each camera, a camera image frame containing at least one target of the plurality of targets in the 3D space;
determining a 2D position of the at least one target in the camera image frame taken by each camera;
providing a database for each of the plurality of targets including at least one of sub-target distance between center points, sub-target relative and sub-target colors;
identifying, by each camera, an identity of each sub-target of the at least one target in the image frame of each camera;
communicating the identity of each sub-target to a respective first computer associated with and communication coupled to each camera of the plurality of cameras;
storing target identification, sub-target sequences and distances between centers of sub-targets for a plurality of target IDs in an accessible memory;

accessing, by the first computer, the stored target ID, sub-target sequences and center distances of the sub-target to identify the at least one target; and determining by the first computer, a 3D location and orientation of the at least one target in the 3D space based on distances between the centers of the sub-targets in the at least one target with distances based on camera data and target image data.

24. The method of claim 23 comprising:

coupling each of the first computers associated with each of the plurality of cameras to a second computer; and transforming, by the second computer, 3D coordinate positions of each target identified by each of the first computers into a 3D coordinate position of each of the plurality of targets in the 3D space.

25. The method of claim 23 wherein:

each at least one unique sequence of sub-targets is a unique rich color transition sequence.

26. The method of claim 23 further comprising:

communication coupling each camera of the plurality of cameras to at least one other camera of the plurality of cameras; and transforming, by a first camera of the plurality of cameras, a 3D coordinate position of one target identified by first camera and communicated to the first camera, into a 3D coordinate position of the at least one other camera coupled to the first camera.

27. The method of claim 23 further comprising:

communication coupling each camera of the plurality of the cameras to each other in a serial daisy chain arrangement so that all of the targets identified by the plurality of cameras has its coordinate position transformed by one of the plurality of cameras into a 3D coordinate position in the 3D space.

* * * * *